US009369686B2

(12) United States Patent
Hayashi

(10) Patent No.: US 9,369,686 B2
(45) Date of Patent: Jun. 14, 2016

(54) IMAGE PROCESSING DEVICE, IMAGE PROCESSING METHOD, AND RECORDING MEDIUM

(71) Applicant: FUJIFILM Corporation, Tokyo (JP)

(72) Inventor: Kenkichi Hayashi, Saitama (JP)

(73) Assignee: FUJIFILM Corporation, Tokyp (JP)

( * ) Notice: Subject to any disclaimer, the term of this patent is extended or adjusted under 35 U.S.C. 154(b) by 0 days.

(21) Appl. No.: 14/729,872

(22) Filed: Jun. 3, 2015

(65) Prior Publication Data
US 2015/0271461 A1 Sep. 24, 2015

Related U.S. Application Data

(63) Continuation of application No. PCT/JP2013/080411, filed on Nov. 11, 2013.

(30) Foreign Application Priority Data

Dec. 7, 2012 (JP) ................................. 2012-268182

(51) Int. Cl.
*H04N 9/73* (2006.01)
*H04N 9/07* (2006.01)
*H04N 5/359* (2011.01)
(Continued)

(52) U.S. Cl.
CPC .............. *H04N 9/735* (2013.01); *H04N 5/359* (2013.01); *H04N 9/045* (2013.01); *H04N 9/07* (2013.01); *H04N 9/646* (2013.01)

(58) Field of Classification Search
None
See application file for complete search history.

(56) References Cited

U.S. PATENT DOCUMENTS 5,889,554 A 3/1999 Mutze
8,106,343 B2 * 1/2012 Arishima .......... H01L 27/14623
250/208.1
8,130,293 B2 * 3/2012 Kanamori .............. H04N 9/045
348/222.1

(Continued)

FOREIGN PATENT DOCUMENTS

EP 1 793 620 A1 6/2007
JP 2-210996 A 8/1990

(Continued)

OTHER PUBLICATIONS

Hirakawa et al., "Spatio-Spectral Color Filter Array Design for Optimal Image Recovery", IEEE Transactions on Image Processing, vol. 17, No. 10, Oct. 2008, pp. 1876-1890.

(Continued)

*Primary Examiner* — Michael Osinski
(74) *Attorney, Agent, or Firm* — Birch, Stewart, Kolasch & Birch, LLP

(57) ABSTRACT

According to an aspect of the present invention, when the abnormal oblique incident light is not detected, the first color mixture correction based on the pixel data of the adjacent pixel to the correction target pixel is performed for the pixel data of the correction target pixel, and when the abnormal oblique incident light is detected, the second color mixture correction based on the pixel data of the peripheral pixel to the correction target pixel is performed. Therefore, this aspect can be applied, particularly, even to an imaging element having a large array matrix size, and it is possible to solve the level difference among same-color pixels that occurs due to the influence of the leakage of the abnormal oblique incident light (the ghost light and the like) to the adjacent pixel, and to suppress the image quality degradation due to the abnormal oblique incident light.

22 Claims, 25 Drawing Sheets

(51) Int. Cl.
*H04N 9/64* (2006.01)
*H04N 9/04* (2006.01)

(56) References Cited

U.S. PATENT DOCUMENTS

| | | | | |
|---|---|---|---|---|
| 8,134,110 | B2* | 3/2012 | Yokozawa | H01L 27/14621 250/208.1 |
| 8,208,046 | B2* | 6/2012 | Ogino | H04N 5/367 348/246 |
| 8,564,700 | B2* | 10/2013 | Kanamori | H01L 27/14621 348/273 |
| 8,730,545 | B2* | 5/2014 | Endo | H04N 5/23212 358/505 |
| 8,736,731 | B2* | 5/2014 | Noudo | H01L 27/14623 348/302 |
| 8,742,309 | B2* | 6/2014 | Agranov | G01S 3/782 250/208.1 |
| 8,830,384 | B2* | 9/2014 | Endo | H04N 5/3456 250/208.1 |
| 9,160,990 | B2* | 10/2015 | Kawai | H04N 5/23212 |
| 9,224,782 | B2* | 12/2015 | Keelan | H04N 9/045 |
| 9,237,319 | B2* | 1/2016 | Sawadaishi | G02B 7/34 |
| 2006/0044449 | A1* | 3/2006 | Sakoh | H01L 27/14621 348/336 |
| 2009/0200451 | A1 | 8/2009 | Conners | |
| 2009/0242736 | A1* | 10/2009 | Rennie | H01L 27/14621 250/208.1 |
| 2010/0134660 | A1 | 6/2010 | Yamauchi | |
| 2011/0069210 | A1 | 3/2011 | Ogura et al. | |
| 2012/0193515 | A1* | 8/2012 | Agranov | G01S 3/782 250/208.1 |
| 2012/0224096 | A1* | 9/2012 | Shimoda | G02B 7/36 348/349 |
| 2012/0242874 | A1 | 9/2012 | Noudo | |
| 2013/0016189 | A1* | 1/2013 | Hosaka | H04N 13/0239 348/49 |
| 2013/0286261 | A1* | 10/2013 | Tanaka | H04N 5/3728 348/280 |
| 2014/0043508 | A1* | 2/2014 | Kawamura | H04N 5/23212 348/280 |
| 2014/0063297 | A1* | 3/2014 | Yamura | H04N 5/367 348/242 |
| 2014/0211051 | A1* | 7/2014 | Sugawara | G02B 7/34 348/273 |
| 2014/0334683 | A1* | 11/2014 | Masuda | H04N 5/23212 382/103 |
| 2015/0015749 | A1* | 1/2015 | Ito | H01L 27/14629 348/273 |
| 2015/0077597 | A1* | 3/2015 | Furuta | H04N 5/359 348/242 |
| 2015/0098007 | A1* | 4/2015 | Harasawa | H01L 27/14621 348/342 |
| 2015/0222833 | A1* | 8/2015 | Murata | G02B 7/34 250/208.1 |
| 2015/0237273 | A1* | 8/2015 | Sawadaishi | H04N 5/3572 348/234 |
| 2015/0244955 | A1* | 8/2015 | Kurahashi | H04N 9/07 348/300 |
| 2015/0319412 | A1* | 11/2015 | Koshiba | H04N 5/367 348/246 |
| 2015/0326838 | A1* | 11/2015 | Kawai | H04N 9/045 348/280 |
| 2015/0381951 | A1* | 12/2015 | Mlinar | H04N 9/04 348/223.1 |
| 2016/0013226 | A1* | 1/2016 | Shim | H01L 27/14603 348/273 |

FOREIGN PATENT DOCUMENTS

| | | |
|---|---|---|
| JP | 2005-333251 A | 12/2005 |
| JP | 2010-130583 A | 6/2010 |
| JP | 2011-66801 A | 3/2011 |
| JP | 2012-9919 A | 1/2012 |
| JP | 2012-204449 A | 10/2012 |

OTHER PUBLICATIONS

International Preliminary Report on Patentability, issued in PCT/JP2013/080411, prepared on Nov. 5, 2014.
International Search Report, issued in PCT/JP2013/080411, dated Feb. 10, 2014.
The Extended European Search Report (EESR), issued in EP11859479.5, dated Aug. 4, 2014.
The Extended European Search Report (EESR), issued in EP11859950.5, dated Oct. 28, 2014.
The Extended European Search Report (EESR), issued in EP12804973.1, dated Jan. 27, 2015.
Written Opinion of the International Searching Authority, issued in PCT/JP2013/080411, dated Feb. 10, 2014.

* cited by examiner

VERTICAL DIRECTION

HORIZONTAL DIRECTION

FIRST SUBARRAY    SECOND SUBARRAY

FIG.10

| G1 | B | R | B | G2 | G1 | B | R | B | G2 |
|----|---|---|---|----|----|---|---|---|----|
| R | G3 | B | G4 | R | R | G3 | B | G4 | R |
| B | R | G5 | R | B | B | R | G5 | R | B |
| R | G6 | B | G7 | R | R | G6 | B | G7 | R |
| G8 | B | R | B | G9 | G8 | B | R | B | G9 |
| G1 | B | R | B | G2 | G1 | B | R | B | G2 |
| R | G3 | B | G4 | R | R | G3 | B | G4 | R |
| B | R | G5 | R | B | B | R | G5 | R | B |
| R | G6 | B | G7 | R | R | G6 | B | G7 | R |
| G8 | B | R | B | G9 | G8 | B | R | B | G9 |

FIG.11

| R | B | G1 | R | B | G1 |
|---|---|----|---|---|----|
| B | R | G2 | B | R | G2 |
| G5 | G4 | G3 | G5 | G4 | G3 |
| R | B | G1 | R | B | G1 |
| B | R | G2 | B | R | G2 |
| G5 | G4 | G3 | G5 | G4 | G3 |

FIG.12

| G1 | B | G2 | G1 | B | G2 |
|----|---|----|----|---|----|
| R | G3 | R | R | G3 | R |
| G4 | B | G5 | G4 | B | G5 |
| G1 | B | G2 | G1 | B | G2 |
| R | G3 | R | R | G3 | R |
| G4 | B | G5 | G4 | B | G5 |

FIG.13A

| G1 | B | G1 | B | G1 | B |
|----|---|----|---|----|---|
| R | G2 | R | G2 | R | G2 |
| G1 | B | G1 | B | G1 | B |
| R | G2 | R | G2 | R | G2 |
| G1 | B | G1 | B | G1 | B |
| R | G2 | R | G2 | R | G2 |

FIG.13B

FIRST SUBARRAY, SECOND SUBARRAY, SECOND SUBARRAY, FIRST SUBARRAY

| G1 | R | G2 | B | G1 | R | G2 | B |
|----|---|----|---|----|---|----|---|
| R | G2 | B | G1 | R | G2 | B | G1 |
| G2 | B | G1 | R | G2 | B | G1 | R |
| B | G1 | R | G2 | B | G1 | R | G2 |
| G1 | R | G2 | B | G1 | R | G2 | B |
| R | G2 | B | G1 | R | G2 | B | G1 |
| G2 | B | G1 | R | G2 | B | G1 | R |
| B | G1 | R | G2 | B | G1 | R | G2 |

AMPLIFIER SHARING PIXELS (2 × 2 PIXELS)

| PARAMETER (P1, P2) | | COLOR MIXTURE RATIO |
|---|---|---|
| COLOR OF ADJACENT PIXEL (P1) | POSITION OF OWN PIXEL (P2) | |
| R | 1 | A1 |
| | 2 | A2 |
| | 3 | A3 |
| | 4 | A4 |
| G | 1 | A5 |
| | 2 | A6 |
| | 3 | A7 |
| | 4 | A8 |
| B | 1 | A9 |
| | 2 | A10 |
| | 3 | A11 |
| | 4 | A12 |

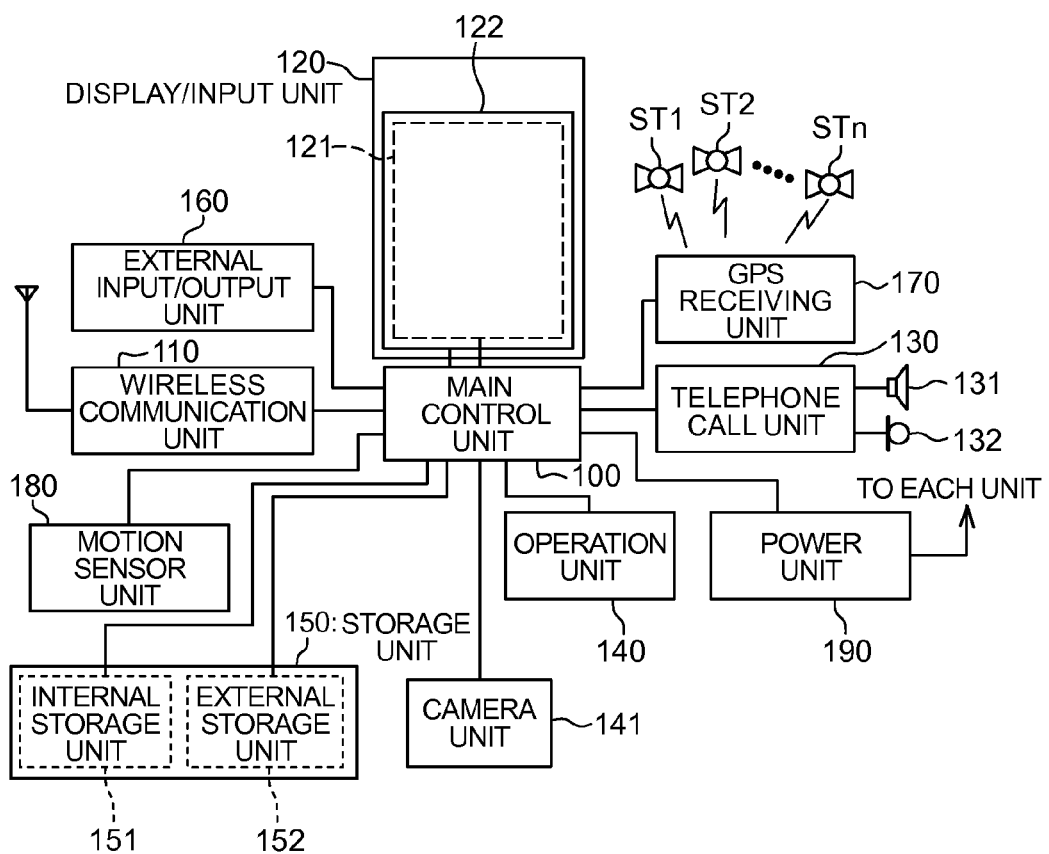

IMAGE PROCESSING DEVICE, IMAGE PROCESSING METHOD, AND RECORDING MEDIUM

CROSS-REFERENCE TO RELATED APPLICATIONS

This application is a Continuation of PCT International Application No. PCT/JP2013/080411 filed on Nov. 11, 2013, which claims priority under 35 U.S.C. §119(a) to Japanese Patent Application No. 2012-268182 filed on Dec. 7, 2012. Each of the above application(s) is hereby expressly incorporated by reference, in its entirety, into the present application.

BACKGROUND OF THE INVENTION

1. Field of the Invention

The present invention relates to an image processing device, an image processing method, and a recording medium, and particularly, relates to a technology for performing a color mixture correction depending on the presence or absence of abnormal oblique incident light.

2. Description of the Related Art

Generally, in a single-plate type imaging element including a mosaic color filter array, color mixture occurs due to the light leakage from adjacent pixels. When an image is generated by the digital signal process of RGB color signals greatly influenced by the color mixture, the color reproducibility (image quality) of the image is deteriorated, and it is difficult to accurately calculate the WB gain for the white balance (WB) correction from the RGB signals greatly influenced by the color mixture.

Further, in the image taking of a subject image by an imaging device such as a digital camera, when strong light enters a lens, in some cases, the light reflected by the surface of an image-taking lens or macro lens is complexly reflected in the interior of the lens or the interior of the camera, and the light advancing at an unintended angle is received by an imaging element. The abnormal oblique incident light to enter the imaging element from the unintended angle in this way causes a phenomenon such as a so-called ghost or flare, and degrades the image quality of a taken image.

In particular, when the angle of the abnormal oblique incident light is large, at least some of the abnormal oblique incident light enters the photodiode of a pixel adjacent to a color filter through which it passes. When the color filter through which the abnormal oblique incident light passes does not completely correspond to the photodiode to actually receive the light in this way, the abnormal oblique incident light causes the so-called color mixture phenomenon in a large way and brings the degradation of the color reproducibility of the taken image.

As a technique for reducing the influence of the color mixture, for example, PTL 1 (Japanese Patent Application Laid-Open No. 2005-333251) discloses an imaging device to suppress the occurrence of the color noise associated with the ghost. The imaging device detects the occurrence of the color noise associated with the ghost, using RAW data, and corrects the luminance level value of pixel data for which the occurrence of the color noise is detected.

Further, PTL 2 (Japanese Patent Application Laid-Open No. 2010-130583) discloses an imaging device to enhance the accuracy of a color mixture correction process for each pixel. The imaging device stores the color mixture property information indicating the property relevant to the signal component to be mixed from a peripheral pixel to a correction target pixel, determines a correction coefficient depending on the position in a pixel array of the correction target pixel and the color mixture property information, and corrects the signal read from the correction target pixel.

SUMMARY OF THE INVENTION

In many cases, a conventionally used imaging element has a relatively simple color filter array. For example, in the Bayer array, which is widely used, a total of 4 pixels of 2 pixels (horizontal direction)×2 pixels (vertical direction) configured by adjacently arranged "R pixel and G pixel" and "G pixel and B pixel" are repeatedly arranged in the horizontal direction and the vertical direction, and thereby, the color filter array is configured.

In the imaging element having such a simple color filter array, since the color mixture phenomenon is also relatively simple, it is possible to reduce the influence of the color mixture on the image data by a relatively simplified color mixture correction.

However, recently, an imaging element having a relatively complex color filter array has been also used. In some cases, there are multiple pixels that are pixels including color filters with the same color but that are different in the kind of adjacent pixels (color filters). For example, in the Bayer array, the pixel including a green color filter (G pixel) is classified into two kinds depending on the adjacent pixel type (color filter type). However, in a complex color filter array, it is classified into many multiple kinds (for example, ten or more kinds).

The influence of the color mixture varies depending on the kind of the adjacent pixel, and therefore, it is preferable to perform a color mixture correction corresponding to the kind of the adjacent pixel (color filter), even for a pixel including a color filter with the same color.

However, in the imaging element having a complex color filter array, the color mixture phenomenon is also complicated, and even in the case of vicinal same-color pixels that originally output identical or similar pixel data, the vicinal same-color pixels, by the color mixture phenomenon, sometimes output the pixel data that is different depending on the kind of the color filter of the adjacent pixel.

Particularly, when the light (abnormal oblique incident light) having a different incident angle from ordinary light, as exemplified by ghost light, enters the imaging element, an unnatural difference (same-color level difference) in pixel data occurs among the vicinal same-color pixels, due to the leakage of the ghost light having passed through the color filter of the adjacent pixel. Even in the case of same-color pixels, this level difference phenomenon is more complicated as the kind corresponding to the adjacent pixel type increases. In the imaging element having a complex color filter array, sometimes, the complex color mixture phenomenon having occurred due to the incidence of the ghost light cannot be sufficiently corrected by an ordinary color mixture correction. In particular, it is sometimes impossible to deal with the image data to be output from an imaging element having a basic array pattern configured by a pixel number of "3 pixels (horizontal direction)×3 pixels (vertical direction)" or more as the color filter array, by the ordinary color mixture correction.

Thus, when the abnormal oblique incident light such as the ghost light enters the imaging element, sometimes, the level difference phenomenon based on the "pixel data different depending on the adjacent pixel type" that is output from the vicinal same-color pixels occurs remarkably. Therefore, it is preferable to remove such a level difference as much as possible. Particularly, in the image data obtained in a state in which the ghost light enters the imaging element including a complex color filter array, it is desired to effectively remove the "level difference in pixel data among same-color pixels" caused by the ghost light.

On the other hand, even when the ghost light does not enter the imaging element, the light leakage from the adjacent pixel occurs and the color mixture phenomenon occurs, based on the pixel property of the imaging element (the property based on the arrangements, sizes, physical property values and the like of micro-lenses, color filters, photodiodes, wires and the like). Therefore, when the ghost light does not enter the imaging element, it is desired to reduce the color mixture due to the light leakage from the adjacent pixel, by a color mixture correction optimized for the pixel property of the imaging element.

The present invention, which has been made in view of the above-described circumstance, has an object to provide a technology for obtaining high-quality image data, by reducing the level difference in pixel data among same-color pixels that is caused by the abnormal oblique incident light such as the ghost light, for the pixel data of a pixel that the abnormal oblique incident light enters, and correcting the color mixture that is caused by the pixel property, for the pixel data of a pixel that the abnormal oblique incident light does not enter.

An aspect of the present invention relates to an image processing device including: an abnormal oblique incident light detection device which detects presence or absence of abnormal oblique incident light from image data that is output by an imaging element, the imaging element including multiple pixels, each of the multiple pixels including a color filter and a photodiode and outputting pixel data corresponding to a received light amount; a first color mixture correction device which performs a first color mixture correction for the pixel data of a correction target pixel, based on the pixel data of at least one adjacent pixel to the correction target pixel; a second color mixture correction device which performs a second color mixture correction for the pixel data of the correction target pixel, based on the pixel data of at least one peripheral pixel to the correction target pixel; and a color mixture correction decision device which decides by which of the first color mixture correction device and the second color mixture correction device the correction of the image data is performed, depending on a detection result of the abnormal oblique incident light detection device, in which the color mixture correction decision device decides that the correction of the pixel data of the correction target pixel is performed by the first color mixture correction device, when the abnormal oblique incident light detection device does not detect the abnormal oblique incident light, and decides that the correction of the pixel data of the correction target pixel is performed by the second color mixture correction device, when the abnormal oblique incident light detection device detects the abnormal oblique incident light.

According to this aspect, when the abnormal oblique incident light is not detected, the first color mixture correction based on the pixel data of the adjacent pixel to the correction target pixel is performed for the pixel data of the correction target pixel, and when the abnormal oblique incident light is detected, the second color mixture correction based on the pixel data of the peripheral pixel to the correction target pixel is performed.

Therefore, this aspect can be applied, particularly, even to an imaging element having a large array matrix size, and it is possible to solve the level difference among same-color pixels that occurs due to the influence of the leakage of the abnormal oblique incident light (the ghost light and the like) to the adjacent pixel, and to suppress the image quality degradation due to the abnormal oblique incident light.

The "adjacent pixel to the correction target pixel" herein is a pixel adjacent to the correction target pixel, and for example, the "adjacent pixel to the correction target pixel" can be a pixel including a color filter adjacent to the color filter of the correction target pixel. For example, eight pixels surrounding the correction target pixel (pixels adjacent to the correction target pixel with respect to a first direction, a second direction and directions having angles to the first direction and the second direction), or four pixels adjacent to the correction target pixel in the first direction and the second direction can be adopted as the "adjacent pixel to the correction target pixel". Further, the "peripheral pixel to the correction target pixel" is a pixel contained in a predetermined range from the correction target pixel, and may be adjacent to the correction target pixel or may be non-adjacent. Therefore, the "peripheral pixel to the correction target pixel" is a concept that can include the "adjacent pixel to the correction target pixel". Further, the range from the correction target pixel that is the basis for the "peripheral pixel to the correction target pixel" can be appropriately determined depending on the specific content of the second color mixture correction.

In the first color mixture correction, the pixel data of the correction target pixel can be corrected based on the pixel data of all or some of the adjacent pixels to the correction target pixel, and in the second color mixture correction, the pixel data of the correction target pixel can be corrected based on the pixel data of all or some of the peripheral pixels to the correction target pixel.

The color mixture when the abnormal oblique incident light does not enter is mainly due to the light leakage from the adjacent pixel, and therefore, the correction can be validly performed based on the pixel data of the adjacent pixel to the correction target pixel. On the other hand, the abnormal oblique incident light such as the ghost light enters a certain size range (multiple pixels) within the imaging element, and therefore, the influence of the color mixture caused by the abnormal oblique incident light can be effectively reduced by a color mixture correction resulting from comprehensively considering the pixel data of the peripheral pixel to the correction target pixel.

The "abnormal oblique incident light" herein is an unexpected light element that is different from the ordinary light composing a subject image and is a light element for which a color filter and a photodiode to be passed are not included in an identical pixel. For example, the abnormal oblique incident light can include a light element that brings a phenomenon such as a ghost and a flare. Generally, the ghost is the phenomenon that an optical image to be visually recognized as a certain shape is formed by the light (unnecessary light) having reached the image plane through an optical path different from the optical path of the original image-forming light (effective image-forming light), by the reflection on the lens surface or the imaging element surface. Further, the flare is the phenomenon that, when strong light enters an optical system, some of the incident light is reflected by the lens surface or the imaging element surface, reaches the image plane as unnecessary light, brings an image abnormality in that a certain shape is visually unrecognized, and causes the deterioration of the contrast or the bleeding of the light in the generated image.

Further, the "first direction" and the "second direction" are not particularly limited, and only need to be directions perpendicular to each other (including the case of being substantially perpendicular). For example, the "horizontal direction" and the "vertical direction" with respect to the subject at the time of the imaging by the imaging device may be adopted as the "first direction" and the "second direction", or directions having arbitrary angles to these "horizontal direction" and "vertical direction" may be adopted as the "first direction" and the "second direction". Therefore, when multiple pixels are arranged in a so-called "honeycomb type array" in which the multiple pixels are arrayed two-dimensionally in the horizontal direction and the vertical direction and are rotated at 45 degrees, the directions at 45 degrees to the "horizontal direction" and the "vertical direction" can be dealt with as the "first direction" and the "second direction".

Preferably, the second color mixture correction device should perform the second color mixture correction for the pixel data of the correction target pixel, using four or more pixels as the peripheral pixels, each of the four or more pixels including a color filter with the same color as the correction target pixel.

In this case, in the second color mixture correction, the pixel data of the pixels including the color filter with the same color as the correction target pixel is used, and the pixel data of the four or more pixels is used, allowing for an accurate color mixture correction.

Preferably, the peripheral pixels should be configured by pixels that are different from each other in the kind (adjacent pixel arrangement type) of the color filters of pixels adjacent to the peripheral pixel.

In this case, the second color mixture correction is performed based on the pixel data of the peripheral pixels that are different from each other in the kind of the color filters of the adjacent pixels, and it is possible to flexibly deal with various types of color mixtures that are caused by the abnormal oblique incident light.

Preferably, the multiple pixels of the imaging element should have a basic array pattern of M pixels×N pixels (where M is an integer of 3 or more and N is an integer of 3 or more), a plurality of the basic array patterns being arrayed in a first direction and in a second direction perpendicular to the first direction, and the peripheral pixel should be a pixel that is contained in a range of M pixels×N pixels containing the correction target pixel and that includes the color filter with the same color as the correction target pixel.

In this case, it is possible to perform the second color mixture correction in units of the basic array pattern, and it is possible to efficiently perform an accurate color mixture correction.

Preferably, the multiple pixels of the imaging element should have a basic array pattern of M pixels×N pixels (where M is an integer of 3 or more and N is an integer of 3 or more), a plurality of the basic array patterns being arrayed in a first direction and in a second direction perpendicular to the first direction, and the peripheral pixel should be a pixel that is contained in a larger range than a range of M pixels×N pixels containing the correction target pixel and that includes the color filter with the same color as the correction target pixel.

In this case, it is possible to perform the second color mixture correction based on the pixel data of the pixel that is contained in a larger range than the basic array pattern, and it is possible to perform an accurate color mixture correction based on a lot of pixel data.

Preferably, the second color mixture correction device should perform the second color mixture correction of the pixel data of the correction target pixel, based on a representative value that is derived from the pixel data of the correction target pixel and the peripheral pixel.

In this case, it is possible to simplify the second color mixture correction process based on the representative value that is derived from the pixel data of the correction target pixel and the peripheral pixel.

Preferably, the representative value should be an average value or a weighted average value of the pixel data of the correction target pixel and the peripheral pixel.

Preferably, the representative value should be a median value or a mode value of the pixel data of the correction target pixel and the peripheral pixel.

By adopting, as the "representative value", any of these the "average value", "weighted average value", "median value" and "mode value" of the pixel data of the correction target pixel and the peripheral pixel, it is possible to simplify the second color mixture correction and to effectively resolve the level difference in pixel data among same-color pixels.

Preferably, the multiple pixels should include a first-color pixel and a second-color pixel, the first-color pixel being configured by the color filter with a first color including at least one or more colors, the second-color pixel being configured by the color filter with a second color including at least two or more colors other than the first color, the first-color pixel should include the color filter with a color that is higher than the color filter of the second-color pixel in contribution ratio for obtaining a luminance signal, and the correction target pixel should be the first-color pixel.

The luminance is a factor that greatly affects the image quality. In this aspect, by adopting, as the correction target pixel, the first-color pixel that is high in the contribution ratio for obtaining the luminance signal, it is possible to effectively improve the quality of an image to be obtained.

Preferably, the first-color pixel should include a green, transparent or white color filter.

In this case, the correction target pixel is a pixel including a green, transparent or white color filter, which is higher than other colors in the contribution ratio for obtaining the luminance signal, and therefore, it is possible to effectively improve the quality of an image to be obtained.

Here, the transparent color filter and the white color filter are filters that transmit all of the light in the red wavelength region, the light in the blue wavelength region and the light in the green wavelength region. The transparent color filter has a relatively high light transmittance (for example, a light transmittance of 70% or more), and the white color filter has a lower light transmittance than the transparent color filter.

The multiple pixels of the imaging element may have a basic array pattern of M pixels×N pixels (where M is an integer of 3 or more and N is an integer of 3 or more), a plurality of the basic array patterns being arrayed in a first direction and in a second direction perpendicular to the first direction, and the basic array pattern may include at least five of the first-color pixels that are different from each other in the kind of the color filters of the adjacent pixels.

Particularly, when the basic array pattern includes five or more first-color pixels that are different from each other in the kind of the color filters of the adjacent pixels as this aspect, the color filter array is complicated, and the effectiveness of the color mixture correction according to the present invention is high.

For example, as for the G (green) pixel in the Bayer array, there are two kinds as the kind depending on the adjacent pixel arrangement type, and there is one pattern as the level difference (same-color level difference) among same-color G pixels due to color mixture, resulting in an easy color mixture correction. On the other hand, in a basic array pattern of M pixels×N pixels, a complex color filter array including five or more first-color pixels (for example, G1 to G5) that are different from each other in the kind of the color filters of the adjacent pixels complicates the level difference among same-color pixels, and greatly influences the image quality degradation. According to this aspect, the basic array pattern includes at least five first-color pixels that are different from each other in the kind of the color filters of the adjacent pixels, it is possible to effectively perform the first color mixture correction and the second color mixture correction, even for the complex color filter array, and to suppress the image quality degradation.

Another aspect of the present invention relates to an image processing method including: a step of detecting presence or absence of abnormal oblique incident light from image data that is output by an imaging element, the imaging element including multiple pixels, each of the multiple pixels including a color filter and a photodiode and outputting pixel data corresponding to a received light amount; a step of performing a first color mixture correction of the pixel data of a correction target pixel, based on the pixel data of at least one adjacent pixel to the correction target pixel; a step of performing a second color mixture correction of the pixel data of the correction target pixel, based on the pixel data of at least one peripheral pixel to the correction target pixel; and a step of deciding by which of the first color mixture correction and the second color mixture correction the correction of the image data is performed, depending on a detection result of the step of detecting the presence or absence of the abnormal oblique incident light, in which in the step of deciding by which color mixture correction the correction of the image data is performed, the decision is performed such that the correction of the pixel data of the correction target pixel is performed by the first color mixture correction when the abnormal oblique incident light is not detected in the step of detecting the presence or absence of the abnormal oblique incident light, and the correction of the pixel data of the correction target pixel is performed by the second color mixture correction when the abnormal oblique incident light is detected in the step of detecting the presence or absence of the abnormal oblique incident light.

Another aspect of the present invention relates to a program for making a computer execute: a procedure of detecting presence or absence of abnormal oblique incident light from image data that is output by an imaging element, the imaging element including multiple pixels, each of the multiple pixels including a color filter and a photodiode and outputting pixel data corresponding to a received light amount; a procedure of performing a first color mixture correction of the pixel data of a correction target pixel, based on the pixel data of at least one adjacent pixel to the correction target pixel; a procedure of performing a second color mixture correction of the pixel data of the correction target pixel, based on the pixel data of at least one peripheral pixel to the correction target pixel; and a procedure of deciding by which of the first color mixture correction and the second color mixture correction the correction of the image data is performed, depending on a detection result of the procedure of detecting presence or absence of the abnormal oblique incident light, in which in the procedure of deciding by which color mixture correction the correction of the image data is performed, the decision is performed such that the correction of the pixel data of the correction target pixel is performed by the first color mixture correction when the abnormal oblique incident light is not detected in the procedure of detecting the presence or absence of the abnormal oblique incident light, and the correction of the pixel data of the correction target pixel is performed by the second color mixture correction when the abnormal oblique incident light is detected in the procedure of detecting the presence or absence of the abnormal oblique incident light.

Another aspect of the present invention relates to a non-transitory recording medium having a computer-readable code of a program recorded therein, the program making a computer execute: a procedure of detecting presence or absence of abnormal oblique incident light from image data that is output by an imaging element, the imaging element including multiple pixels, each of the multiple pixels including a color filter and a photodiode and outputting pixel data corresponding to a received light amount; a procedure of performing a first color mixture correction of the pixel data of a correction target pixel, based on the pixel data of at least one adjacent pixel to the correction target pixel; a procedure of performing a second color mixture correction of the pixel data of the correction target pixel, based on the pixel data of at least one peripheral pixel to the correction target pixel; and a procedure of deciding by which of the first color mixture correction and the second color mixture correction the correction of the image data is performed, depending on a detection result of the procedure of detecting presence or absence of the abnormal oblique incident light, in which in the procedure of deciding by which color mixture correction the correction of the image data is performed, the decision is performed such that the correction of the pixel data of the correction target pixel is performed by the first color mixture correction when the abnormal oblique incident light is not detected in the procedure of detecting the presence or absence of the abnormal oblique incident light, and the correction of the pixel data of the correction target pixel is performed by the second color mixture correction when the abnormal oblique incident light is detected in the procedure of detecting the presence or absence of the abnormal oblique incident light.

According to the present invention, when the abnormal oblique incident light is not detected, the first color mixture correction based on the pixel data of the adjacent pixel to the correction target pixel is performed for the pixel data of the correction target pixel, and when the abnormal oblique incident light is detected, the second color mixture correction based on the pixel data of the peripheral pixel to the correction target pixel is performed.

Therefore, for the pixel data of a pixel that the abnormal oblique incident light such as the ghost light enters, it is possible to perform the second color mixture correction based on the pixel data of the peripheral pixel to the correction target pixel, so as to reduce the level difference in pixel data among same-color pixels that is caused by the abnormal oblique incident light. On the other hand, for the pixel data of a pixel that the abnormal oblique incident light does not enter, it is possible to perform the first color mixture correction based on the pixel data of the adjacent pixel of the correction target pixel, so as to reduce the influence of the color mixture that is caused by the pixel property.

Thus, according to the present invention, it is possible to obtain high-quality image data by the flexible color mixture correction process depending on the color mixture factor, and to validly suppress the "level difference in pixel data among same-color pixels that is caused by the abnormal oblique incident light", which cannot be corrected by a simple color mixture correction.

BRIEF DESCRIPTION OF THE DRAWINGS

FIG. 10 is a diagram showing another example of the basic array pattern of the color filter array.

FIG. 11 is a diagram showing another example of the basic array pattern of the color filter array.

FIG. 12 is a diagram showing another example of the basic array pattern of the color filter array.

FIG. 13A is a diagram showing another example of the basic array pattern of the color filter array.

FIG. 13B is a diagram showing another example of the basic array pattern of the color filter array.

FIG. 35 is a block diagram showing the configuration of the smart phone.

DETAILED DESCRIPTION OF THE EMBODIMENTS

Embodiments of the present invention are described with reference to the drawings. First, the basic configuration of a digital camera (imaging device) that is an application example of the present invention is described, and thereafter, techniques for color mixture correction are described.

Figure 1:
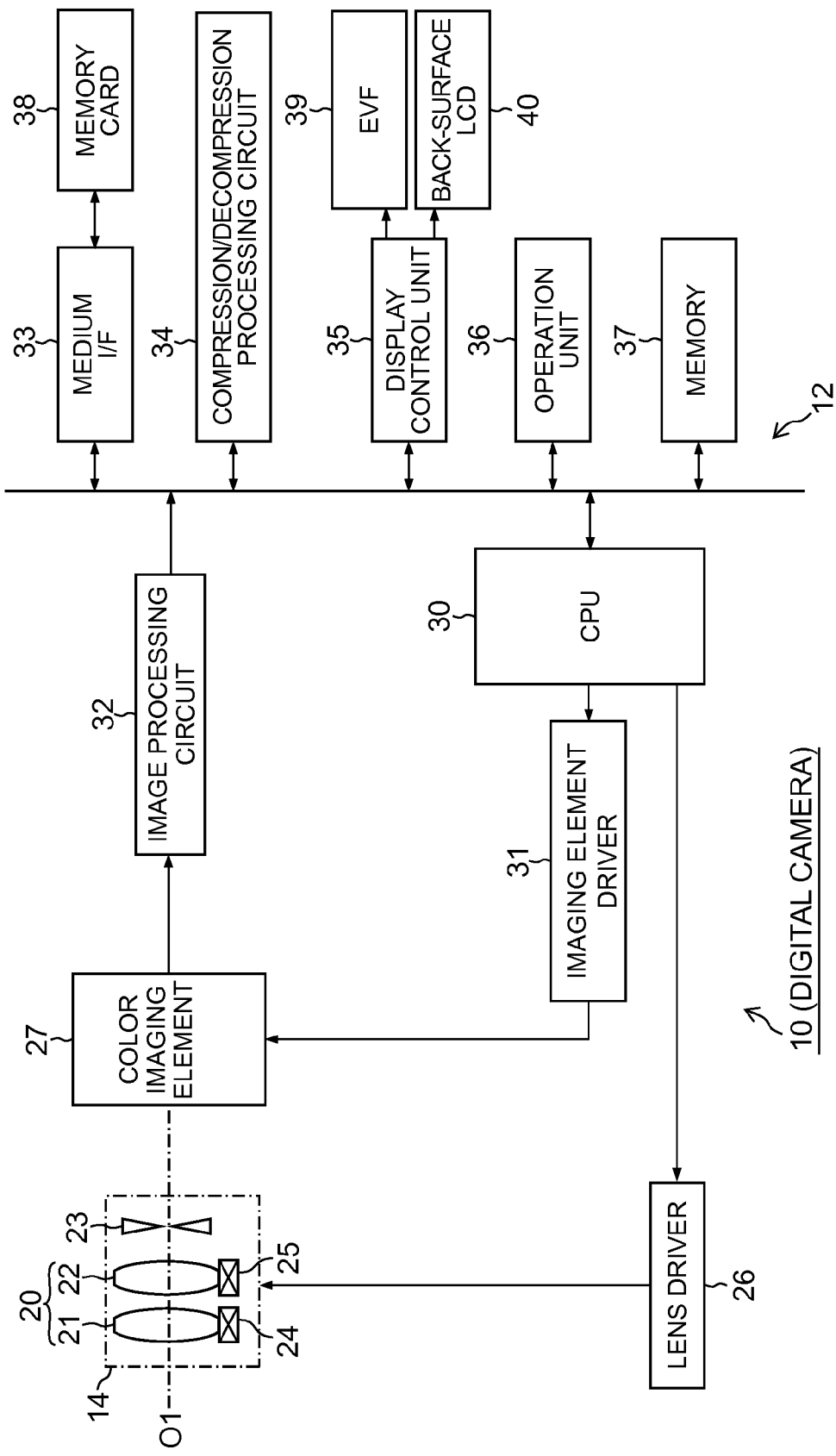
FIG. 1 is a block diagram showing an exemplary configuration of a digital camera.

FIG. 1 is a block diagram showing an exemplary configuration of a digital camera 10. Here, in the example, an example in which each unit other than a lens unit 14 in the configuration shown in FIG. 1 is provided in a camera body 12 is described, but each unit can be provided in the lens unit 14, as necessary.

The digital camera (imaging device) 10 is provided with the camera body 12, and the lens unit 14 that is interchangeably attached to the front surface of the camera body 12.

The lens unit 14 is provided with an image-taking optical system 20 including a zoom lens 21 and a focus lens 22, a mechanical shutter 23 and the like. The zoom lens 21 and the focus lens 22 are driven by a zoom mechanism 24 and a focus mechanism 25, respectively, and are moved back and forth along an optical axis O1 of the image-taking optical system 20. The zoom mechanism 24 and the focus mechanism 25 are constituted by gears, motors and the like.

The mechanical shutter 23 includes a moving part (the illustration is omitted) that moves between a closing position for blocking the incidence of subject light to a color imaging element 27 and an opening position for allowing the incidence of the subject light. The moving part is moved to the opening position/the closing position, and thereby, an optical path from the image-taking optical system 20 to the color imaging element 27 is opened/shut. Further, the mechanical shutter 23 includes a diaphragm for controlling the light quantity of the subject light to enter the color imaging element 27. The mechanical shutter 23, the zoom mechanism 24 and the focus mechanism 25 are driven and controlled by a CPU 30 through a lens driver 26.

The CPU 30 provided in the camera body 12, based on a control signal from an operation unit 36, sequentially executes a variety of programs and data read from a memory 37 and integrally controls each unit of the digital camera 10. A RAM region of the memory 37 functions as a work memory for the process execution by the CPU 30 and a temporary storage location of a variety of data.

The operation unit 36 includes a button, a key, a touch panel and a similar one thereto that are operated by a user. For example, the operation unit 36 can include a power button, a shutter button, a focus mode switching lever, a focus ring, a mode switching button, a cross selection key, an execution key, a back button and the like that are provided in the camera body 12 and are operated by a user.

The color imaging element 27 converts the subject light having passed through the image-taking optical system 20 and the mechanical shutter 23, into an electric output signal, and outputs it. The color imaging element 27 has a single-plate type pixel array in which many pixels are apposed in the horizontal direction (first direction) and the vertical direction (second direction) perpendicular to the horizontal direction, and can adopt an arbitrary scheme such as a CCD (Charge Coupled Device) and a CMOS (Complementary Metal Oxide Semiconductor). In the following, an example in which the multiple pixels constituting the color imaging element 27 is configured by a CMOS is described.

Each pixel constituting the color imaging element 27, which is described in detail later, includes a micro-lens to increase the light condensation ratio, a color filter of RGB or the like, a photodiode (photoelectric conversion element) to receive the light transmitted by the micro-lens and the color filter and to output pixel data.

An imaging element driver 31 drives and controls the color imaging element 27 under the control by the CPU 30, and outputs an imaging signal (image data) from the pixel of the color imaging element 27 to an image processing circuit 32.

The image processing circuit 32 (image processing device) performs various image processes such as a gradation conversion, a white balance correction and a γ correction process, for the imaging signal (image data) output from the color imaging element 27, and generates taken image data. Particularly, the image processing circuit 32 according to the example, which is described in detail later, includes a color mixture decision correction unit to correct the color mixture that occurs between adjacent pixels.

When the push-down operation of the shutter button is performed by a user, a compression/decompression processing circuit 34 performs a compression process for the taken image data stored in a VRAM region of the memory 37. Here, a RAW data acquisition mode also allows the compression/decompression processing circuit 34 not to perform the compression process. Further, the compression/decompression processing circuit 34 performs a compression/decompression process for the compressed image data to be obtained from a memory card 38 through a medium interface 33. The medium interface 33 performs the recording, reading and others of the taken image data to the memory card 38.

In an image taking mode, a display control unit 35 performs such a control that a through image (live view image) generated by the image processing circuit 32 is displayed on at least one of an EVF (electric viewfinder) 39 and a back-surface LCD (back-surface liquid crystal) 40. Further, in an image playback mode, the display control unit 35 outputs the taken image data decompressed by the compression/decompression processing circuit 34, to the back-surface LCD 40 (and/or the EVF 39).

In the digital camera 10 (the camera body 12), other processing circuits and the like besides the above may be provided, and for example, an AF detection circuit for automatic focus and an AE detection circuit for automatic exposure adjustment are provided. The CPU 30 executes an AF process by driving a focus lens 22 through the lens driver 26 and the focus mechanism 25 based on the detection result of the AF detection circuit, and executes an AE process by driving the mechanical shutter 23 through the lens driver 26 based on the detection result of the AE detection circuit.

<Color Filter Array>

Figure 2A:
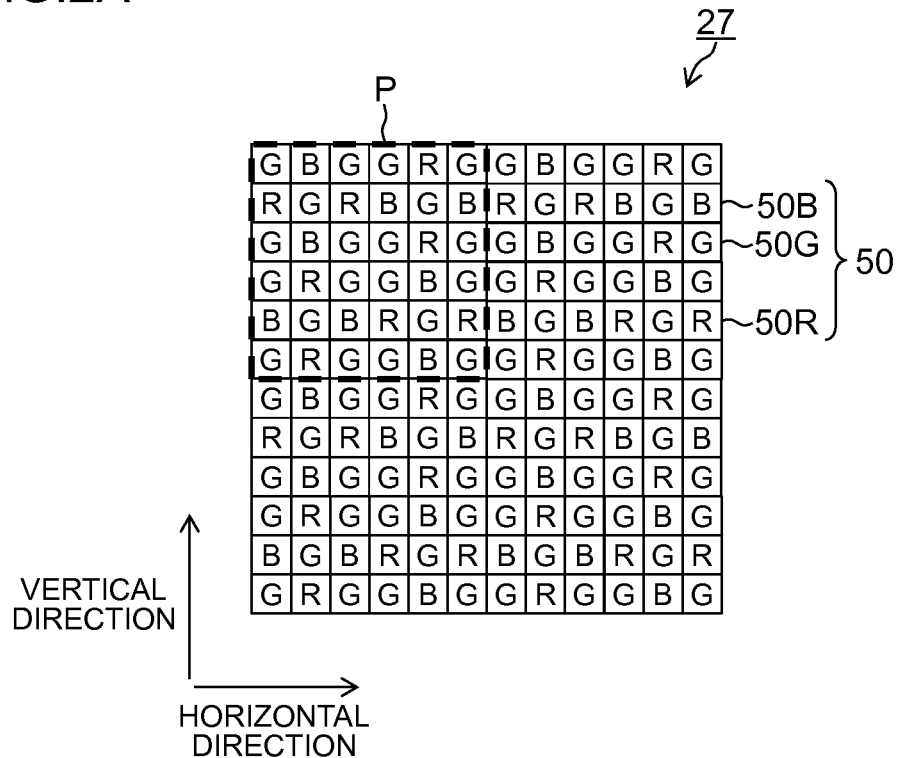
FIG. 2A is a plan view showing an exemplary basic array pattern of color filters (pixels) of a color imaging element, and shows a state in which four basic array patterns P are arrayed in the horizontal direction and the vertical direction.
Figure 2B:
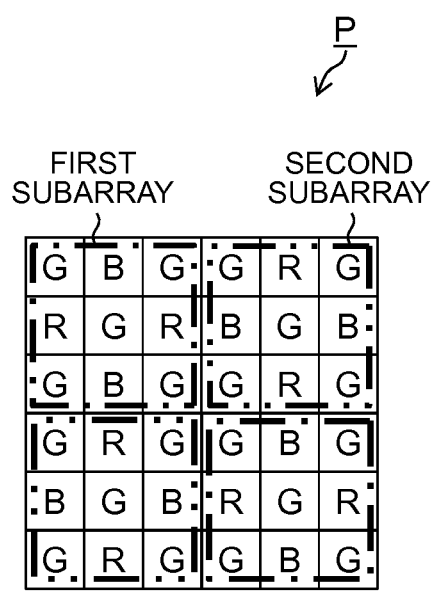
FIG. 2B is a plan view showing the exemplary basic array pattern of the color filters (pixels) of the color imaging element, and is an enlarged view of one basic array pattern P.

FIGS. 2A and 2B are plan views showing exemplary basic array patterns of color filters (pixels) of the color imaging element 27. FIG. 2A shows a state in which a total of four basic array patterns P are arrayed in the horizontal direction and the vertical direction, and FIG. 2B is an enlarged view of one basic array pattern P. Here, in FIGS. 2A and 2B, reference character "R" designates a red filter (R pixel), reference character "G" designates a green filter (G pixel), and reference character "B" designates a blue filter (B pixel).

The color filters of the color imaging element 27 according to the example have the basic array pattern P that is a square array pattern corresponding to M×N (6×6) pixels, and a plurality of the basic array patterns P are repeatedly arrayed in the horizontal direction and the vertical direction so that the multiple pixels of the color imaging element 27 are configured. Therefore, when performing the image process and others of RAW data (mosaic image) of RGB read from the color imaging element 27, it is possible to perform the process in accordance with the repeat pattern on the basis of the basic array pattern P.

Each basic array pattern P is configured such that a first subarray of 3 pixels (horizontal direction)×3 pixels (vertical direction) and a second subarray of 3 pixels (horizontal direction)×3 pixels (vertical direction) shown in FIG. 2B are alternately arrayed in the horizontal direction and the vertical direction.

In each of the first subarray and the second subarray, G filters are arranged at the four corners and the center so that the G filters are arranged on both diagonal lines. In the first subarray, R filters are provided in the horizontal direction across the central G filter, and B filters are provided in the vertical direction across the central G filter. On the other hand, in the second subarray, B filters are provided in the horizontal direction across the central G filter, and R filters are provided in the vertical direction across the central G filter. Therefore, between the first subarray and the second subarray, the positional relation of the R filters and the B filters is reversed, but the arrangement of the G filters is common.

Further, since the first subarray and the second subarray are alternately arranged in the horizontal direction and the vertical direction, the G filters at the four corners of the first subarray and the second subarray constitute G filter groups having a square array corresponding to 2 pixels (horizontal direction)×2 pixels (vertical direction).

In the color filter array, as is clear from FIG. 2A, one or more G filters, which correspond to a general most-contributing color for obtaining the luminance signal (in the embodiment, the G color), are arranged on each of the horizontal, vertical, oblique right-upward and oblique left-upward lines of the color filter array. According to the color filter array, since the G filter corresponding to the luminance pixel is arranged on each of the horizontal, vertical and oblique (NE, NW) lines of the color filter array, it is possible to enhance the reproducibility of the demosaic process (synchronization process) at a high frequency region, regardless of the high frequency direction. Here, the demosaic process or demosaicing process is a process of calculating, for each pixel, all color information from a mosaic image corresponding to the color filter array of a single-plate type color imaging element, and is referred to as the synchronization process also (hereinafter, the same goes in the specification). For example, in the case of the imaging element having three color filters of RGB, it is a process of calculating, for each pixel, the color information for all of RGB from a mosaic image of RGB.

Here, for example, when the unit color filter (unit pixel) has a square shape, the oblique right-upward and oblique right-downward directions are the directions at 45° to the horizontal direction and the vertical direction. Further, when the unit color filter has a rectangular shape, the oblique right-upward and oblique right-downward directions are the directions of the diagonal lines of the rectangular shape, and the angles of the oblique right-upward and oblique right-downward directions to the horizontal direction and the vertical direction can vary depending on the lengths of the long side and short side of the rectangular shape.

In the color filter array shown in FIGS. 2A and 2B, one or more R filters and B filters, which correspond to two or more different colors (in the example, red (R) and blue (B)) other than the above G color, are both arranged on each of the horizontal and vertical lines of the basic array pattern P. Since the R filters and the B filters are arranged on each of the horizontal and vertical lines of the color filter array in this way, it is possible to reduce the occurrence of false color (color moire), and it is possible to omit an optical low-pass filter for suppressing the occurrence of false color. Here, even when the optical low-pass filter is arranged, if the color filter array according to the example is adopted, it is possible to avoid impairing the resolution, by using an optical low-pass filter that is weak in the action to cut high frequency components for preventing the occurrence of false color.

Further, in the basic array pattern P, the pixel numbers of the R pixel, G pixel and B pixel corresponding to the R filter, G filter and B filter are 8 pixels, 20 pixels and 8 pixels, respectively. That is, the ratio of the pixel numbers of the R pixel, G pixel and B pixel is 2:5:2, and the ratio of the pixel number of the G pixel, which most contributes to the obtainment of the luminance signal, is higher than the ratios of the pixel numbers of the R pixel and B pixel. Since the pixel number of the G pixel and the pixel numbers of the R pixel and B pixel are different in ratio and particularly the ratio of the pixel number of the G pixel, which most contributes to the obtainment of the luminance signal, is higher than the ratio of the pixel numbers of the R pixel and B pixel in this way, it is possible to suppress the aliasing in the demosaic process (synchronization process) and to improve the high frequency reproducibility.

Hereinafter, the color filter array (pixel array) shown in FIGS. 2A and 2B is referred to as the "X-Trans (R)" also.
<Image Process>

Figure 3:
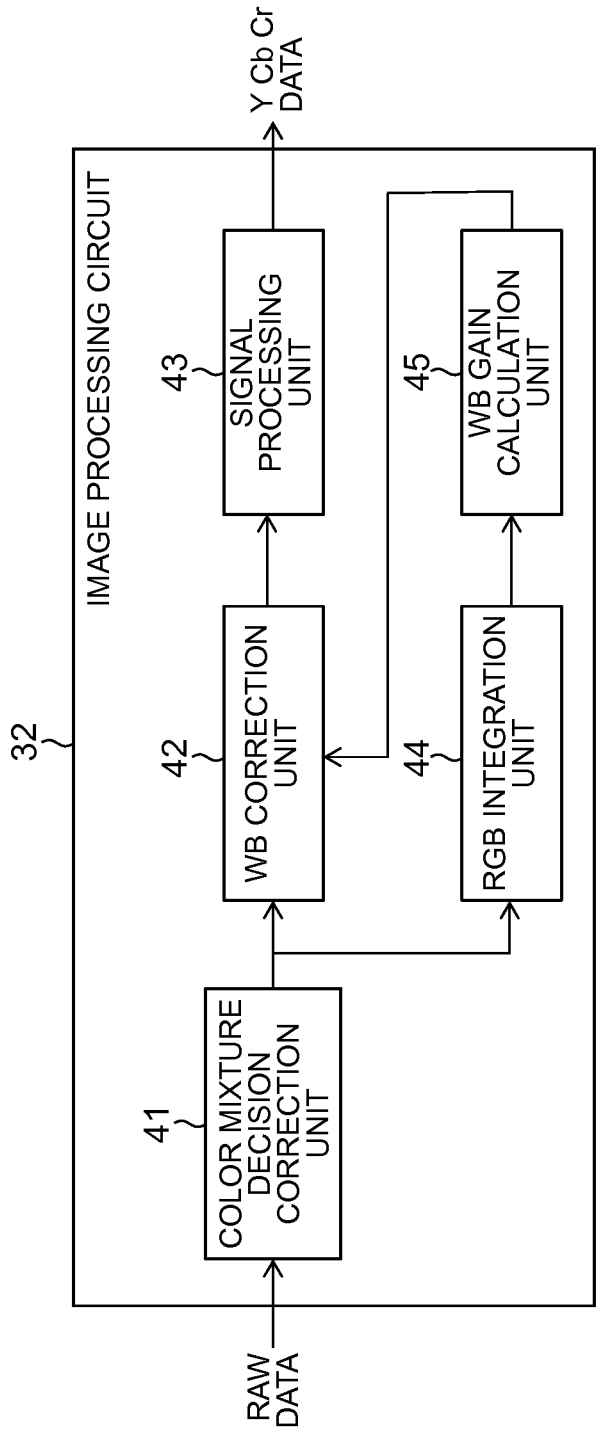
FIG. 3 is a functional block diagram of an image processing circuit.

FIG. 3 is a functional block diagram of the image processing circuit 32 (image processing device; see FIG. 1).

The image processing circuit 32 is constituted mainly by a color mixture decision correction unit 41, a white balance correction unit (WB correction unit) 42, a signal processing unit 43 to perform signal processes such as a gamma correction, a demosaic process and a RGB/YC conversion, an RGB integration unit 44 and a white balance gain calculation unit (WB gain calculation unit) 45.

To the image processing circuit 32, RAW data (mosaic image: RGB color signals) is input. On this occasion, the RAW data output from the color imaging element 27 may be directly input to the image processing circuit 32, or the RAW data output from the color imaging element 27 may be temporarily stored in a memory (the memory 37 in FIG. 1, or the like) and the RAW data may be input from the memory to the image processing circuit 32.

The RGB color signals of the RAW data are dot-sequentially input to the color mixture decision correction unit 41. The color mixture decision correction unit 41 removes color mixture components from adjacent pixels to be included in the color signal of a target pixel for color mixture correction that is dot-sequentially input. The detail of the color mixture correction process in the color mixture decision correction unit 41 is described later.

The color signal of each pixel of the mosaic image in which the color mixture component has been removed by the color mixture decision correction unit 41 is input to the WB correction unit 42 and the RGB integration unit 44.

The RGB integration unit 44 calculates the integrated average value for each color signal of RGB, for each of the division regions resulting from dividing one screen into 8×8, 16×16 or the like, and calculates the color information that is the ratio (R/G, B/G) of the integrated average value for each of RGB. For example, when one screen is divided into 64 division regions of 8×8, the RGB integration unit 44 calculates 64 pieces of color information (R/G, B/G).

The WB gain calculation unit 45 calculates the WB gain based on the color information (R/G, B/G) for each division region that is input from the RGB integration unit 44. Specifically, the centroid position of the distribution on the color space of the coordinate with R/G and B/G axes is calculated for the color information about each of the 64 division regions, and the color temperature of the ambient light is estimated from the color information indicated by the centroid position. Here, instead of the color temperature, the light source type at the time of image taking may be estimated by determining a light source type having the color information indicated by the centroid position, for example, a blue sky, a shade, a fine weather, a fluorescent lamp (daylight color, natural white color, white color, warm white color), a tungsten lamp, a low-tungsten lamp or the like (Japanese Patent Application Laid-Open No. 2007-53499), and the color temperature may be estimated from the estimated light source type.

In the WB gain calculation unit 45, a WB gain for performing a proper white balance correction corresponding to the color temperature or light source type of the ambient light is previously prepared (stored and held) for each of RGB or for each of RB. The WB gain calculation unit 45 reads a corresponding WB gain for each of RGB or for each of RB, based on the estimated color temperature or light source type of the ambient light, and outputs the read WB gain to the WB correction unit 42.

The WB correction unit 42 multiplies each of the R, G and B color signals input from the color mixture decision correction unit 41, by the WB gain for each color input from the WB gain calculation unit 45, and thereby, performs the white balance correction.

The R, G and B color signals output from the WB correction unit 42 are input to the signal processing unit 43. The signal processing unit 43 performs signal processes such as the gamma correction, the demosaic process (synchronization process) of interpolating spatial gaps of the R, G and B color signals associated with the color filter array of the color imaging element 27 and converting the R, G and B color signals into a synchronous system, and the RGB/YC conversion of converting the synchronized R, G and B color signal into a luminance signal Y and color difference signals Cr, Cb, and outputs the luminance signal Y and the color difference signals Cr, Cb after the signal process.

The luminance data Y and the color difference data Cr, Cb output from the image processing circuit 32 are recorded in an internal memory (the memory 37) or an external memory (the memory card 38), after the compression process.

<Color Mixture Phenomenon>

Figure 4A:
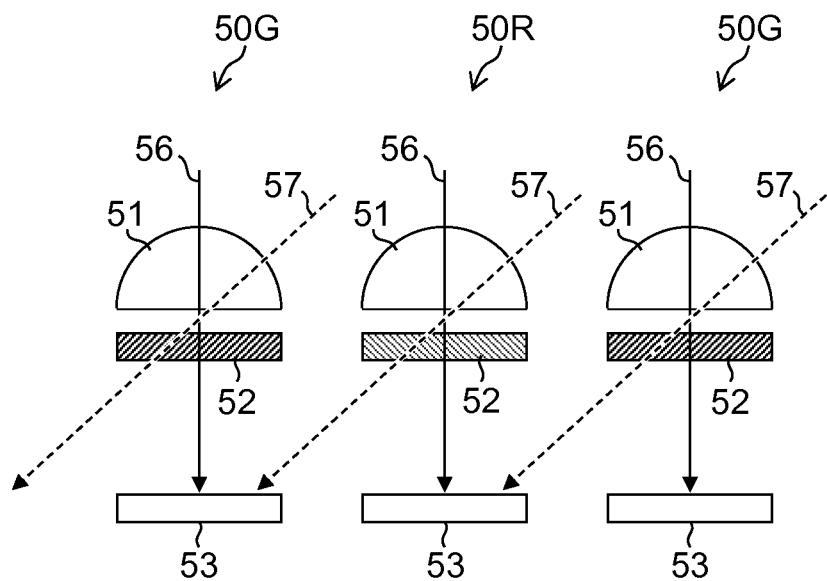
FIG. 4A is a cross-section view for explaining the mechanism of a color mixture phenomenon caused by abnormal oblique incident light (ghost light or the like), and shows an exemplary adjacent arrangement of a G pixel, an R pixel and a G pixel.
Figure 4B:
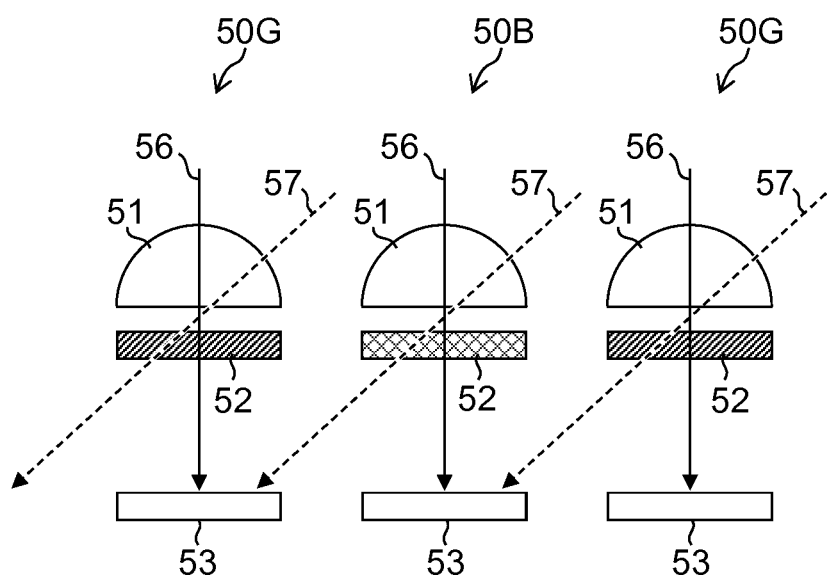
FIG. 4B is a cross-section view for explaining the mechanism of a color mixture phenomenon caused by abnormal oblique incident light (ghost light or the like), and shows an exemplary adjacent arrangement of a G pixel, a B pixel and a G pixel.

FIGS. 4A and 4B are cross-section views for explaining the mechanism of a color mixture phenomenon caused by abnormal oblique incident light (ghost light or the like). FIG. 4A shows an exemplary adjacent arrangement of a G pixel, an R pixel and a G pixel, and FIG. 4B shows an exemplary adjacent arrangement of a G pixel, a B pixel and a G pixel.

Multiple pixels 50 constituting the color imaging element 27 according to the example include G (green) pixels 50G constituted by green (first color) color filters (first-color pixels), as well as R (red) pixels 50R constituted by red color filters and B (blue) pixels 50B constituted by blue color filters (second-color pixels). The G pixel 50G is higher than the R pixel 50R and the B pixel 50B in the contribution ratio for obtaining the luminance signal, and the luminance data (luminance signal) can be obtained by Y (luminance)=(0.3×R pixel data+0.6×G pixel data+0.1×B pixel data), for example.

Each of the G pixel 50G, the R pixel 50R and the B pixel 50B includes a micro-lens 51, a color filter 52 and a photodiode 53 that are sequentially provided in the advance direction of the subject light, and outputs the pixel data corresponding to the received light amount of the photodiode 53. Ordinary light 56 composing the subject light is condensed by the micro-lens 51, passes through the color filter 52, and enters the photodiode 53. Ordinarily, the color filter 52 to be passed by the ordinary light 56 and the photodiode 53 to receive the light match.

On the other hand, abnormal oblique incident light 57 goes into the pixels at a different angle from the ordinary light 56, and the abnormal oblique incident light 57 having passed through the color filter 52 of a certain pixel is received by the photodiode 53 of the adjacent pixel. Thus, the color filter 52 to be passed by the abnormal oblique incident light 57 and the photodiode 53 to receive the light do not match, and the photodiode 53 to receive the abnormal oblique incident light 57 outputs the pixel data corresponding to the received light amount of not only the ordinary light 56 but also the abnormal oblique incident light 57. Therefore, the output pixel data from the photodiode 53 having received the abnormal oblique incident light 57 is greater than the output pixel data from the photodiode 53 having not received the abnormal oblique incident light 57, resulting in the occurrence of the level difference in pixel data among same-color pixels.

Further, even when the abnormal oblique incident light 57 does not enter the color imaging element 27 and only the ordinary light 56 enters it, some of the ordinary light 56 leaks into the adjacent pixel and causes the color mixture phenomenon, depending on the pixel property (the property based on the arrangements, sizes, physical property values and the like of the micro-lens, the color filter, the photodiode, wires and the like).

In the following, an example in which a color mixture correction of avoiding the level difference in pixel data among same-color pixels is performed for the pixel data to be output from a pixel that the abnormal oblique incident light 57 enters, and a color mixture correction of reducing the color mixture depending on the pixel property is performed for the pixel data to be output from a pixel that the abnormal oblique incident light 57 does not enter is described.

Here, in the following example, of the R pixel 50R, G pixel 50G and B pixel 50B constituting the color imaging element 27, the G pixel (first-color pixel) 50G, which is highest in the contribution ratio for obtaining the luminance signal, is adopted as the correction target pixel for color mixture correction.

First Embodiment

Figure 5:
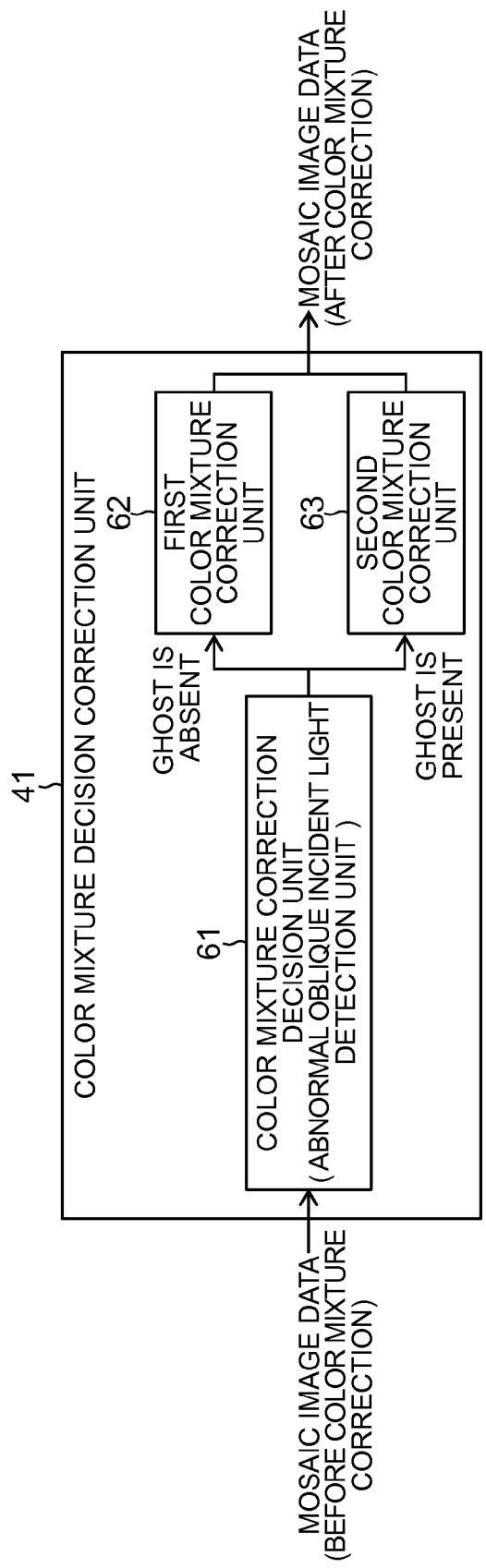
FIG. 5 is a functional block diagram of a color mixture decision correction unit.

FIG. 5 is a functional block diagram of the color mixture decision correction unit 41 (see FIG. 3).

The color mixture decision correction unit 41 includes a color mixture correction decision unit 61, and a first color mixture correction unit (a first color mixture correction device) 62 and a second color mixture correction unit (a second color mixture correction device) 63 that are connected with the color mixture correction decision unit 61.

The color mixture correction decision unit 61 acts as an abnormal oblique incident light detection unit (an abnormal oblique incident light detection device), and detects the presence or absence of the incidence of the abnormal oblique incident light (the ghost light or the light), from the image data that is output by the color imaging element 27. Here, the specific technique for detecting the presence or absence of the incidence of the abnormal oblique incident light by the color mixture correction decision unit 61 is not particularly limited, and an example thereof is described later.

Further, the color mixture correction decision unit 61 acts as the color mixture correction decision unit (a color mixture correction decision device), and decides by which of the first color mixture correction device and the second color mixture correction device the color mixture correction of the image data (pixel data) is performed, depending on the detection result about the presence or absence of the abnormal oblique incident light. Specifically, for the pixel data of a pixel for which the incidence of the abnormal oblique incident light is not detected, the color mixture correction decision unit 61 decides that the color mixture correction of the pixel data of the correction target pixel is performed by the first color mixture correction unit 62, and sends the image data (pixel data) to the first color mixture correction unit 62. On the other hand, for the pixel data of a pixel (G pixel) for which the incidence of the abnormal oblique incident light is detected, the color mixture correction decision unit 61 decides that the correction of the pixel data of the correction target pixel is performed by the second color mixture correction unit 63, and sends the image data (pixel data) to the second color mixture correction unit 63.

Here, in the example of FIG. 5, the color mixture correction decision unit 61 bears the functions of the abnormal oblique incident light detection unit and the color mixture correction decision unit, but the abnormal oblique incident light detection unit and the color mixture correction decision unit can be actualized by separately provided circuits and the like.

The first color mixture correction unit 62 performs a color mixture correction A (first color mixture correction) for the pixel data of the correction target pixel, based on the pixel data of the adjacent pixel to the correction target pixel.

As the color mixture correction algorithm in the first color mixture correction unit 62, an arbitrary algorithm can be adopted. For example, the first color mixture correction unit 62 calculates the color mixture amount from the upper, lower, left and right (horizontal and vertical) adjacent pixels to the correction target pixel, and subtracts the calculated color mixture amount from the adjacent pixels, from the pixel data (original data) of the correction target pixel, and thereby, the color mixture correction A can be performed. As the calculation of the color mixture amount, an arbitrary calculation technique can be adopted. For example, the calculation of the color mixture amount is performed by the integration between the pixel data of the adjacent pixel and the color mixture ratio (adjacent pixel data value×color mixture ratio). The color mixture ratio can be appropriately determined based on various color mixture factors. For example, it is possible to have a correction pattern for each of (1) the pixel-sharing position of the own pixel (correction target pixel), (2) the upward, downward, leftward and rightward color mixture correction directions, and (3) the color of the pixel to be used for color mixture correction. The correction pattern (method) is set individually for each position of the correction target pixel, and thereby, it is possible to enhance the accuracy of the color mixture correction A.

Thus, the specific technique of the color mixture correction A by the first color mixture correction unit 62 is not particularly limited, and an example thereof is described later.

The second color mixture correction unit 63 performs a color mixture correction B (second color mixture correction) for the pixel data of the correction target pixel, based on the pixel data of the peripheral pixel to the correction target pixel.

The second color mixture correction unit 63 performs the color mixture correction B of the pixel data of the correction target pixel, using four or more pixels (G pixels) including the color filters with the same color as the correction target pixel (G pixel), as the peripheral pixels. Specifically, the second color mixture correction unit 63 performs the color mixture correction B of the pixel data of the correction target pixel, based on a representative value that is derived from the pixel data of the correction target pixel and the peripheral pixels.

The representative value may be the average value or weighted average value of the pixel data of the correction target pixel and the peripheral pixels, or may be the median value or mode value of the pixel data of the correction target pixel and the peripheral pixels. In the following, an example in which the color mixture correction B of the pixel data of the correction target pixel is performed based on the average value of the pixel value of the correction target pixel and the peripheral pixels is described.

In the color mixture correction B according to the example, the peripheral pixels to the correction target pixel (G pixel) are pixels contained in a range of 6 pixels (horizontal direction)×6 pixels (vertical direction) that contains the correction target pixel at the center (central part), and are pixels (G pixels) including the color filters with the same color (green) as the correction target pixel.

Figure 6:
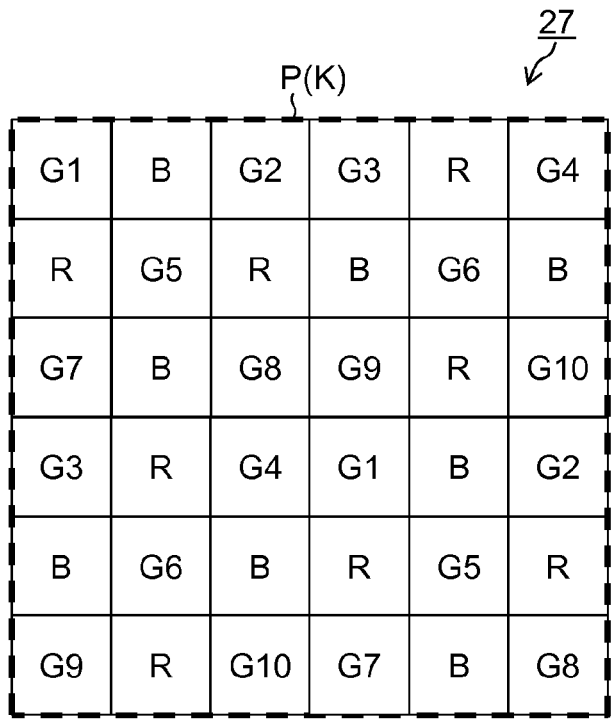
FIG. 6 is a diagram showing the kinds of G pixels in the color filter array of FIG. 2.

For example, in the color filter array of the color imaging element 27 according to the example, as shown in FIG. 6, in the basic array pattern P of 6 pixels (horizontal direction)×6 pixels (vertical direction), the G pixels are classified into ten kinds (G1 to G10), depending on the adjacent pixel arrangement type.

In order to perform the color mixture correction B based on the average value that is determined from the integrated value (total sum) of the pixel value of these G pixels (G1 to G10), the second color mixture correction unit 63 determines the integrated value of the G pixel values in a kernel size K (basic array pattern size) for the color mixture correction B centered around the correction target pixel. The kernel size K for the color mixture correction B according to the example is 6 pixels (horizontal direction)×6 pixels (vertical direction), which is the same as the size of the basic array pattern P. Therefore, the second color mixture correction unit 63 performs the color mixture correction B by calculating the integrated value of ten kinds of G pixels G1 to G10 contained in the region of the kernel size K, calculating the representative value (in the example, the average value) from the integrated value, and substituting the calculated representative value for the pixel data of the correction target pixel (G pixel) in the kernel size K. Thereby, the level difference in pixel data among G pixels is resolved.

Here, the specific technique for the color mixture correction B by the second color mixture correction unit 63 is not particularly limited, and an example thereof is described later.

The image data (mosaic image data) after the color mixture correction for which the above-described color mixture correction A and color mixture correction B have been performed is sent to the WB correction unit 42 and the RGB integration unit 44 at the subsequent stage (see FIG. 3). When some pixel data of the image data composing an image on one plane is subjected to the influence of the abnormal oblique incident light, the pixel data for which the color mixture correction A has been performed by the first color mixture correction unit 62 and the pixel data for which the color mixture correction B has been performed by the second color mixture correction unit 63 are synthesized in the color mixture decision correction unit 41, and the image data after the synthesis is sent to each processing unit at the subsequent stage, as the image data (mosaic image data) after the color mixture correction. Here, the color mixture correction A may be performed for the pixel data after the color mixture correction B, and the image data (pixel data) after the color mixture correction B may be sent from the second color mixture correction unit 63 to the first color mixture correction unit 62.

Figure 7:
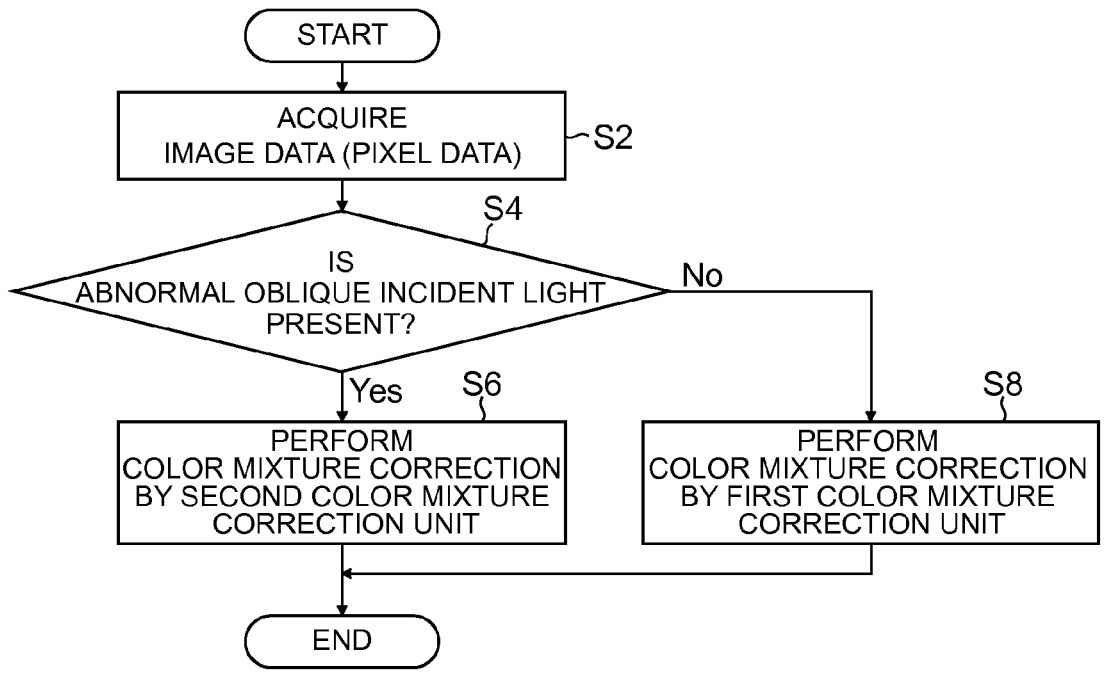
FIG. 7 is a flowchart showing a flow of the color mixture correction by the color mixture decision correction unit.

FIG. 7 is a flowchart showing a flow of the color mixture correction by the color mixture decision correction unit 41.

When the mosaic image data (RGB image) is input to the color mixture decision correction unit 41, the color mixture correction decision unit 61 acquires the image data (pixel data) (S2 in FIG. 7), and the color mixture correction decision unit 61 decides the presence or absence of the abnormal oblique incident light such as the ghost light in the image data (S4).

In the case of deciding that the incidence of the abnormal oblique incident light is present in the image data (Yes in S4), the second color mixture correction unit 63 performs the color mixture correction B (S6), so that the level difference in pixel data among G pixels is resolved. On the other hand, in the case of deciding that the incidence of the abnormal oblique incident light is absent in the image data (No in S4), the first color mixture correction unit 62 performs the color mixture correction A (S8), so that the color mixture depending on the pixel property specific to the imaging element is corrected.

Therefore, in the case where the above-described abnormal oblique incident light is the ghost light, the presence or absence of the occurrence of the ghost is detected, and the color mixture decision correction unit 41 performs the image process control (color mixture correction process control) of the first color mixture correction unit 62 and the second color mixture correction unit 63, so as to select the ordinary color mixture correction (the color mixture correction A) using the adjacent pixels, when the ghost does not occur, and to select the color mixture correction (the color mixture correction B) using the integrated value of the pixel data of the correction target pixel and the peripheral pixels (G pixel), when the ghost occurs.

As described above, according to the embodiment, it is possible to effectively reduce the image quality degradation due to the ghost in the image (image data) to be obtained from the color imaging element 27 that is large in the array matrix size of the basic array pattern P and that has many kinds of adjacent color filters, as exemplified by the X-Trans color filter array shown in FIGS. 2A, 2B and FIG. 6.

Particularly, since the calculation of the color mixture amount in the color mixture correction B by the second color mixture correction unit 63 is performed based on the pixel data of the same-color pixels (G pixels) in the kernel size K, instead of the pixel data of the adjacent pixels to the correction target pixel, it is possible to correct the color mixture and same-color level difference caused by the abnormal oblique incident light and eliminate the influence of the ghost, based on the information close to the incident light (taken image light).

Second Embodiment

Figures 8, 9:
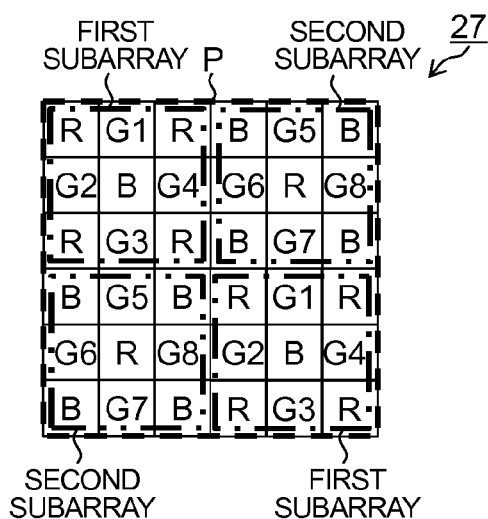
FIG. 8 is a diagram showing the color filter array (pixel array) of a color imaging element according to a second embodiment.
FIG. 9 is a diagram showing another example of the basic array pattern of the color filter array.

FIG. 8 is a diagram showing the color filter array (pixel array) of a color imaging element 27 according to a second embodiment.

For identical or similar elements to the above-described first embodiment, identical reference characters are assigned, and the detailed description is omitted.

Multiple pixels constituting the color imaging element 27 according to the embodiment include a basic array pattern P of 3 pixels (horizontal direction)×3 pixels (vertical direction), and a plurality of the basic array patterns P are arrayed in the horizontal direction and the vertical direction.

The basic array pattern P is configured by five G pixels arranged in a cross shape, two R pixels arranged at the positions on one diagonal of the four corners and two B pixels arranged at the positions on the other diagonal of the four corners. Therefore, as shown in FIG. 8, the G pixels constituting the color imaging element 27 are classified into five kinds (G1 to G5), depending on the type of the color filters of the adjacent pixels.

The second color mixture correction unit 63 (see FIG. 5) according to the embodiment sets, as the peripheral pixels to be used for the color mixture correction B, pixels that are contained in a larger range than the range of 3 pixels (horizontal direction)×3 pixels (vertical direction) containing the correction target pixel and that include the color filters with the same color as the correction target pixel (G pixel). In the example shown in FIG. 8, the kernel size K of the color mixture correction B is 6 pixels (horizontal direction)×6 pixels (vertical direction), which is larger than the pixel size (3 pixels (horizontal direction)×3 pixels (vertical direction)) of the basic array pattern P, and the G pixels contained in the kernel size K when a color mixture correction target pixel 50A is arranged at the central part (center) of the kernel size K is set as the peripheral pixels to be used for the color mixture correction B.

Similarly to the first embodiment, the second color mixture correction unit 63 performs the color mixture correction B of the pixel data of the correction target pixel, based on the representative value of the pixel data of the G pixels contained in the kernel size K.

Here, the kernel size K of the color mixture correction B only needs to be larger than the size of the basic array pattern P, and as shown in the example, a range having an about twofold pixel number relative to the basic array pattern P with respect to each of the horizontal direction and the vertical direction (an about fourfold pixel number with respect to the total pixel number) can be set as the kernel size K of the color mixture correction B.

When the multiple pixels of the color imaging element 27 is configured by the repetition of the basic array pattern P, the "kind of the same-color pixels to be determined depending on the type of the color filters of the adjacent pixels" with respect to the whole of the color imaging element 27 is basically the same as the "kind of the same-color pixels to be determined depending on the type of the color filters of the adjacent pixels" set with respect to the pixels contained in the basic array pattern P. Therefore, even in the case where the color mixture phenomenon is complicated because of a complex color filter array, four or more same-color pixels of the same kind are contained in the kernel size for the color mixture correction B, when the kernel size for the color mixture correction B is an about twofold pixel number relative to the basic array pattern P with respect to each of the horizontal direction and the vertical direction (an about fourfold pixel number with respect to the total pixel number). Therefore, by using a lot of pixel data in this way, it is possible to accurately perform the color mixture correction B for resolving the level difference in pixel data among same-color pixels.

As described above, according to the embodiment, the color mixture correction B is performed based on the pixel data of many same-color pixels (G pixels) arranged in the periphery of the correction target pixel, and therefore, it is possible to suppress the occurrence of the level difference in pixel data among same-color pixels, by the more accurate color mixture correction B.

<Other Color Filter Array>

The application of the color mixture correction flow (the detection of the abnormal oblique incident light, the color mixture correction A and the color mixture correction B) by the above-described color mixture decision correction unit 41 is not limited to the image data (RAW data or the like) that is output from the color imaging element 27 having the color filter array (X-Trans) shown in FIG. 2 and FIG. 6 or the color filter array shown in FIG. 8, and the above-described color mixture correction flow can be applied to the image data that is output from a color imaging element 27 having another color filter array.

In this case, the above-described color mixture correction is applied to a color filter array (pixel array) configured by a basic array pattern P including at least five same-color pixels (G pixels: first-color pixels) that are different from each other in the kind of the color filters of the adjacent pixels, and thereby, it is possible to effectively reduce the "level difference in pixel data among same-color pixels that is caused by the abnormal oblique incident light" and the "color mixture that is caused by the pixel property".

FIG. 9 is a diagram showing another example of the basic array pattern of the color filter array. A basic array pattern P according to the example has a pixel configuration of 6 pixels (horizontal direction)×6 pixels (vertical direction), and each basic array pattern P is configured by two first subarrays arranged on one diagonal line and two second subarrays arranged on the other diagonal line. The first subarray is configured by four R pixels arranged at the four corners, one B pixel arranged at the center, and four G pixels arranged between the R pixels. The second subarray is configured by four B pixels arranged at the four corners, one R pixel arranged at the center, and four G pixels arranged between the B pixels. The G pixels of the color filter array according to the example are classified into eight kinds (G1 to G8), depending on the type of the color filters of the adjacent pixels.

Further, a basic array pattern P of a color filter array shown in FIG. 10 has a pixel configuration of 5 pixels (horizontal direction)×5 pixels (vertical direction), and a line on which "a G pixel, a B pixel, an R pixel, a B pixel and a G pixel" are adjacently arranged, a line on which "an R pixel, a G pixel, a B pixel, a G pixel and an R pixel" are adjacently arranged, a line on which "a B pixel, an R pixel, a G pixel, an R pixel and a B pixel" are adjacently arranged, a line on which "an R pixel, a G pixel, a B pixel, a G pixel and an R pixel" are adjacently arranged and a line on which "a G pixel, a B pixel, an R pixel, a B pixel and a G pixel" are adjacently arranged are adjacently arranged in the vertical direction. The G pixels of the color filter array according to the example are classified into nine kinds (G1 to G9), depending on the type of the color filters of the adjacent pixels.

Further, a basic array pattern P of a color filter array shown in FIG. 11 has a pixel configuration of 3 pixels (horizontal direction)×3 pixels (vertical direction), and a line on which "an R pixel, a B pixel and a G pixel" are adjacently arranged, a line on which "a B pixel, an R pixel and a G pixel" are adjacently arranged and a line on which "a G pixel, a G pixel and a G pixel" are adjacently arranged are adjacently arranged in the vertical direction. The G pixels of the color filter array according to the example are classified into five kinds (G1 to G5), depending on the type of the color filters of the adjacent pixels.

Further, a basic array pattern P of a color filter array shown in FIG. 12 has a pixel configuration of 3 pixels (horizontal direction)×3 pixels (vertical direction), and is configured by five G pixels arranged in an X shape on the diagonal lines, two B pixels adjacently arranged at the upper and lower (vertical) positions to the central G pixel, and two R pixels adjacently arranged at the left and right (horizontal) positions to the central G pixel. The G pixels of the color filter array according to the example are classified into five kinds (G1 to G5), depending on the type of the color filters of the adjacent pixels.

Further, a color filter array shown in FIG. 13A is the Bayer array, and a basic array pattern P has a pixel configuration of 2 pixels (horizontal direction)×2 pixels (vertical direction), and a line on which "a G pixel and a B pixel" are adjacently arranged and a line on which "an R pixel and a G pixel" are adjacently arranged are adjacently arranged in the vertical direction. The G pixels of the color filter array according to the example are classified into two kinds (G1 to G2), depending on the type of the color filters of the adjacent pixels.

Further, a basic array pattern P of a color filter array shown in FIG. 13B has a pixel configuration of 4 pixels (horizontal direction)×4 pixels (vertical direction), and each basic array pattern P is configured by two first subarrays arranged on one diagonal line and two second subarrays arranged on the other diagonal line. The first subarray is configured by two R pixels arranged on one diagonal line and two G pixels arranged on the other diagonal line. The second subarray is configured by two B pixels arranged on one diagonal line and two G pixels arranged on the other diagonal line. The G pixels of the color filter array according to the example are classified into two kinds (G1 to G2), depending on the type of the color filters of the adjacent pixels.

When the above-described color mixture correction flow (the detection of the abnormal oblique incident light, the color mixture correction A and the color mixture correction B) by the color mixture decision correction unit 41 is applied also to the image data (pixel data) that is output from the color imaging elements 27 having the above-described color filter arrays shown in FIG. 9 to FIG. 13, it is possible to effectively reduce the "level difference in pixel data among same-color pixels that is caused by the abnormal oblique incident light" and the "color mixture that is caused by the pixel property". Further, particularly, when all of the same-color pixels (G pixels) contained in the basic array pattern P are configured by pixels that are different from each other in the kind of the color filters of the adjacent pixels (for example, see FIG. 10 to FIG. 13), the peripheral pixels to be used for the color mixture correction B can be configured by pixels that are different from each other in the kind of the color filters of the adjacent pixels, by equalizing the kernel size K for the color mixture correction B by the second color mixture correction unit 63, with the number of the constituent pixels of the basic array pattern P.

<Other Modifications>

In addition, the pixel size of the basic array pattern P of the color filter array of the color imaging element 27 is not particularly limited, and the basic array pattern P can be configured by pixels of arbitrary M pixels (horizontal direction)×N pixels (vertical direction) (where M is an integer of 3 or more and N is an integer of 3 or more).

Figure 14:
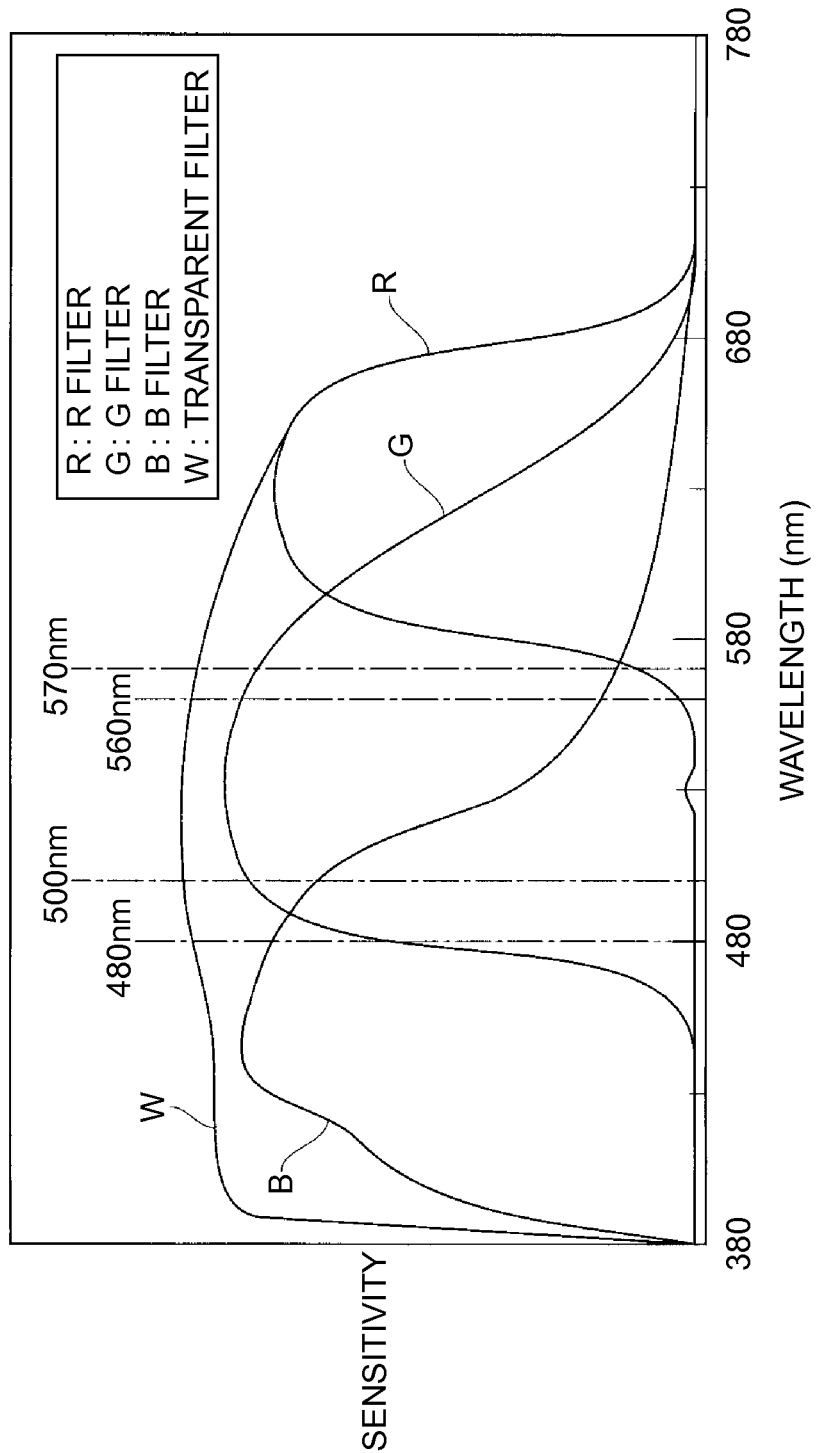
FIG. 14 is a diagram showing the spectral sensitivities of color filters.

Further, in the above-described embodiments, the example in which the multiple pixels of the color imaging element 27 are configured by the color filters of RGB has been described. However, color filters with other colors may be included in addition to RGB, or instead of some or all of RGB. For example, the multiple pixels constituting the color imaging element 27 may include a W pixel (transparent pixel, white pixel), in addition to the RGB pixels. When the color filter of the W pixel is higher in the contribution ratio for obtaining the luminance signal Y than the other color filters included in the color imaging element 27 (for example, Y=0.5 W+0.5 (0.3 R+0.59 G+0.11 B)), the W pixel may be adopted as the correction target pixel in the above-described color mixture correction. FIG. 14 is a diagram showing an example of the spectral sensitivities of the R color filter, the G color filter, the B color filter and the W (transparent) color filter, in which the abscissa indicates the light wavelength and the ordinate indicates the sensitivity (light transmittance).

Here, the transparent pixel and the white pixel both include a color filter having a relatively high light transmittance in the whole range of the visible light wavelength range. The color filter (transparent filter) of the transparent pixel has a higher light transmittance than the color filter (white filter) of the white pixel.

<Color Mixture Correction A>

Next, an example of the "color mixture correction A when the abnormal oblique incident light (the ghost light or the like) is not detected" by the first color mixture correction unit 62 is described. In the example, a case where the color imaging element 27 has the color filter array configured by the basic array pattern P of the X-Trans array (see FIGS. 2A, 2B and FIG. 6) is described.

In the case of paying attention to a G pixel (a target pixel of the color mixture correction) corresponding to the upper right G filter of the four G filters of 2 pixels (horizontal direction)×2 pixels (vertical direction) in the color filter array shown in FIGS. 2A and 2B, and the upper, lower, left and right adjacent pixels (the upper pixel (B pixel), the lower pixel (G pixel), the left pixel (G pixel) and the right pixel (R pixel)) that are adjacent to the target pixel (own pixel), the colors of the adjacent pixels in the upward, downward, leftward and rightward azimuth directions on the basis of the target pixel are B, G, G and R, respectively.

For the 9 pixels in the first subarray and the 9 pixels in the second subarray, each of which is 3 pixels×3 pixels in the basic array pattern P of 6 pixels×6 pixels shown in FIGS. 2A and 2B, the combination of the colors of the four pixels that are adjacent to the target pixel in the upward, downward, leftward and rightward directions varies, no matter what pixel is the target pixel.

The colors of the four adjacent pixels to the target pixel can be any color of the three colors of RGB, and therefore, as the combination (repeated permutation) of the colors of the four adjacent pixels, there are $3^4=81$ combinations. Here, in the case of the color filter array according to the embodiment, as the combination of the four adjacent pixels, there are 18 combinations, which correspond to the 18 pixels of the first subarray and the second subarray.

When the pixel size of the basic array pattern P is large and the flexibility of the array of the three color pixels of RGB is high, the combination of the color arrangements of the adjacent pixels that are adjacent increases. Further, when an emerald or yellow pixel is present other than the three colors of RGB, the combination of the color arrangements further increases.

By defining the color mixture ratio on a four-adjacent-pixel basis as one set, the color mixture ratio may be stored for each combination of the colors of the adjacent pixels. However, in the case of considering the colors of the adjacent pixels in the oblique directions (the left-upward, right-upward, left-downward and right-downward directions) other than the four directions of the upward, downward, leftward and rightward directions, the number of the combinations of the color arrangements further increases, and the data volume of the color mixture ratios increases.

Figures 15, 16:
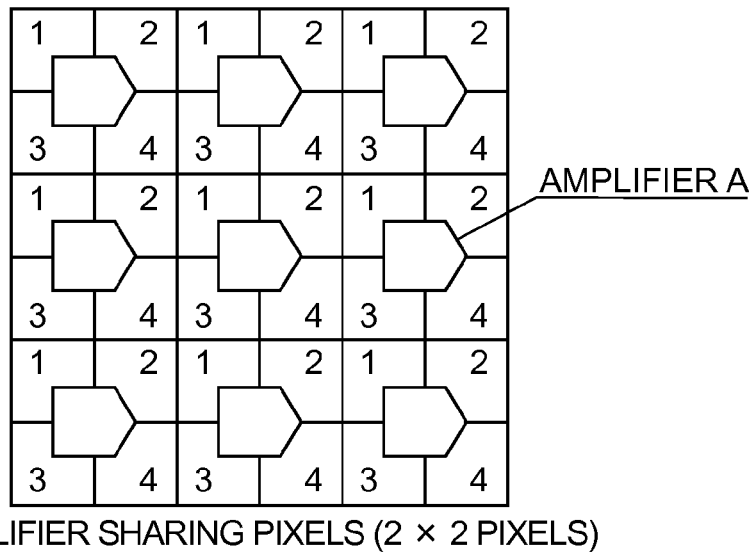
FIG. 15 is a diagram showing an example of an imaging element in which one amplifier is shared by 4 pixels of 2×2.
FIG. 16 is a chart showing an example of a correction table indicating color mixture ratios.

Further, the color imaging element 27 according to the embodiment is a CMOS type imaging element. As shown in FIG. 15, pixel share amplifiers A are buried in an underlying layer of the CMOS, and one amplifier A is shared by K×L (2×2) pixels. Because of this element structure of the color imaging element 27, the output level is different depending on pixel (own pixel) positions 1 to 4 relative to the amplifier A (the upper left, upper right, lower left and lower right positions relative to the amplifier A).

In the memory unit (the memory 37), a correction table shown in FIG. 16 is stored. In the correction table, a first parameter P1 is the three colors (RGB) of the adjacent pixels, and a second parameter P2 is the position (the positions 1 to 4 in FIG. 15) of the own pixel of the 2×2 pixels sharing the amplifier A. A total of 12 color mixture ratios that are color mixture ratios A1 to A12 corresponding to the combinations of these parameters P1 and P2 are stored while being associated with the parameters P1 and P2. For saving the correction table to the memory unit, it is preferable to previously determine the color mixture ratios corresponding to the combinations of the above parameters at the time of the inspection before the product shipment and to save them for each product.

Figure 17:
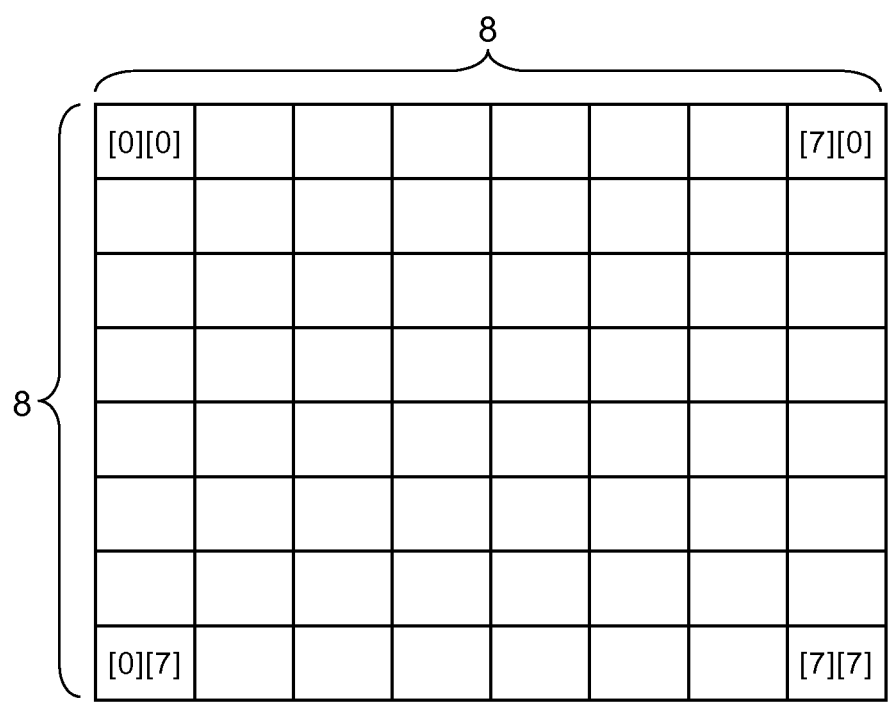
FIG. 17 is a diagram showing 8×8 division regions of a mosaic image.

Further, the central part and peripheral part of the mosaic image are different in the incident angle of the subject light to the pixels of the color imaging element 27, and therefore, are different in color mixture ratio. Hence, as shown in FIG. 17, the whole region of the mosaic image is divided into 8×8 division regions, for example, and the correction table shown in FIG. 16 is stored in the memory unit for each of the division regions [0][0] to [7][7]. Hereinafter, a parameter for specifying either of the 64 (=8×8) division regions is referred to as a third parameter P3.

Figure 18:
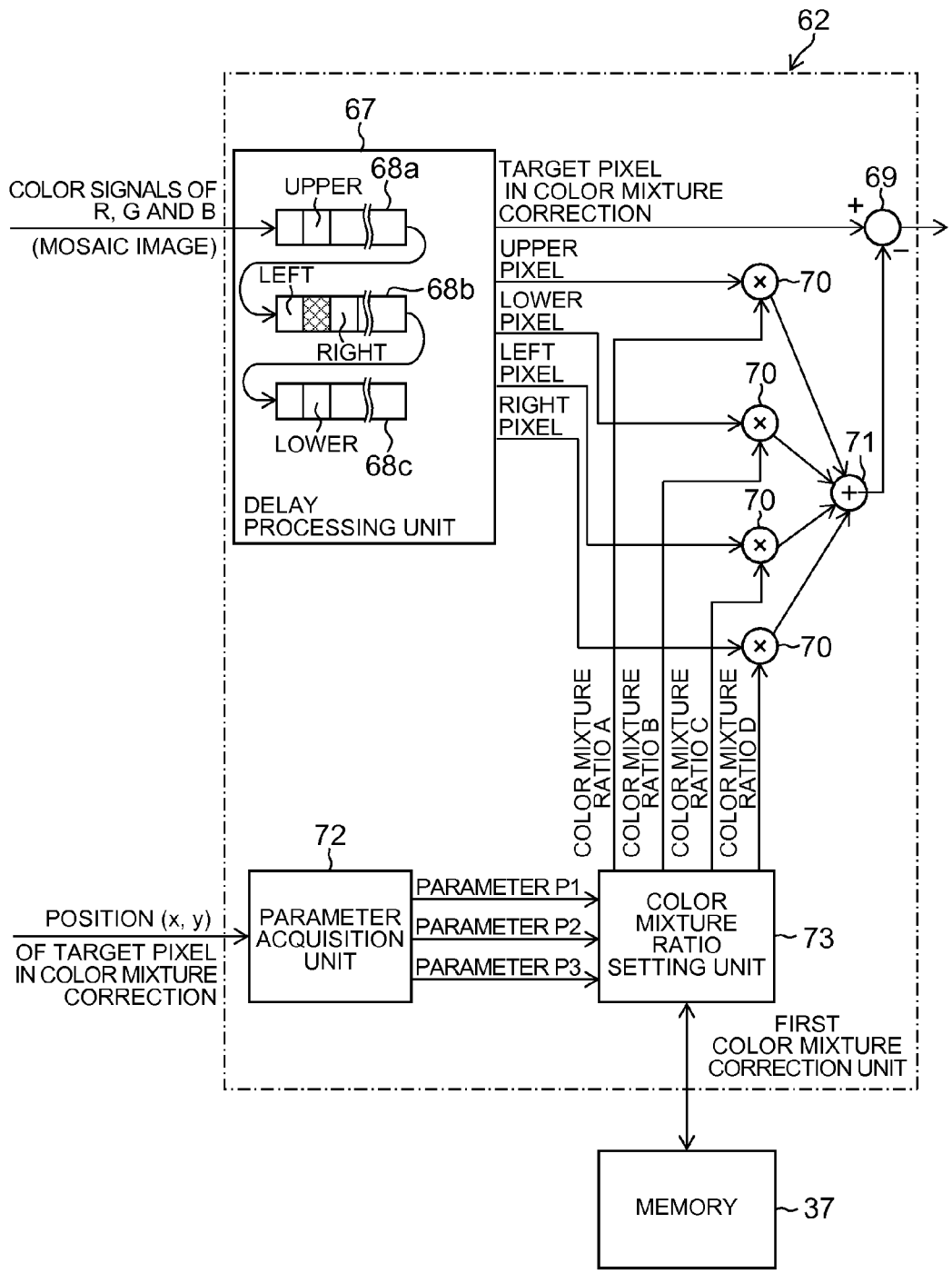
FIG. 18 is a block diagram showing an example of the internal configuration of a first color mixture correction unit.

FIG. 18 is a block diagram showing an embodiment of the internal configuration of the first color mixture correction unit 62.

The first color mixture correction unit 62 is constituted mainly by a delay processing unit 67, a subtractor 69, multipliers 70, an adder 71, a parameter acquisition unit (a parameter acquisition device) 72 and a color mixture ratio setting unit 73.

In FIG. 18, the mosaic image (RGB color signals) acquired through the color imaging element 27 is dot-sequentially given to the delay processing unit 67. The delay processing unit 67 includes 1H (horizontal line) line memories 68a to 68c, and the dot-sequentially input RGB color signals are sequentially shifted in the line memories 68a to 68c, at such an interval that the process of one pixel is performed. When the color signal at the position shown by the oblique lines on the line memory 68b is the color signal of the target pixel in the color mixture correction, the color signals at the same positions on the line memories 68a, 68c are the color signals of the upper pixel and the lower pixel, respectively, and the color signals at the left and right positions to the position shown by the oblique lines on the line memory 68b are the color signals of the left pixel and the right pixel, respectively.

Thus, the delay processing unit 67 appropriately delays the dot-sequentially input RGB color signals, and simultaneously outputs the target pixel in the color mixture correction and the upper, lower, left and right adjacent pixels (the upper pixel, the lower pixel, the left pixel and the right pixel) to the target pixel. The color signal of the target pixel output from the delay processing unit 67 is given to the subtractor 69, and the color signals of the upper pixel, the lower pixel, the left pixel and the right pixel are given to the multipliers 70, respectively.

The information indicating the position (x, y) of the target pixel in the mosaic image, which is output from the delay processing unit 67, is given to the parameter acquisition unit 72, and the parameter acquisition unit 72 acquires the first to third parameters P1 to P3, based on the information indicating the position (x, y) of the target pixel. Here, the information indicating the position (x, y) of the target pixel can be acquired from the CPU 30 to give the instruction of the signal process for each pixel of the mosaic image, or the image processing circuit 32 (the color mixture correction decision unit 61 and the like).

When the position (x, y) of the target pixel in the mosaic image has been specified, it is possible to determine the second parameter P2 indicating the position (the positions 1 to 4 in FIG. 15) of the target pixel (own pixel) and the third parameter P3 indicating the division region (see FIG. 17) to which the own pixel belongs. Further, when the position (x, y) of the target pixel in the mosaic image has been specified, it is possible to determine the colors of the adjacent pixels (the upper pixel, the lower pixel, the left pixel and the right pixel) to the target pixel. That is, it is possible to determine the first parameter P1 indicating the colors of the adjacent pixels. The parameter acquisition unit 72 determines the first to third parameters P1 to P3 based on the information of the position (x, y) of the target pixel in the mosaic image, in the above way, and outputs them to the color mixture ratio setting unit 73.

The color mixture ratio setting unit 73 reads four corresponding color mixture ratios A to D from the memory 37, based on the first to third parameters P1 to P3 input from the parameter acquisition unit 72, and gives the color mixture ratios A to D to the other inputs of the multipliers 70, respectively. That is, the color mixture ratio setting unit 73 selects the correction table corresponding to the division region to which the target pixel belongs, based on the third parameter P3, and reads the four color mixture ratios A to D (see the A1 to A12 in FIG. 16) for the respective azimuth directions of the adjacent pixels, from the selected correction table, based on the first and second parameters P1, P2.

The multipliers 70 multiply the input color signals of the upper pixel, lower pixel, left pixel and right pixel and the input color mixture ratios A to D, respectively, and output the multiplied values to the adder 71. The adder 71 adds the four input multiplied values, and gives the added value to the other input of the subtractor 69. The added value corresponds to the color mixture component included in the color signal of the target pixel in the color mixture correction.

The color signal of the target pixel in the color mixture correction is given to one input of the subtractor 69, and the subtractor 69 subtracts the added value (color mixture component) input by the adder 71, from the color signal of the target pixel, and outputs the color signal of the target pixel in which the removal (color mixture correction) of the color mixture component has been performed.

When the above calculation by the subtractor 69, the multipliers 70 and the adder 71 is shown by a formula, it can be expressed by the following formula.

Color Signal after Correction=Color Signal before Correction−(Upper Pixel×Color Mixture Ratio A+Lower Pixel×Color Mixture Ratio B+Left Pixel×Color Mixture Ratio C+Right Pixel×Color Mixture Ratio D) [Formula 1]

The color signal in which the color mixture correction has been performed by the first color mixture correction unit 62 in the above way is output to the WB correction unit 42 and the RGB integration unit 44 at the subsequent stage (see FIG. 3).

Figure 19:
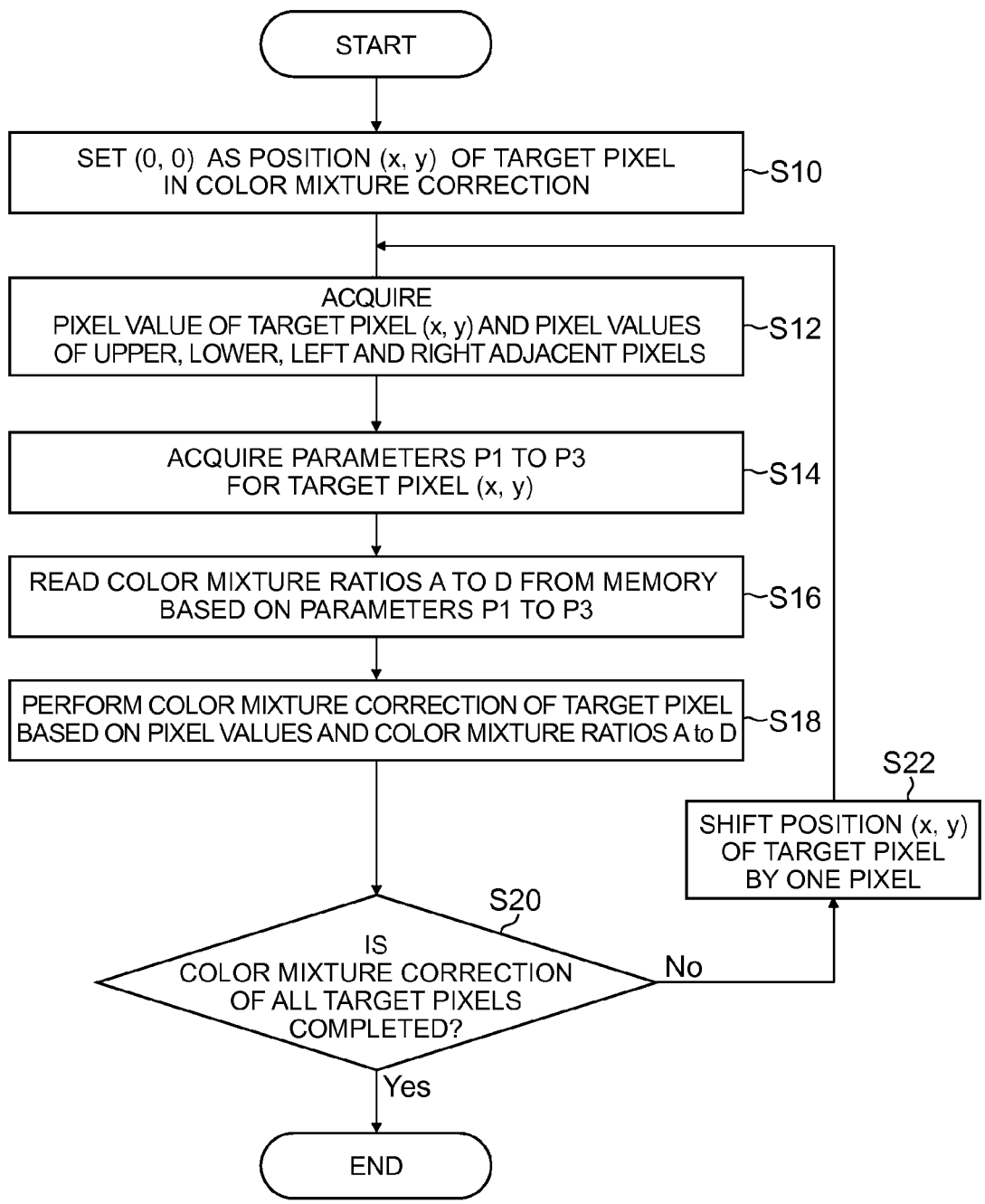
FIG. 19 is a flowchart showing a flow of an example of a color mixture correction A.

FIG. 19 is a flowchart showing an example of the image process relevant to the color mixture correction.

First, the first color mixture correction unit 62 sets an initial value (0, 0) as the position (x, y) of the target pixel in the color mixture correction, before the start of the color mixture correction (step S10).

Subsequently, the color signal (pixel value) of the target pixel (x, y) and the color signals (pixel values) of the upper, lower, left and right adjacent pixels to the target pixel (x, y) are acquired (step S12).

The parameter acquisition unit 72, as described above, acquires the first to third parameters P1 to P3, based on the position (x, y) of the target pixel (step S14).

The color mixture ratio setting unit 73 reads the corresponding color mixture ratios A to D from the memory unit, based on the first to third parameters P1 to P3 acquired by the parameter acquisition unit 72 (step S16).

Next, the arithmetic process shown by [Formula 1] is performed based on the pixel value of the target pixel and the pixel values of the adjacent pixels acquired in step S12 and the color mixture ratios A to D read in step S16, and the color mixture correction of removing the color mixture component from the pixel value of the target pixel is performed (step S18).

Subsequently, whether the color mixture correction of all target pixels is completed is decided (step S20), and in the case of being not completed (No in step S20), the flow transits to step S22.

In step S22, the position (x, y) of the target pixel is shifted by one pixel. Further, when the position (x, y) of the target pixel reaches the left end in the horizontal direction, it is returned to the right end in the horizontal direction and is shifted in the vertical direction by one pixel. Then, the flow transits to step S12, and the processes of the above step S12 to step S20 are repeatedly executed.

On the other hand, in step S20, in the case of deciding that the color mixture correction of all target pixels is completed (Yes in S20), the process of the color mixture correction is completed.

The present invention is not limited to the mosaic image having the color filter array shown in FIGS. 2A and 2B, and can be applied to mosaic images having various color filter arrays. In this case, it is possible to apply the above-described color mixture correction, without changing the hardware for the color mixture correction.

Further, for a mosaic image to be acquired from an imaging element in which the pixel share amplifier is not buried, the third parameter P3 indicating the position of the own pixel relative to the amplifier is unnecessary, and when the difference in color mixture ratio between the central part and peripheral part of the mosaic image is small, it is unnecessary to include the correction table of the color mixture ratio for each division region.

On the other hand, the parameter for the correction may be set for each of the positions of the adjacent pixels to the correction target pixel, that is, for each of the upward, downward, leftward and rightward directions and the oblique directions (the left-upward, right-upward, left-downward and right-downward directions) to the correction target pixel. By setting the correction parameter for each of the positions of the adjacent pixels to the correction target pixel in this way, it is possible to perform a more accurate color mixture correction.

<Detection of Abnormal Oblique Incident Light and Color Mixture Correction B>

Next, an example of "the detection of the abnormal oblique incident light (the ghost light or the like) and the color mixture correction B when the abnormal oblique incident light is detected" by the color mixture correction decision unit 61 and the second color mixture correction unit 63 is described.

The color mixture decision correction unit 41 of the image processing circuit 32 includes the color mixture correction decision unit 61 to act as the abnormal oblique incident light detection unit that detects the abnormal oblique incident light. The color mixture correction decision unit 61 can detect the abnormal oblique incident light to enter the color imaging element 27 in the horizontal direction, based on the pixel data of a first first-direction same-color adjacent pixel, a second first-direction same-color adjacent pixel, a first first-direction different-color adjacent pixel and a second first-direction different-color adjacent pixel.

Figure 20:
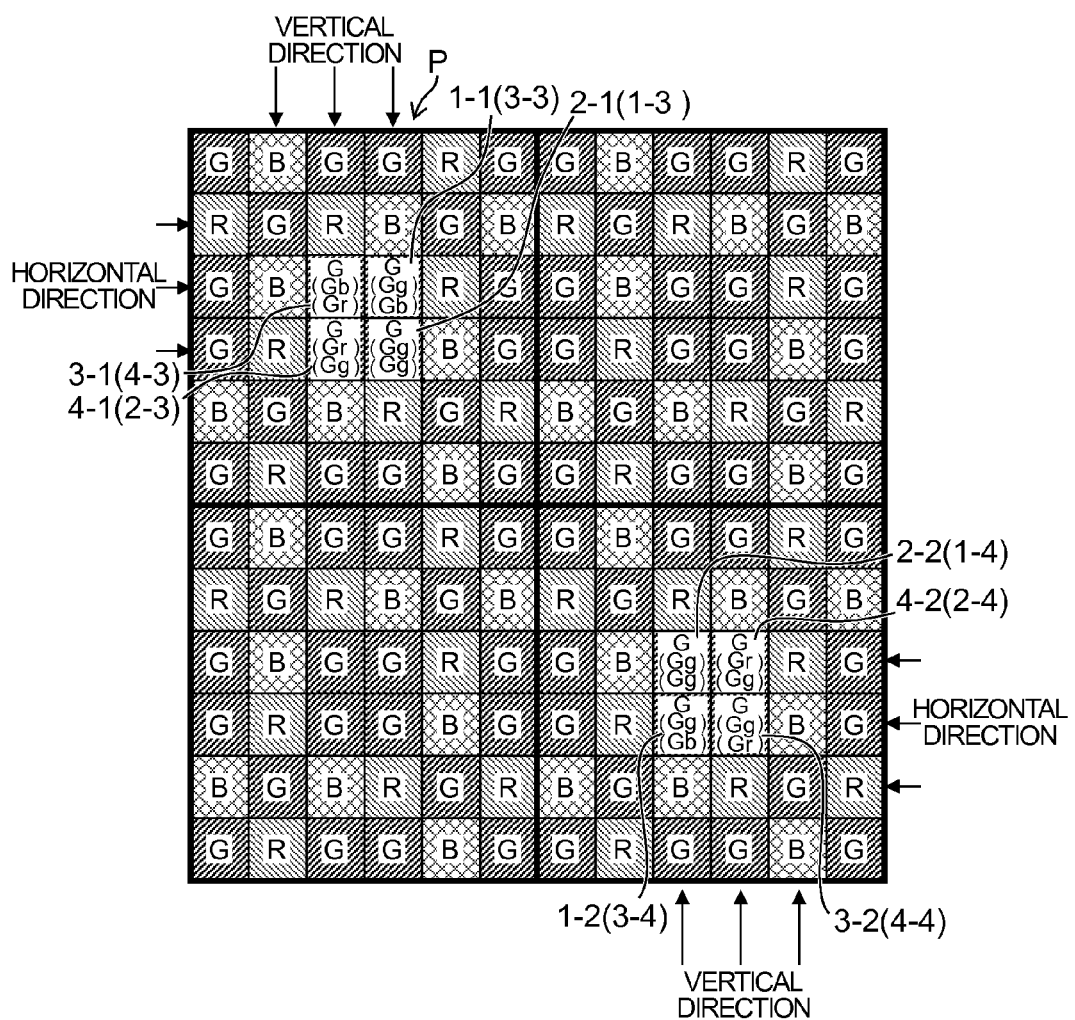
FIG. 20 is a diagram showing a color filter array provided in an imaging element.

In FIG. 20, the detection of the abnormal oblique incident light in the horizontal direction from the left side on the sheet plane by the color mixture correction decision unit 61 is described. In the case of the incidence of the abnormal oblique incident light in the horizontal direction from the left side on the sheet plane, the pixel (first first-direction same-color adjacent pixel) designated by reference numeral 1-1 in FIG. 20 that includes the G filter is subjected to the influence of the color mixture from the pixel (reference numeral 3-1 in FIG. 20) that is adjacent to the left side on the sheet plane and that includes the G filter. Then, the pixel designated by reference numeral 1-1 in FIG. 20 that includes the G filter outputs pixel data Gg.

In the case of the incidence of the abnormal oblique incident light in the horizontal direction from the left side on the sheet plane, the pixel (second first-direction same-color adjacent pixel) designated by reference numeral 2-1 in FIG. 20 that includes the G filter is subjected to the influence of the color mixture from the pixel (reference numeral 4-1 in FIG. 20) that is adjacent to the left side on the sheet plane and that includes the G filter. Then, the pixel designated by reference numeral 2-1 in FIG. 20 that includes the G filter outputs pixel data Gg.

In the case of the incidence of the abnormal oblique incident light in the horizontal direction from the left side on the sheet plane, the pixel (first first-direction different-color adjacent pixel) designated by reference numeral 3-1 in FIG. 20 that includes the G filter is subjected to the influence of the color mixture from the pixel that is adjacent to the left side on the sheet plane and that includes the B filter. Then, the pixel designated by reference numeral 3-1 in FIG. 20 that includes the G filter outputs pixel data Gb.

In the case of the incidence of the abnormal oblique incident light in the horizontal direction from the left side on the sheet plane, the pixel (second first-direction different-color adjacent pixel) designated by reference numeral 4-1 in FIG. 20 that includes the G filter is subjected to the influence of the color mixture from the pixel that is adjacent to the left side on the sheet plane and that includes the R filter. Then, the pixel designated by reference numeral 4-1 in FIG. 20 that includes the G filter outputs pixel data Gr.

Then, the color mixture correction decision unit 61 compares the pixel data among the first first-direction same-color adjacent pixel (reference numeral 1-1 in FIG. 20), the second first-direction same-color adjacent pixel (reference numeral 2-1 in FIG. 20), the first first-direction different-color adjacent pixel (reference numeral 3-1 in FIG. 20) and the second first-direction difference-color adjacent pixel (reference numeral 4-1 in FIG. 20) described above.

As described above, the pixel data of the first first-direction same-color adjacent pixel (reference numeral 1-1 in FIG. 20) and the pixel data of the second first-direction same-color adjacent pixel (reference numeral 2-1 in FIG. 20) are the same, that is, Gg. Further, the pixel data of the first first-direction different-color adjacent pixel (reference numeral 3-1 in FIG. 20) and the pixel data of the second first-direction different-color adjacent pixel (reference numeral 4-1 in FIG. 20) are different, that is, Gb and Gr. From this result, the color mixture correction decision unit 61 can decide that the abnormal oblique incident light is present in the horizontal direction from the left side on the sheet plane.

Here, the pixel data Gg being the same means that the difference value between the pixel data (Gg) of the first first-direction same-color adjacent pixel and the pixel data (Gg) of the second first-direction same-color adjacent pixel is within 2% of the pixel data of the first first-direction same-color adjacent pixel (or the second first-direction same-color adjacent pixel), and it may be within 1% depending on the imaging target.

Further, the pixel data Gb and Gr being different means that the absolute value of the difference value is 10% or more of the pixel data of the first first-direction same-color adjacent pixel (or the second first-direction same-color adjacent pixel), and it may be 8% or more depending on the imaging target.

Next, in FIG. 20, the detection of the abnormal oblique incident light in the vertical direction from the upper side on the sheet plane that is performed by the color mixture correction decision unit 61 is described. In the case of the incidence of the abnormal oblique incident light in the vertical direction from the upper side on the sheet plane, the pixel (first second-direction same-color adjacent pixel) designated by reference numeral 1-3 in FIG. 20 that includes the G filter is subjected to the influence of the color mixture from the pixel (reference numeral 3-3 in FIG. 20) that is adjacent and that includes the G filter. Then, the pixel designated by reference numeral 1-3 in FIG. 20 that includes the G filter outputs pixel data Gg.

In the case of the incidence of the abnormal oblique incident light in the vertical direction from the upper side on the sheet plane, the pixel (second second-direction same-color adjacent pixel) designated by reference numeral 2-3 in FIG. 20 that includes the G filter is subjected to the influence of the color mixture from the pixel (reference numeral 4-3 in FIG. 20) that is adjacent and that includes the G filter. Then, the pixel designated by reference numeral 2-3 in FIG. 20 that includes the G filter outputs pixel data Gg.

In the case of the incidence of the abnormal oblique incident light in the vertical direction from the upper side on the sheet plane, the pixel (first second-direction different-color adjacent pixel) designated by reference numeral 3-3 in FIG. 20 that includes the G filter is subjected to the influence of the color mixture from the pixel that is on the upper side and that includes the B filter. Then, the pixel designated by reference numeral 3-3 in FIG. 20 that includes the G filter outputs pixel data Gb.

In the case of the incidence of the abnormal oblique incident light in the vertical direction from the upper side on the sheet plane, the pixel (second second-direction different-color adjacent pixel) designated by reference numeral 4-3 in FIG. 20 that includes the G filter is subjected to the influence of the color mixture from the pixel that is on the upper side and that includes the R filter. Then, the pixel designated by reference numeral 4-3 in FIG. 20 that includes the G filter outputs pixel data Gr.

Then, the color mixture correction decision unit 61 compares the pixel data among the first second-direction same-color adjacent pixel (reference numeral 1-3 in FIG. 20), the second second-direction same-color adjacent pixel (reference numeral 2-3 in FIG. 20), the first second-direction different-color adjacent pixel (reference numeral 3-3 in FIG. 20) and the second second-direction difference-color adjacent pixel (reference numeral 4-3 in FIG. 20) described above. As described above, the pixel data of the first second-direction same-color adjacent pixel (reference numeral 1-3 in FIG. 20) and the pixel data of the second second-direction same-color adjacent pixel (reference numeral 2-3 in FIG. 20) are the same, that is, Gg. Further, the pixel data of the first second-direction different-color adjacent pixel (reference numeral 3-3 in FIG. 20) and the pixel data of the second second-direction different-color adjacent pixel (reference numeral 4-3 in FIG. 20) are different, that is, Gb and Gr. From this result, the color mixture correction decision unit 61 decides that the abnormal oblique incident light is present in the vertical direction from the upper side on the sheet plane.

Here, the pixel data Gg being the same means that the difference value between the pixel data (Gg) of the first second-direction same-color adjacent pixel and the pixel data (Gg) of the second second-direction same-color adjacent pixel is within 2% of the pixel data of the first second-direction same-color adjacent pixel (or the second second-direction same-color adjacent pixel), and it may be within 1% depending on the imaging target.

Further, the pixel data Gb and Gr being different means that the absolute value of the difference value is 10% or more of the pixel data of the first second-direction same-color adjacent pixel (or the second second-direction same-color adjacent pixel), and it may be 8% or more depending on the imaging target.

Here, the "detection of the abnormal oblique incident light involving the incidence in the horizontal direction from the right side on the sheet plane" and the "detection of the abnormal oblique incident light involving the incidence in the vertical direction from the lower side on the sheet plane" that are performed by the color mixture correction decision unit 61 are performed similarly to the above.

As described above, the color mixture correction decision unit 61 can detect the abnormal oblique incident light from the four directions (the abnormal oblique incident light involving the incidence in the horizontal direction from the left side on the sheet plane, the abnormal oblique incident light involving the incidence in the horizontal direction from the right side on the sheet plane, the abnormal oblique incident light involving the incidence in the vertical direction from the upper side on the sheet plane, and the abnormal oblique incident light involving the incidence in the vertical direction from the lower side on the sheet plane). In other words, the color mixture correction decision unit 61, while performing the detection of the abnormal oblique incident light, performs also the discrimination of the incident direction of the abnormal oblique incident light.

Here, the description is made assuming that the horizontal direction from the left side toward the right side on the sheet plane is the positive direction of the first direction and the horizontal direction from the right side toward the left side on the sheet plane is the negative direction of the first direction. Further, the description is made assuming that the vertical direction from the lower side toward the upper side on the sheet plane is the positive direction of the second direction and the vertical direction from the upper side toward the lower side on the sheet plane is the negative direction of the second direction.

Here, as described above, the abnormal oblique incident light is detected when the variation in the pixel data appears in a certain range. The certain range herein means a general range allowing for the detection of a ghost (a picture that is due to the abnormal oblique incident light and that is originally not present). For example, the above detection of the abnormal oblique incident light may be performed in a range of 64 pixels×64 pixels, or the above detection of the abnormal oblique incident light may be performed in 32 pixels×32 pixels.

[Color Mixture Correction]

The second color mixture correction unit 63 can correct the color mixture due to the incidence of the abnormal oblique incident light. That is, when the abnormal oblique incident light entering the color imaging element 27 in the horizontal direction is detected by the abnormal oblique incident light detection device, the second color mixture correction unit 63 can correct the pixel data Gb and the pixel data Gr, using the pixel data Gg.

By correcting the pixel data Gb and the pixel data Gr using the pixel data Gg, it is possible to suppress the influence of the color mixture to the minimum. That is, comparing the pixel data Gg, the pixel data Gr and the pixel data Gb, the color mixture to the pixel data Gg, which is due to the leakage from the same-color pixel, is lowest in the influence of the color mixture. Therefore, it is preferable to correct the pixel data Gr and the pixel data Gb using the pixel data Gg.

The second color mixture correction unit 63 can correct the pixel data Gr and Gb using the pixel data Gg, by various methods. For example, the second color mixture correction unit 63 can also perform the correction by substituting the pixel data Gg for the pixel data of pixels having the pixel data Gr and Gb. Further, the pixel data of a pixel including the G filter can be corrected to the average value of the pixel data Gr and the pixel data Gg, the average value of the pixel data Gb and the pixel data Gg, and the average value of the pixel data Gb, the pixel data Gr and the pixel data Gg.

As described in FIGS. 21A to 21E and FIGS. 22A to 22E, the second color mixture correction unit 63 can perform the color mixture correction in consideration of the incident direction of the abnormal oblique incident light.

Figure 21A:
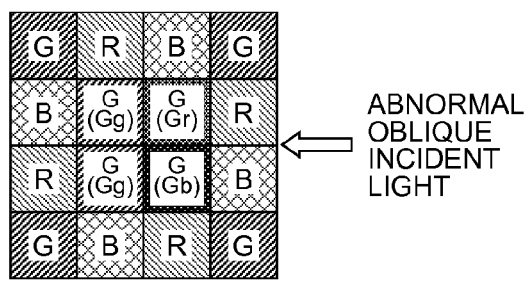
FIG. 21A is a diagram for explaining the utilization of the incident direction of the abnormal oblique incident light for the color mixture correction.
Figure 21B:
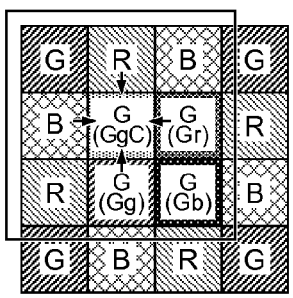
FIG. 21B is a diagram for explaining the utilization of the incident direction of the abnormal oblique incident light for the color mixture correction.
Figure 21C:
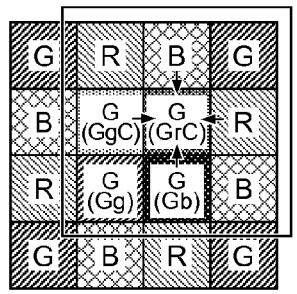
FIG. 21C is a diagram for explaining the utilization of the incident direction of the abnormal oblique incident light for the color mixture correction.
Figure 21D:
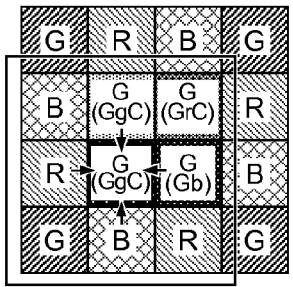
FIG. 21D is a diagram for explaining the utilization of the incident direction of the abnormal oblique incident light for the color mixture correction.
Figure 21E:
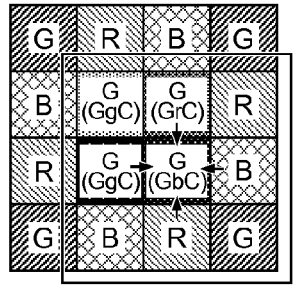
FIG. 21E is a diagram for explaining the utilization of the incident direction of the abnormal oblique incident light for the color mixture correction.
Figure 22A:
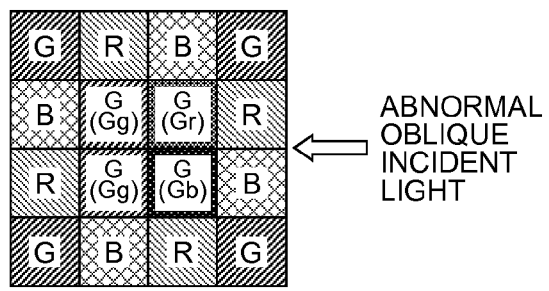
FIG. 22A is a diagram for explaining the utilization of the incident direction of the abnormal oblique incident light for the color mixture correction.

FIG. 21A and FIG. 22A show a part of the color imaging element 27 shown in FIG. 20, and show a case of the incidence of the abnormal oblique incident light in the horizontal direction from the right side on the sheet plane of FIGS. 21A to 21E and FIGS. 22A to 22E. In the color imaging element 27 shown in FIG. 20, a pixel group (first-color pixel group) of 2 pixels×2 pixels that include the G filter outputs the pixel data of Gg, Gg, Gr and Gb, in the case of the incidence of the abnormal oblique incident light in the horizontal direction from the right side on the sheet plane as shown in FIG. 21A and FIG. 22A.

As shown in FIGS. 21B to 21E, when the pixel data of a pixel including the G filter is corrected based on the pixel data in the four directions, the value of the pixel data GgC after the correction varies in some cases, because the pixel data of Gr and Gb subjected to the influence of the color mixture is used for the correction.

In the following, the variation in the value of the pixel data GgC after the correction is described. First, as shown in FIG. 21B, for the pixel data that is at the upper left position on the sheet plane in the first-color pixel group and that exhibits Gg, the color mixture correction is performed using the pixel data values on the four sides (the left, right, upper and lower sides on the sheet plane), so that pixel data GgC is obtained. The pixel data GgC is subjected to the influence of the color mixture, because the pixel data that is subjected to the influence of the color mixture and that exhibits Gr is used for the color mixture correction.

Next, as shown in FIG. 21C, for the pixel data that is at the upper right on the sheet plane in the first-color pixel group and that exhibits Gr, the color mixture correction is performed using the pixel data values on the four sides, so that pixel data GrC is obtained. Next, as shown in FIG. 21D, for the pixel data that is at the lower left on the sheet plane in the first-color pixel group and that exhibits Gg, the color mixture correction is performed using the surrounding pixel data values, so that pixel data GgC is obtained. The pixel data GgC is subjected to the influence of the color mixture, because the pixel data that is subjected to the influence of the color mixture and that exhibits Gb is used for the color mixture correction.

Next, as shown in FIG. 21E, for the pixel data that is at the lower right on the sheet plane in the first-color pixel group and that exhibits Gb, the color mixture correction is performed using the surrounding pixel data values, so that pixel data GbC is obtained.

In FIG. 21B and FIG. 21D, the color mixture correction is performed for the same pixel data Gg, and the pixel data GgC is obtained. However, the pixel data GgC in FIG. 21B and the pixel data GgC in FIG. 21D are subjected to the influences of different color mixtures, respectively, and therefore, the pixel data GgC in FIG. 21B and the pixel data GgC in FIG. 21D exhibit different values. That is, in the case of FIG. 21B, the pixel data Gr is subjected to the influence of the color mixture, and in the case of FIG. 21D, the pixel data Gb is subjected to the influence of the color mixture, resulting in a difference in the color mixture between Gr and Gb. Therefore, the pixel data GgC to be obtained as the result of the color mixture correction varies depending on the influence of the color mixture.

On the other hand, in the color mixture correction such as that shown in FIGS. 22A to 22E, the color mixture correction is performed in consideration of the incident direction of the abnormal oblique incident light, and therefore, the pixel data GgC to be obtained after the color mixture correction does not vary. In the following, the variation in the value of the pixel data GgC after the correction is described.

Figure 22B:
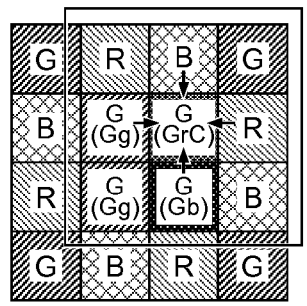
FIG. 22B is a diagram for explaining the utilization of the incident direction of the abnormal oblique incident light for the color mixture correction.

First, as shown in FIG. 22B, for the pixel data that is at the upper right on the sheet plane in the first-color pixel group and that exhibits Gr, the color mixture correction is performed using the pixel data values on the four sides, so that the pixel data GrC is obtained. Here, the color mixture correction to the incident direction (right side) of the abnormal oblique incident light may be strongly performed.

Figure 22C:
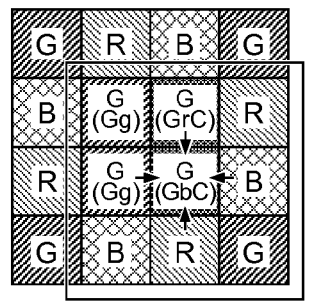
FIG. 22C is a diagram for explaining the utilization of the incident direction of the abnormal oblique incident light for the color mixture correction.
Figure 22D:
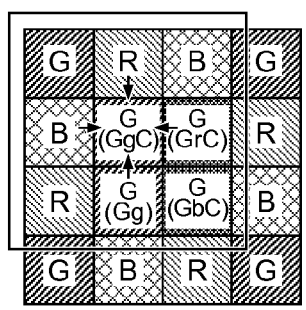
FIG. 22D is a diagram for explaining the utilization of the incident direction of the abnormal oblique incident light for the color mixture correction.

Next, as shown in FIG. 22C, for the pixel data that is at the lower right on the sheet plane in the first-color pixel group and that exhibits Gb, the color mixture correction is performed using the pixel data values on the four sides, so that pixel data GbC is obtained. Next, as shown in FIG. 22D, for the pixel data that is at the upper left on the sheet plane in the first-color pixel group and that exhibits Gg, the color mixture correction is performed using the pixel data values on the four sides, so that pixel data GgC is obtained. On this occasion, although the pixel data exhibiting GrC is used for the color mixture correction, the color mixture correction is previously performed for the GrC, and therefore, the influence of the color mixture correction is removed.

Figure 22E:
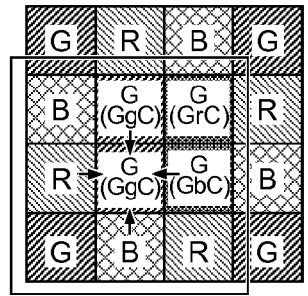
FIG. 22E is a diagram for explaining the utilization of the incident direction of the abnormal oblique incident light for the color mixture correction.

Next, as shown in FIG. 22E, for the pixel data that is at the lower left on the sheet plane in the first-color pixel group and that exhibits Gg, the color mixture correction is performed using the surrounding pixel data values, so that pixel data GgC is obtained. On this occasion, although the pixel data exhibiting GbC is used for the color mixture correction, the color mixture correction is previously performed for the GbC, and therefore, the influence of the color mixture correction is removed.

In FIG. 22D and FIG. 22E, the color mixture correction is performed for the same pixel data Gg, and the obtained pixel data GgC also exhibits the same value. This is because, although the pixel data Gr is subjected to the influence of the color mixture in the case of FIG. 22B and the pixel data Gb is subjected to the influence of the color mixture in the case of FIG. 22C, the influence of the color mixture is removed by performing the color mixture corrections in FIG. 22B and FIG. 22C before performing the color mixture corrections in FIG. 22D and FIG. 22E.

Thus, the sequence of the pixels for which the color mixture correction is performed is changed in consideration of the incident direction of the abnormal oblique incident light, and thereby, it is possible to perform a more accurate color mixture correction. In the case of FIGS. 22, the color mixture correction is performed from the pixel positioned in the incident direction of the abnormal oblique incident light, and thereby, it is possible to perform a more accurate color mixture correction.

In the present invention, it is possible to use color imaging elements 27 having various color filter arrays. In the following, color imaging elements 27 having other color filter arrays are described as modifications.

<Another Embodiment of Imaging Element (Modification 1)>

Figure 23:
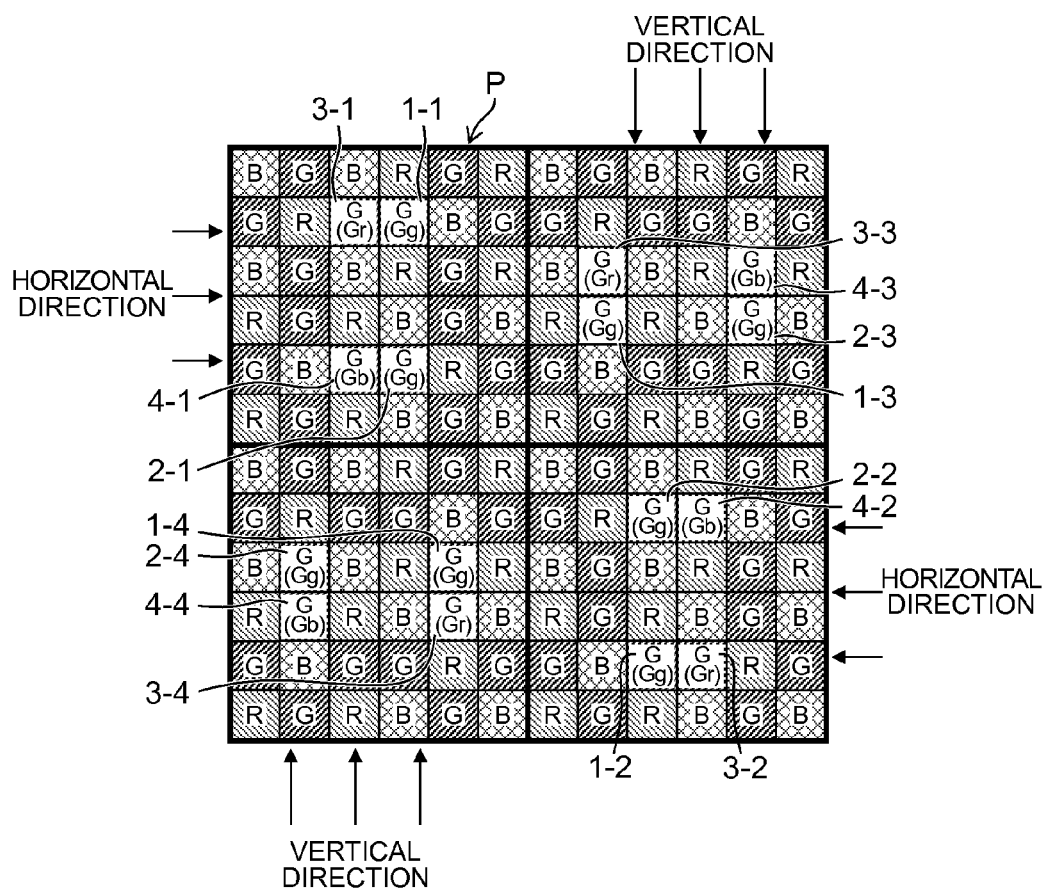
FIG. 23 is a diagram showing another color filter array.

FIG. 23 is a diagram showing another embodiment of the above color imaging element 27, and particularly, shows a color filter array that is arranged on the light receiving surface of the color imaging element 27.

The color filter array shown in FIG. 23 includes multiple basic array pixel groups apposed in the horizontal direction and the vertical direction, and each of the multiple basic array pixel groups is configured by pixels arrayed as 6 pixels×6 pixels in the horizontal direction and the vertical direction.

The color filter array shown in FIG. 23 includes a basic array pattern P (a pixel group shown by the thick-bordered box) that is a square array pattern corresponding to 6 pixels×6 pixels, and the basic array pattern P is repeatedly arranged in the horizontal direction and the vertical direction. That is, in the color filter array, the R filter, the G filter and the B filter are periodically arrayed.

Since the R filter, the G filter and the B filter are periodically arrayed in this way, it is possible to perform the process in accordance with the repeat pattern, when performing the demosaic process and others of the R, G and B signals that are read from the color imaging element 27.

In the basic array pattern P configuring the color filter array shown in FIG. 23, one or more G filters, which correspond to a color (G color) that most contributes to the obtainment of the luminance signal, and one or more R filters and B filters, which correspond to different colors (R and B) other than the G color, are arranged on each of the horizontal and vertical lines in the basic array pattern P.

Since each of the R, G and B filters is arranged on each of the horizontal and vertical lines in the basic array pattern P, it is possible to suppress the occurrence of the color moire (false color). This allows an optical low-pass filter for suppressing the occurrence of the false color not to be arranged on the optical path from the incidence surface to the imaging surface of the optical system, or even when the optical low-pass filter is applied, it is possible to adopt an optical low-pass filter that is weak in the action to cut high frequency components for preventing the occurrence of the false color, and it is possible to avoid impairing the resolution.

In the basic array pattern P, the G filter, which corresponds to the luminance pixel, is arranged such that a part where two or more G pixels are adjacent is included in each direction of the horizontal, vertical and oblique directions.

Each of the basic array patterns P includes two first subarrays and two second subarrays each of which is configured by the color filters of pixels arrayed as 3 pixels×3 pixels in the horizontal direction and the vertical direction.

Figure 24:
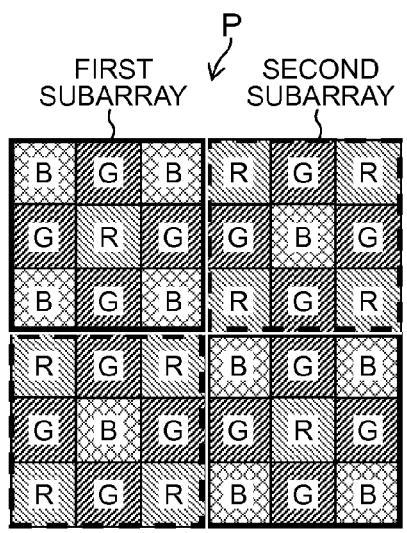
FIG. 24 is a diagram showing a manner in which a basic array pixel group of the color filter array shown in FIG. 23 is divided into a first subarray and a second subarray.

FIG. 24 shows a state in which the basic array pattern P shown in FIG. 23 is divided into four sets of 3 pixels×3 pixels.

In FIG. 24, the first subarray includes one pixel that is arranged at the center and that includes the R filter, four pixels that are arranged at the four corners and that include the B filter, and four pixels that are arranged at the respective intervals of the pixels at the four corners and that include the G filter. The second subarray includes one pixel that is arranged at the center and that includes the B filter, four pixels that are arranged at the four corners and that includes the R filter, four pixels that are arranged at the respective intervals of the pixels at the four corners and that include the G filter. The first subarrays are arranged so as to be adjacent to the second subarrays in the horizontal direction and the vertical direction.

As shown in FIG. 24, the basic array pattern P can be regarded as an array in which the first subarray of 3 pixels×3 pixels surrounded by the solid-line box and the second subarray of 3 pixels×3 pixels surrounded by the broken-line box are alternately arrayed in the horizontal and vertical directions.

In the first subarray, the R filter is arranged at the center, the B filters are arranged at the four corners, and the G filters are arranged at the upper, lower, left and right positions across the central R filter. On the other hand, in the second subarray, the B filter is arranged at the center, the R filters are arranged at the four corners, and the G filters are arranged at the upper, lower, left and right positions across the central B filter. Between the first subarray and the second subarray, the positional relation of the R filters and the B filters is reversed, but the other arrangement is common.

[Abnormal Oblique Incident Light Detection]

In the digital camera 10 including the color imaging element 27 according to the above modification 1, the color mixture correction decision unit 61 detects the abnormal oblique incident light and specifies the direction in the following way.

The detection of the abnormal oblique incident light in the horizontal direction from the left side on the sheet plane that is performed by the color mixture correction decision unit 61 in the modification 1 shown in FIG. 23 is specifically described. The pixel designated by reference numeral 1-1 in FIG. 23 that includes the G filter, for which a pixel (reference numeral 3-1 in FIG. 23) including the G filter is adjacently arranged to the left side on the sheet plane in FIG. 23, is a pixel (first first-direction same-color adjacent pixel) for which the pixel including the color filter with the same color is adjacently arranged and that includes the G filter. The pixel designated by reference numeral 2-1 in FIG. 23 that includes the G filter, for which a pixel (reference numeral 4-1 in FIG. 23) including the G filter is adjacently arranged to the left side on the sheet plane in FIG. 23, is a pixel (second first-direction same-color adjacent pixel) for which the pixel including the color filter with the same color is adjacently arranged and that includes the G filter.

The pixel designated by reference numeral 3-1 in FIG. 23 that includes the G filter, for which a pixel including the R filter with a different color from the G filter is adjacently arranged to the left side on the sheet plane in FIG. 23, is a pixel (first first-direction different-color adjacent pixel) for which the pixel including the color filter with the different color from the first color is adjacently arranged and that includes the G filter. Further, the pixel designated by reference numeral 4-1 in FIG. 23 that includes the G filter, for which a pixel including the B filter with a different color from the G filter is adjacently arranged to the left side on the sheet plane in FIG. 23, is a pixel (second first-direction different-color adjacent pixel) for which the pixel including the color filter with the different color from the first color is adjacently arranged and that includes the G filter.

Then, the color mixture correction decision unit 61 compares the pixel data among the first first-direction same-color adjacent pixel (reference numeral 1-1 in FIG. 23), the second first-direction same-color adjacent pixel (reference numeral 2-1 in FIG. 23), the first first-direction different-color adjacent pixel (reference numeral 3-1 in FIG. 23) and the second first-direction different-color adjacent pixel (reference numeral 4-1 in FIG. 23) described above, and detects the presence of the abnormal oblique incident light that advances in the horizontal direction from the left side on the sheet plane, when the first first-direction same-color adjacent pixel (reference numeral 1-1 in FIG. 23) and the second first-direction same-color adjacent pixel (reference numeral 2-1 in FIG. 23) have the same value and the first first-direction different-color adjacent pixel (reference numeral 3-1 in FIG. 23) and the second first-direction different-color adjacent pixel (reference numeral 4-1 in FIG. 23) have different values.

The detection of the abnormal oblique incident light in the horizontal direction from the right side on the sheet plane that is performed by the color mixture correction decision unit 61 in the modification 1 shown in FIG. 23 is specifically described. The pixel designated by reference numeral 1-2 in FIG. 23 that includes the G filter, for which a pixel (reference numeral 3-2 in FIG. 23) including the G filter is adjacently arranged to the right side on the sheet plane in FIG. 23, is a pixel (first first-direction same-color adjacent pixel) for which the pixel including the color filter with the same color is adjacently arranged and that includes the G filter. The pixel designated by reference numeral 2-2 in FIG. 23 that includes the G filter, for which a pixel (reference numeral 4-2 in FIG. 23) including the G filter is adjacently arranged to the right side on the sheet plane in FIG. 23, is a pixel (second first-direction same-color adjacent pixel) for which the pixel including the color filter with the same color is adjacently arranged and that includes the G filter.

The pixel designated by reference numeral 3-2 in FIG. 23 that includes the G filter, for which a pixel including the R filter with a different color from the G filter is adjacently arranged to the right side on the sheet plane in FIG. 23, is a pixel (first first-direction different-color adjacent pixel) for which the pixel including the color filter with the different color from the first color is adjacently arranged and that includes the G filter. Further, the pixel designated by reference numeral 4-2 in FIG. 23 that includes the G filter, for which a pixel including the B filter with a different color from the G filter is adjacently arranged to the right side on the sheet plane in FIG. 23, is a pixel (second first-direction different-color adjacent pixel) for which the pixel including the color filter with the different color from the first color is adjacently arranged and that includes the G filter.

Then, the color mixture correction decision unit 61 compares the pixel data among the first first-direction same-color adjacent pixel (reference numeral 1-2 in FIG. 23), the second first-direction same-color adjacent pixel (reference numeral 2-2 in FIG. 23), the first first-direction different-color adjacent pixel (reference numeral 3-2 in FIG. 23) and the second first-direction different-color adjacent pixel (reference numeral 4-2 in FIG. 23) described above, and detects the presence of the abnormal oblique incident light that advances in the horizontal direction from the right side on the sheet plane, when the first first-direction same-color adjacent pixel (reference numeral 1-2 in FIG. 23) and the second first-direction same-color adjacent pixel (reference numeral 2-2 in FIG. 23) have the same value and the first first-direction different-color adjacent pixel (reference numeral 3-2 in FIG. 23) and the second first-direction different-color adjacent pixel (reference numeral 4-2 in FIG. 23) have different values.

Next, the case of detecting the abnormal oblique incident light involving the incidence in the vertical direction from the upper side on the sheet plane is described. The detection of the abnormal oblique incident light in the vertical direction from the upper side on the sheet plane that is performed by the color mixture correction decision unit 61 in the modification 1 shown in FIG. 23 is performed in the following way.

The pixel designated by reference numeral 1-3 in FIG. 23 that includes the G filter, for which a pixel (reference numeral 3-3 in FIG. 23) including the G filter is adjacently arranged to the upper side on the sheet plane in FIG. 23, is a pixel (first second-direction same-color adjacent pixel) for which the pixel including the G filter is adjacently arranged and that includes the G filter. The pixel designated by reference numeral 2-3 in FIG. 23 that includes the G filter, for which a pixel (reference numeral 4-3 in FIG. 23) including the G filter is adjacently arranged to the upper side on the sheet plane in FIG. 23, is a pixel (second second-direction same-color adjacent pixel) for which the pixel including the G filter is adjacently arranged and that includes the G filter.

The pixel designated by reference numeral 3-3 in FIG. 23 that includes the G filter, for which a pixel including the R filter with a different color from the G filter is adjacently arranged to the upper side on the sheet plane in FIG. 23, is a pixel (first second-direction different-color adjacent pixel) for which the pixel including the color filter with the different color from the G filter is adjacently arranged and that includes the G filter. Further, the pixel designated by reference numeral 4-3 in FIG. 23 that includes the G filter, for which a pixel including the B filter with a different color from the G filter is adjacently arranged to the upper side on the sheet plane in FIG. 23, is a pixel (second second-direction different-color adjacent pixel) for which the pixel including the color filter with the different color from the G filter is adjacently arranged and that includes the G filter.

Then, the color mixture correction decision unit 61 compares the pixel data among the first second-direction same-color adjacent pixel (reference numeral 1-3 in FIG. 23), the second second-direction same-color adjacent pixel (reference numeral 2-3 in FIG. 23), the first second-direction different-color adjacent pixel (reference numeral 3-3 in FIG. 23) and the second second-direction different-color adjacent pixel (reference numeral 4-3 in FIG. 23) described above, and detects the presence of the abnormal oblique incident light in the vertical direction, when the first second-direction same-color adjacent pixel (reference numeral 1-3 in FIG. 23) and the second second-direction same-color adjacent pixel (reference numeral 2-3 in FIG. 23) have the same value and the first second-direction different-color adjacent pixel (reference numeral 3-3 in FIG. 23) and the second second-direction different-color adjacent pixel (reference numeral 4-3 in FIG. 23) have different values.

In the case of detecting the abnormal oblique incident light involving the incidence in the vertical direction from the lower side on the sheet plane, the following is performed. The detection of the abnormal oblique incident light in the vertical direction from the lower side on the sheet plane that is performed by the color mixture correction decision unit 61 in the modification 1 shown in FIG. 23 is specifically described.

The pixel designated by reference numeral 1-4 in FIG. 23 that includes the G filter, for which a pixel (reference numeral 3-4 in FIG. 23) including the G filter is adjacently arranged to the lower side in FIG. 23, is a pixel (first second-direction same-color adjacent pixel) for which the pixel including the G filter is adjacently arranged and that includes the G filter. The pixel designated by reference numeral 2-4 in FIG. 23 that includes the G filter, for which a pixel (reference numeral 4-4 in FIG. 23) including the G filter is adjacently arranged to the lower side in FIG. 23, is a pixel (second second-direction same-color adjacent pixel) for which the pixel including the G filter is adjacently arranged and that includes the G filter.

The pixel designated by reference numeral 3-4 in FIG. 23 that includes the G filter, for which a pixel including the R filter with a different color from the G filter is adjacently arranged to the lower side in FIG. 23, is a pixel (first second-direction different-color adjacent pixel) for which the pixel including the color filter with the different color from the G filter is adjacently arranged and that includes the G filter. Further, the pixel designated by reference numeral 4-4 in FIG. 23 that includes the G filter, for which a pixel including the B filter with a different color from the G filter is adjacently arranged to the lower side in FIG. 23, is a pixel (second second-direction different-color adjacent pixel) for which the pixel including the color filter with the different color from the G filter is adjacently arranged and that includes the G filter.

Then, the color mixture correction decision unit 61 compares the pixel data among the first second-direction same-color adjacent pixel (reference numeral 1-4 in FIG. 23), the second second-direction same-color adjacent pixel (reference numeral 2-4 in FIG. 23), the first second-direction different-color adjacent pixel (reference numeral 3-4 in FIG. 23) and the second second-direction different-color adjacent pixel (reference numeral 4-4 in FIG. 23) described above, and detects the presence of the abnormal oblique incident light in the vertical direction, when the first second-direction same-color adjacent pixel (reference numeral 1-4 in FIG. 23) and the second second-direction same-color adjacent pixel (reference numeral 2-4 in FIG. 23) have the same value and the first second-direction different-color adjacent pixel (reference numeral 3-4 in FIG. 23) and the second second-direction different-color adjacent pixel (reference numeral 4-4 in FIG. 23) have different values.

Here, for the obviousness of the description, in FIG. 23, the detection of the abnormal oblique incident light in the horizontal direction from the left side on the sheet plane by the pixels of reference numerals 1-1 to 4-1, the detection of the abnormal oblique incident light in the horizontal direction from the right side on the sheet plane by the pixels of reference numerals 1-2 to 4-2, the detection of the abnormal oblique incident light in the vertical direction by the pixels of reference numerals 1-3 to 4-3, and the detection of the abnormal oblique incident light in the vertical direction by the pixels of reference numerals 1-4 to 4-4 have been described as the detections by the pixels arranged in the different basic array pixel groups P that are adjacent. However, the detections may be performed from pixels in an identical basic array pixel group P that correspond to the pixels of reference numerals 1-1 to 4-1, the pixels of reference numerals 1-2 to 4-2, the pixels of reference numerals 1-3 to 4-3 and the pixels of reference numerals 1-4 to 4-4.

<Another Embodiment of Imaging Element (Modification 2)>

Figure 25:
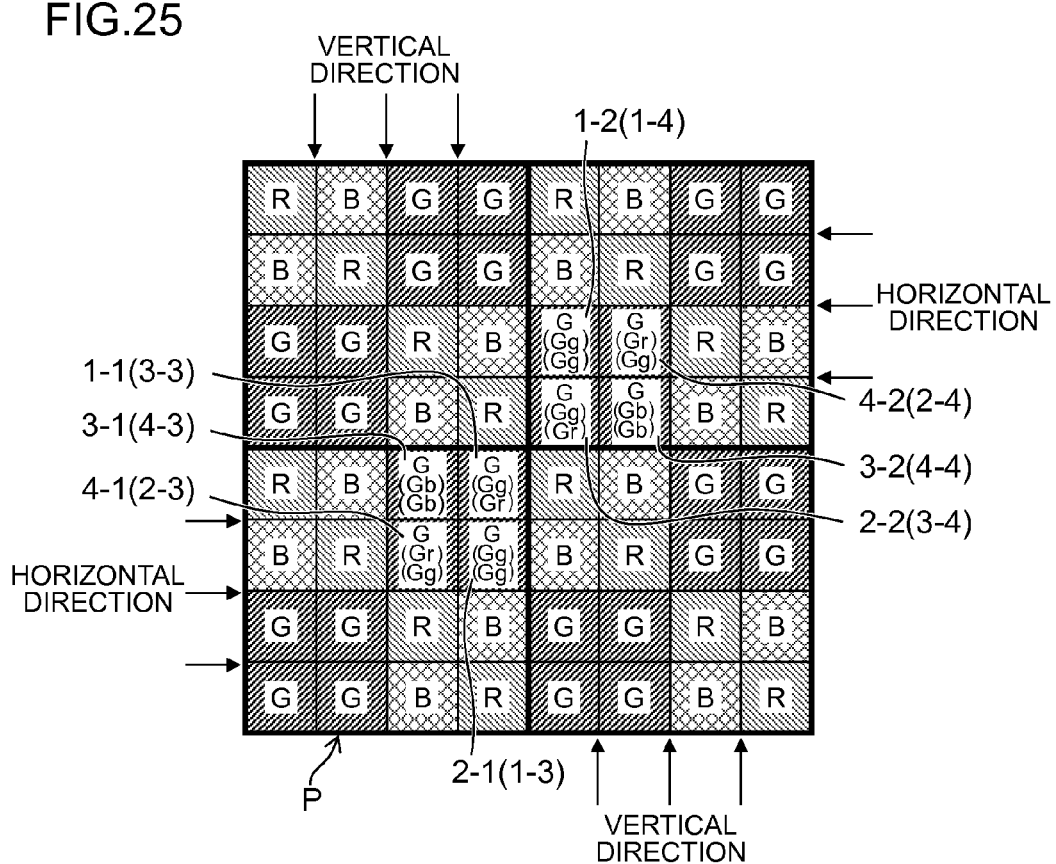
FIG. 25 is a diagram showing another color filter array.

FIG. 25 is a diagram showing another embodiment (modification 2) of the above color imaging element 27, and particularly, shows a color filter array that is arranged on the light receiving surface of the color imaging element 27.

The color filter array shown in FIG. 25 includes multiple basic array pixel groups each of which is configured by pixels arrayed as 4 pixels×4 pixels in the horizontal direction and the vertical direction. Further, the color filter array includes the multiple basic array pixel groups apposed in the horizontal direction and the vertical direction, and each of the basic array pixel groups includes two first subarrays and two second subarrays each of which is configured by pixels arrayed as 2 pixels×2 pixels in the horizontal direction and the vertical direction.

The first subarray is configured by two pixels including the R filter and two pixels including the B filter, and the second subarray is configured by four pixels including the G filter. The first-color pixel group is configured by the second subarray, and the second subarrays are arranged so as to be adjacent to the first subarrays in the horizontal direction and the vertical direction.

Specifically, the color filter array in FIG. 25 includes a basic array pattern P (a pixel group shown by the thick-bordered box) that is a square array pattern corresponding to 4 pixels×4 pixels, and the basic array pattern P is repeatedly arranged in the horizontal direction and the vertical direction. That is, in the color filter array, the R filter, the G filter and the B filter are periodically arrayed.

Since the R filter, the G filter and the B filter are periodically arrayed in this way, it is possible to perform the process in accordance with the repeat pattern, when performing the demosaic process and others of the R, G and B signals that are read from the color imaging element 27.

In the color filter array shown in FIG. 25, filters of all colors of R, G and B are arranged on each of the horizontal and vertical lines in the basic array pattern P.

Figure 26:
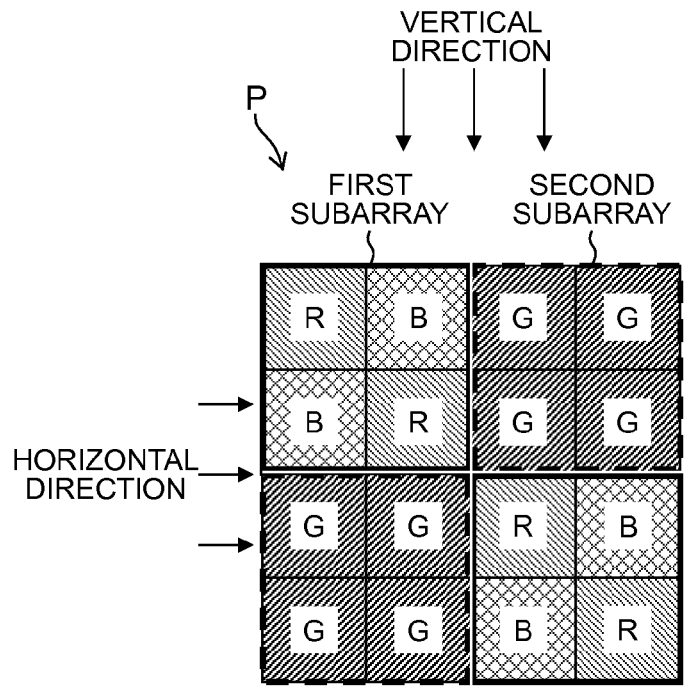
FIG. 26 is a diagram showing a manner in which a basic array pixel group of the color filter array shown in FIG. 25 is divided into a first subarray and a second subarray.

FIG. 26 shows a state in which the basic array pattern P shown in FIG. 25 is divided into four sets of 2 pixels×2 pixels.

The basic array pattern P shown in FIG. 26 is an array in which the first subarray of 2 pixels×2 pixels surrounded by the solid-line box and the second subarray of 2 pixels×2 pixels surrounded by the broken-line box are alternately arrayed in the horizontal and vertical directions.

The first subarray is an array in which the R filter and the B filter are alternately arrayed in the horizontal and vertical directions. Further, for the first subarray, it can be said that the R filter or the B filter is arrayed on a diagonal line of the array of 2 pixels×2 pixels.

On the other hand, in the second subarray, pixels including the G filter are arrayed as 2 pixels×2 pixels. The array of 2 pixels×2 pixels by the pixels including the G filter, which is a pixel group of pixels including the G filter, configures the first first-direction same-color adjacent pixel, the second first-direction same-color adjacent pixel, the first first-direction different-color adjacent pixel and the second first-direction different-color adjacent pixel, and configures the first second-direction same-color adjacent pixel, the second second-direction same-color adjacent pixel, the first second-direction different-color adjacent pixel and the second second-direction different-color adjacent pixel.

[Abnormal Oblique Incident Light Detection]

The detection of the abnormal oblique incident light in the horizontal direction from the left side on the sheet plane that is performed by the color mixture correction decision unit 61 of the digital camera 10 including the color imaging element 27 according to the modification 2 in the example shown in FIG. 25 is specifically described.

The pixel designated by reference numeral 1-1 in FIG. 25 that includes the G filter, for which a pixel (reference numeral 3-1 in FIG. 25) including the G filter is adjacently arranged to the left side on the sheet plane in FIG. 25, is a pixel (first first-direction same-color adjacent pixel) for which the pixel including the color filter with the same color is adjacently arranged and that includes the G filter. The pixel designated by reference numeral 2-1 in FIG. 25 that includes the G filter, for which a pixel (reference numeral 4-1 in FIG. 25) including the G filter is adjacently arranged to the left side on the sheet plane in FIG. 25, is a pixel (second first-direction same-color adjacent pixel) for which the pixel including the color filter with the same color is adjacently arranged and that includes the G filter.

The pixel designated by reference numeral 3-1 in FIG. 25 that includes the G filter, for which a pixel including the B filter with a different color is adjacently arranged to the left side on the sheet plane in FIG. 25, is a pixel (first first-direction different-color adjacent pixel) for which the pixel including the color filter with the different color is adjacently arranged and that includes the G filter. Further, the pixel designated by reference numeral 4-1 in FIG. 25 that includes the G filter, for which a pixel including the R filter with a different color is adjacently arranged to the left side on the sheet plane in FIG. 25, is a pixel (second first-direction different-color adjacent pixel) for which the pixel including the color filter with the different color is adjacently arranged and that includes the G filter.

Then, the color mixture correction decision unit 61 compares the pixel data among the first first-direction same-color adjacent pixel (reference numeral 1-1 in FIG. 25), the second first-direction same-color adjacent pixel (reference numeral 2-1 in FIG. 25), the first first-direction different-color adjacent pixel (reference numeral 3-1 in FIG. 25) and the second first-direction different-color adjacent pixel (reference numeral 4-1 in FIG. 25) described above, and detects the presence of the abnormal oblique incident light from the first direction, when the first first-direction same-color adjacent pixel (reference numeral 1-1 in FIG. 25) and the second first-direction same-color adjacent pixel (reference numeral 2-1 in FIG. 25) have the same value and the first first-direction different-color adjacent pixel (reference numeral 3-1 in FIG. 25) and the second first-direction different-color adjacent pixel (reference numeral 4-1 in FIG. 25) have different values.

The detection of the abnormal oblique incident light in the horizontal direction from the right side on the sheet plane that is performed by the color mixture correction decision unit 61 of the digital camera 10 including the color imaging element 27 according to the modification 2 shown in FIG. 25 is specifically described.

The pixel designated by reference numeral 1-2 in FIG. 25 that includes the G filter, for which a pixel (reference numeral 4-2 in FIG. 25) including the G filter is adjacently arranged to the right side on the sheet plane in FIG. 25, is a pixel (first first-direction same-color adjacent pixel) for which the pixel including the color filter with the same color is adjacently arranged and that includes the G filter. The pixel designated by reference numeral 2-2 in FIG. 25 that includes the G filter, for which a pixel (reference numeral 3-2 in FIG. 25) including the G filter is adjacently arranged to the right side on the sheet plane in FIG. 25, is a pixel (second first-direction same-color adjacent pixel) for which the pixel including the color filter with the same color is adjacently arranged and that includes the G filter.

The pixel designated by reference numeral 3-2 in FIG. 25 that includes the G filter, for which a pixel including the B filter with a different color is adjacently arranged to the right side on the sheet plane in FIG. 25, is a pixel (first first-direction different-color adjacent pixel) for which the pixel including the color filter with the different color is adjacently arranged and that includes the G filter. Further, the pixel designated by reference numeral 4-2 in FIG. 25 that includes the G filter, for which a pixel including the R filter with a different color is adjacently arranged to the right side on the sheet plane in FIG. 25, is a pixel (second first-direction different-color adjacent pixel) for which the pixel including the color filter with the different color is adjacently arranged and that includes the G filter.

Then, the color mixture correction decision unit 61 compares the pixel data among the first first-direction same-color adjacent pixel (reference numeral 1-2 in FIG. 25), the second first-direction same-color adjacent pixel (reference numeral 2-2 in FIG. 25), the first first-direction different-color adjacent pixel (reference numeral 3-2 in FIG. 25) and the second first-direction different-color adjacent pixel (reference numeral 4-2 in FIG. 25) described above, and detects the presence of abnormal oblique incident light that advances in the horizontal direction from the right side on the sheet plane, when the first first-direction same-color adjacent pixel (reference numeral 1-2 in FIG. 25) and the second first-direction same-color adjacent pixel (reference numeral 2-2 in FIG. 25) have the same value and the first first-direction different-color adjacent pixel (reference numeral 3-2 in FIG. 25) and the second first-direction different-color adjacent pixel (reference numeral 4-2 in FIG. 25) have different values.

The detection of the abnormal oblique incident light involving the incidence in the vertical direction from the upper side on the sheet plane that is performed by the color mixture correction decision unit 61 of the digital camera 10 including the color imaging element 27 according to the modification 2 shown in FIG. 25 is described.

The pixel designated by reference numeral 1-3 in FIG. 25 that includes the G filter, for which a pixel (reference numeral 3-3 in FIG. 25) including the G filter is adjacently arranged to the upper side on the sheet plane in FIG. 25, is a pixel (first second-direction same-color adjacent pixel) for which the pixel including the color filter with the same color is adjacently arranged and that includes the G filter. The pixel designated by reference numeral 2-3 in FIG. 25 that includes the G filter, for which a pixel (reference numeral 4-3 in FIG. 25) including the G filter is adjacently arranged to the upper side on the sheet plane in FIG. 25, is a pixel (second second-direction same-color adjacent pixel) for which the pixel including the color filter with the same color is adjacently arranged and that includes the G filter.

The pixel designated by reference numeral 3-3 in FIG. 25 that includes the G filter, for which a pixel including the R filter with a different color is adjacently arranged to the upper side on the sheet plane in FIG. 25, is a pixel (first second-direction different-color adjacent pixel) for which the pixel including the color filter with the different color is adjacently arranged and that includes the G filter. Further, the pixel designated by reference numeral 4-3 in FIG. 25 that includes the G filter, for which a pixel including the B filter with a different color is adjacently arranged to the upper side on the sheet plane in FIG. 25, is a pixel (second second-direction different-color adjacent pixel) for which the pixel including the color filter with the different color is adjacently arranged and that includes the G filter.

Then, the color mixture correction decision unit 61 compares the pixel data among the first second-direction same-color adjacent pixel (reference numeral 1-3 in FIG. 25), the second second-direction same-color adjacent pixel (reference numeral 2-3 in FIG. 25), the first second-direction different-color adjacent pixel (reference numeral 3-3 in FIG. 25) and the second second-direction different-color adjacent pixel (reference numeral 4-3 in FIG. 25) described above, and detects the presence of the abnormal oblique incident light from the vertical direction, when the first second-direction same-color adjacent pixel (reference numeral 1-3 in FIG. 25) and the second second-direction same-color adjacent pixel (reference numeral 2-3 in FIG. 25) have the same value and the first second-direction different-color adjacent pixel (reference numeral 3-3 in FIG. 25) and the second second-direction different-color adjacent pixel (reference numeral 4-3 in FIG. 25) have different values.

The detection of the abnormal oblique incident light involving the incidence in the vertical direction from the lower side on the sheet plane that is performed by the color mixture correction decision unit 61 of the digital camera 10 including the color imaging element 27 according to the modification 2 shown in FIG. 25 is described.

The pixel designated by reference numeral 1-4 in FIG. 25 that includes the G filter, for which a pixel (reference numeral 3-4 in FIG. 25) including the G filter is adjacently arranged to the lower side on the sheet plane in FIG. 25, is a pixel (first second-direction same-color adjacent pixel) for which the pixel including the color filter with the same color is adjacently arranged and that includes the G filter. The pixel designated by reference numeral 2-4 in FIG. 25 that includes the G filter, for which a pixel (reference numeral 4-4 in FIG. 25) including the G filter is adjacently arranged to the lower side on the sheet plane in FIG. 25, is a pixel (second second-direction same-color adjacent pixel) for which the pixel including the color filter with the same color is adjacently arranged and that includes the G filter.

The pixel designated by reference numeral 3-4 in FIG. 25 that includes the G filter, for which a pixel including the R filter with a different color is adjacently arranged to the lower side on the sheet plane in FIG. 25, is a pixel (first second-direction different-color adjacent pixel) for which the pixel including the color filter with the different color is adjacently arranged and that includes the G filter. Further, the pixel designated by reference numeral 4-4 in FIG. 25 that includes the G filter, for which a pixel including the B filter with a different color is adjacently arranged to the lower side on the sheet plane in FIG. 25, is a pixel (second second-direction different-color adjacent pixel) for which the pixel including the color filter with the different color is adjacently arranged and that includes the G filter.

Then, the color mixture correction decision unit 61 compares the pixel data among the first second-direction same-color adjacent pixel (reference numeral 1-4 in FIG. 25), the second second-direction same-color adjacent pixel (reference numeral 2-4 in FIG. 25), the first second-direction different-color adjacent pixel (reference numeral 3-4 in FIG. 25) and the second second-direction different-color adjacent pixel (reference numeral 4-4 in FIG. 25) described above, and detects the presence of the abnormal oblique incident light from the vertical direction, when the first second-direction same-color adjacent pixel (reference numeral 1-4 in FIG. 25) and the second second-direction same-color adjacent pixel (reference numeral 2-4 in FIG. 25) have the same value and the first second-direction different-color adjacent pixel (reference numeral 3-4 in FIG. 25) and the second second-direction different-color adjacent pixel (reference numeral 4-4 in FIG. 25) have different values.

Figure 27:
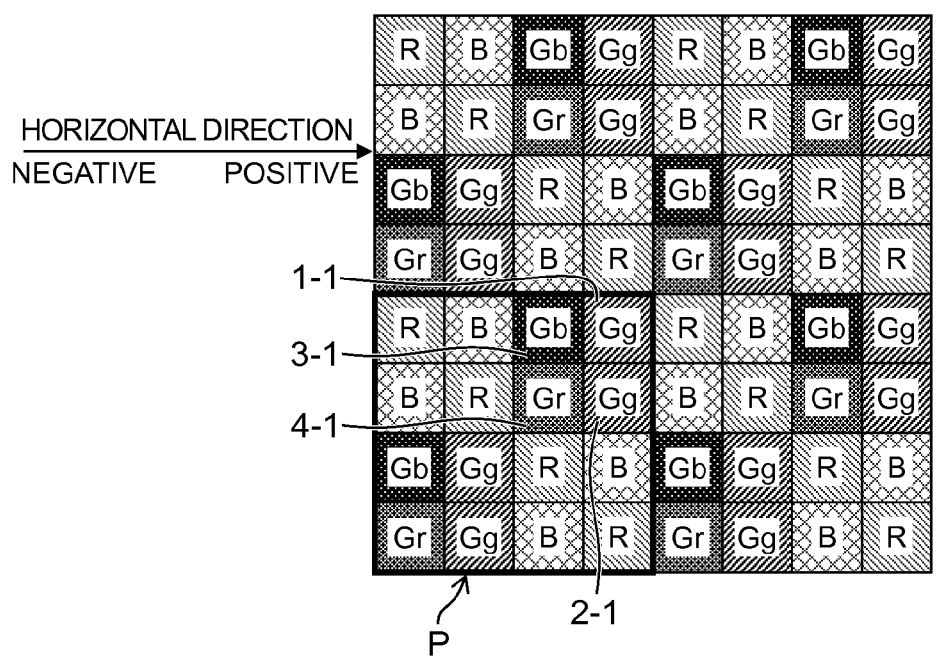
FIG. 27 is a diagram for explaining the discrimination of the incident direction of the abnormal oblique incident light in the color filter array shown in FIG. 25.
Figure 28:
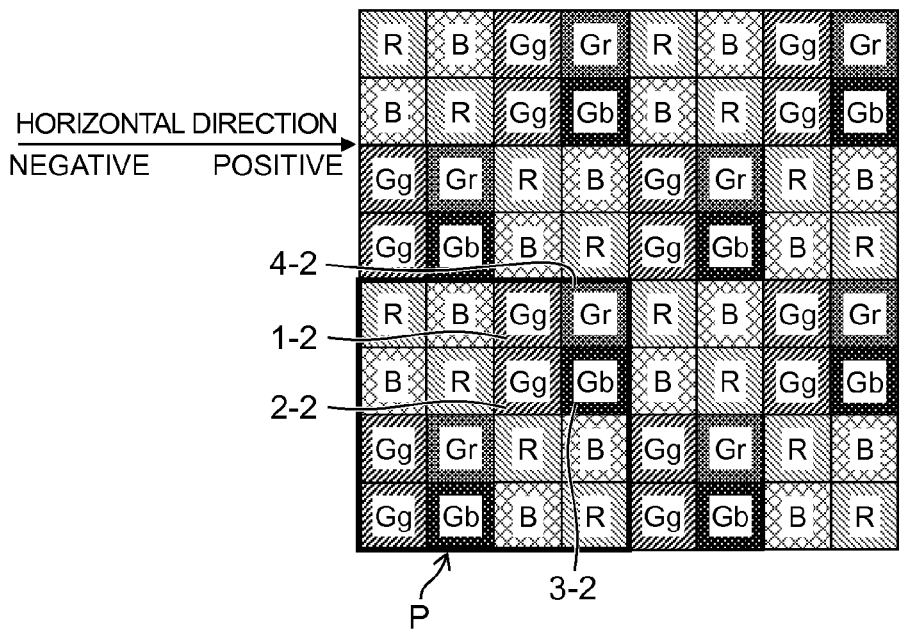
FIG. 28 is a diagram for explaining the discrimination of the incident direction of the abnormal oblique incident light in the color filter array shown in FIG. 25.

FIG. 27 and FIG. 28 show a way to decide whether the incident direction of the abnormal oblique incident light is the positive direction or the negative direction of the horizontal direction, in the color imaging element 27 including the color filter array shown in FIG. 25. In FIG. 27 and FIG. 28, on the sheet plane, the right side is the positive direction, and the left side is the negative direction.

The multiple pixels shown in FIG. 27 and FIG. 28 include a first first-color pixel (reference numeral 3-1 in FIG. 27) (reference numeral 1-2 in FIG. 28) and a second first-color pixel (reference numeral 4-1 in FIG. 27) (reference numeral 2-2 in FIG. 28) that are adjacent in the positive direction of the horizontal direction to pixels including the G filter, that are adjacent in the negative direction of the horizontal direction to pixels including color filters with different colors from the first color, and that include the G filter, and a third first-color pixel (reference numeral 1-1 in FIG. 27) (reference numeral 4-2 in FIG. 28) and a fourth first-color pixel (reference numeral 2-1 in FIG. 27) (reference numeral 3-2 in FIG. 28) that are adjacent in the negative direction of the horizontal direction to the pixels including the G filter, that are adjacent in the positive direction of the horizontal direction to pixels including color filters with different colors from the first color, and that include the G filter.

FIG. 27 shows a state of the incidence of the abnormal oblique incident light along the positive direction of the horizontal direction. When the abnormal oblique incident light enters the color imaging element 27 along the positive direction of the horizontal direction, the pixel data of the third first-color pixel (reference numeral 1-1 in FIG. 27) is Gg, because of the color mixture from the pixel (reference numeral 3-1 in FIG. 27) that is adjacent and that include the G filter. Further, the pixel data of the fourth first-color pixel (reference numeral 2-1 in FIG. 27) also is Gg, because of the color mixture from the pixel (reference numeral 4-1 in FIG. 27) that is adjacent and that include the G filter.

On the other hand, the pixel data of the first first-color pixel (reference numeral 3-1 in FIG. 27) is Gb, because of the color mixture from the pixel that is adjacent to the negative directional side and that includes the B filter. Further, the pixel data of the second first-color pixel (reference numeral 4-1 in FIG. 27) is Gr, because of the color mixture from the pixel that is adjacent to the negative directional side and that includes the R filter.

As shown in FIG. 27, in the case of detecting an output value of Gb for the first first-color pixel (reference numeral 3-1 in FIG. 27), an output value of Gr for the second first-color pixel (reference numeral 4-1 in FIG. 27), an output value of Gg for the third first-color pixel (reference numeral 1-1 in FIG. 27) and an output value of Gg for the fourth first-color pixel (reference numeral 2-1 in FIG. 27), it is possible to decide that the incidence of the abnormal oblique incident light along the positive direction of the horizontal direction is present. Furthermore, in the case where the pixel data of the first pixel or the second pixel is Gg, it is possible to decide that the abnormal oblique incident light from the first positive direction is present.

FIG. 28 shows a state of the incidence of the abnormal oblique incident light along the negative direction of the horizontal direction. When the abnormal oblique incident light enters the color imaging element 27 along the negative direction of the horizontal direction, the pixel data of the third first-color pixel (reference numeral 4-2 in FIG. 28) is Gr, because of the color mixture from the pixel that is adjacent to the positive directional side and that includes the R filter. Further, the pixel data of the fourth first-color pixel (reference numeral 3-2 in FIG. 28) is Gb, because of the color mixture from the pixel that is adjacent to the positive directional side and that includes the B filter.

On the other hand, the pixel data of the first first-color pixel (reference numeral 1-2 in FIG. 28) is Gg, because of the color mixture from the pixel (reference numeral 4-2 in FIG. 28) that is adjacent to the positive directional side and that includes the G filter. Further, the pixel data of the second first-color pixel (reference numeral 2-2 in FIG. 28) is Gg, because of the color mixture from the pixel (reference numeral 3-2 in FIG. 28) that is adjacent to the positive directional side and that includes the G filter.

As shown in FIG. 28, in the case of detecting an output value of Gg for the first first-color pixel (reference numeral 1-2 in FIG. 28), an output value of Gg for the second first-color pixel (reference numeral 2-2 in FIG. 28), an output value of Gr for the third first-color pixel (reference numeral 4-2 in FIG. 28) and an output value of Gb for the fourth first-color pixel (reference numeral 3-2 in FIG. 28), it is possible to decide that the incidence of the abnormal oblique incident light along the negative direction of the horizontal direction is present. Furthermore, in the case where the pixel data of the first pixel or the second pixel is Gg, it is possible to decide that the abnormal oblique incident light from the negative direction of the horizontal direction is present.

Furthermore, in the case of detecting the abnormal oblique incident light, it is possible to correct the pixel data of a pixel including a photodiode that the abnormal oblique incident light enters, using the pixel data of pixels that are of the first first-color pixel, the second first-color pixel, the third first-color pixel and the fourth first-color pixel and that output the same pixel data.

For the convenience of the description, in FIG. 27 and FIG. 28, the description has been made with respect to the horizontal direction in the other embodiment (modification 1) of the above color imaging element 27. However, in the embodiments of the above color imaging element 27 (the imaging elements having the color filter arrays shown in FIG. 20, FIG. 23 and FIG. 25), it is possible to discriminate whether the incidence of the abnormal oblique incident light is in the positive direction or in the negative direction, with respect to the horizontal direction and the vertical direction.

<Another Embodiment of Imaging Element (Modification 3)>

Figure 29:
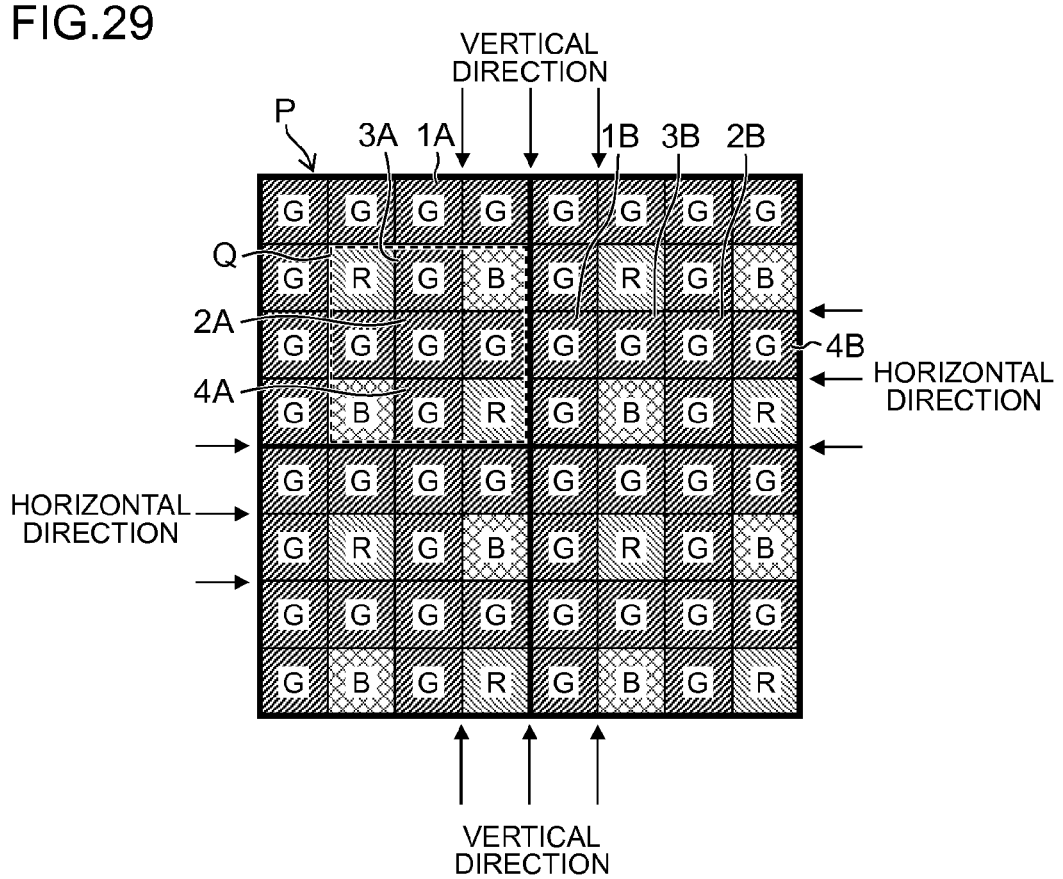
FIG. 29 is a diagram showing another color filter array.

FIG. 29 is a diagram showing another embodiment (modification 3) of the above color imaging element 27, and particularly, shows a color filter array that is arranged on the light receiving surface of the color imaging element 27.

The color filter array shown in FIG. 29 includes multiple basic array patterns P each of which is configured by the color filters of pixels arrayed as 4 pixels×4 pixels in the horizontal direction and the vertical direction and that are apposed in the horizontal direction and the vertical direction.

Since the R filter, the G filter and the B filter are periodically arrayed in this way, it is possible to perform the process in accordance with the repeat pattern, when performing the demosaic process and others of the R, G and B signals that are read from the color imaging element 27.

In the color filter array shown in FIG. 29, filters of all colors of R, G and B are arranged on each of the horizontal and vertical lines in the basic array pattern P.

A pixel block Q (shown by the dotted line in FIG. 29) is configured by two pixels including the R filter, two pixels including the B filter and five pixels including the G filter in the each pixel group of the basic array patterns P.

Each of the basic array patterns P includes two first subarrays and two second subarrays each of which is configured by the color filters of pixels arrayed as 2 pixels×2 pixels in the horizontal direction and the vertical direction.

Figure 30:
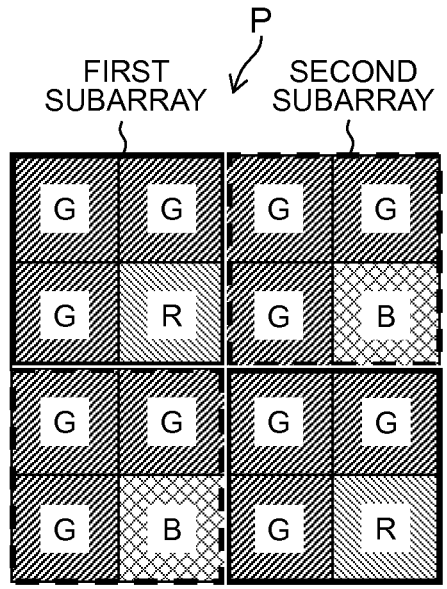
FIG. 30 is a diagram showing a manner in which a basic array pixel group of the color filter array shown in FIG. 29 is divided into a first subarray and a second subarray.

FIG. 30 shows a state in which the basic array pattern P shown in FIG. 29 is divided into four sets of 2 pixels×2 pixels.

As shown in FIG. 30, the first subarray is configured by three pixels including the G filter and one pixel including the R filter, and the second subarray is configured by three pixels including the G filter and one pixel including the B filter. The position in the first subarray of the pixel including the R filter and the position in the second subarray of the pixel including the B filter correspond. The first subarrays are arranged so as to be adjacent to the second subarrays in the horizontal direction and the vertical direction.

Specifically, the basic array pattern P shown in FIG. 30 is an array in which the first subarray of 2 pixels×2 pixels surrounded by the solid-line box and the second subarray of 2 pixels×2 pixels surrounded by the broken-line box are alternately arrayed in the horizontal and vertical directions.

The first subarray includes three G filters and one R filter. Further, the second subarray includes three G filters and one B filter. Furthermore, the position in the first subarray where the R filter is arrayed and the position in the second subarray where the B filter is arrayed are the same.

[Abnormal Oblique Incident Light Detection]

The detection of the abnormal oblique incident light from the horizontal direction that is performed by the color mixture correction decision unit 61 in the example shown in FIG. 29 is specifically described. The pixel designated by reference character 1A in FIG. 29 that includes the G filter, for which pixels including the G filter are adjacently arranged to the left side and right side on the sheet plane in FIG. 29, is a pixel (first first-direction same-color adjacent pixel) for which the pixels including the color filter with the same color are adjacently arranged and that includes the G filter. The pixel designated by reference character 2A in FIG. 29 that includes the G filter, for which pixels including the G filter are adjacently arranged to the left side and right side on the sheet plane in FIG. 29, is a pixel (second first-direction same-color adjacent pixel) for which the pixels including the color filter with the same color are adjacently arranged and that includes the G filter.

The pixel designated by reference character 3A in FIG. 29 that includes the G filter, for which pixels including the R filter and the B filter are adjacently arranged to the left side and the right side on the sheet plane in FIG. 29, is a pixel (first first-direction different-color adjacent pixel) for which the pixels including the color filters with the different colors are adjacently arranged and that includes the G filter. Further, the pixel designated by reference character 4A in FIG. 29 that includes the G filter, for which pixels including the B filter and the R filter are adjacently arranged to the left side and the right side on the sheet plane in FIG. 29, is a pixel (second first-direction different-color adjacent pixel) for which the pixels including the color filters with the different colors are adjacently arranged and that includes the G filter.

Then, the color mixture correction decision unit 61 compares the pixel data among the first first-direction same-color adjacent pixel (reference character 1A in FIG. 29), the second first-direction same-color adjacent pixel (reference character 2A in FIG. 29), the first first-direction different-color adjacent pixel (reference character 3A in FIG. 29) and the second first-direction different-color adjacent pixel (reference character 4A in FIG. 29) described above, and detects the presence of the abnormal oblique incident light from the horizontal direction, when the first first-direction same-color adjacent pixel (reference character 1A in FIG. 29) and the second first-direction same-color adjacent pixel (reference character 2A in FIG. 29) have the same value and the first first-direction different-color adjacent pixel (reference character 3A in FIG. 29) and the second first-direction different-color adjacent pixel (reference character 4A in FIG. 29) have different values.

In the case of detecting the abnormal oblique incident light involving the incidence from the vertical direction, the following is performed.

In FIG. 29, the detection of the abnormal oblique incident light from the vertical direction that is performed by the color mixture correction decision unit 61 is specifically described. The pixel designated by reference character 1B in FIG. 29 that includes the G filter, for which pixels including the G filter are adjacently arranged to the upper side and lower side on the sheet plane in FIG. 29, is a pixel (first second-direction same-color adjacent pixel) for which the pixels including the color filter with the same color are adjacently arranged and that includes the G filter. The pixel designated by reference character 2B in FIG. 29 that includes the G filter, for which pixels including the G filter are adjacently arranged to the upper side and lower side on the sheet plane in FIG. 29, is a pixel (second second-direction same-color adjacent pixel) for which the pixels including the color filter with the same color are adjacently arranged and that includes the G filter.

The pixel designated by reference character 3B in FIG. 29 that includes the G filter, for which pixels including the R filter and B filter with different colors are adjacently arranged to the upper side and the lower side on the sheet plane in FIG. 29, is a pixel for which the pixels including the color filters with the different colors are adjacently arranged and that includes the G filter, and therefore, can be a first second-direction different-color adjacent pixel. Further, the pixel designated by reference character 4B in FIG. 29 that includes the G filter, for which pixels including the B filter and R filter with different colors are adjacently arranged to the upper side and the lower side on the sheet plane in FIG. 29, is a pixel for which the pixels including the color filters with the different colors are adjacently arranged and that includes the G filter, and therefore, can be a second second-direction different-color adjacent pixel.

Then, the color mixture correction decision unit 61 compares the pixel data among the first second-direction same-color adjacent pixel (reference character 1B in FIG. 29), the second second-direction same-color adjacent pixel (reference character 2B in FIG. 29), the first second-direction different-color adjacent pixel (reference character 3B in FIG. 29) and the second second-direction different-color adjacent pixel (reference character 4B in FIG. 29) described above, and detects the presence of the abnormal oblique incident light from the vertical direction, when the first second-direction same-color adjacent pixel (reference character 1B in FIG. 29) and the second second-direction same-color adjacent pixel (reference character 2B in FIG. 29) have the same value and the first second-direction different-color adjacent pixel (reference character 3B in FIG. 29) and the second second-direction different-color adjacent pixel (reference character 4B in FIG. 29) have different values.

Figure 31:
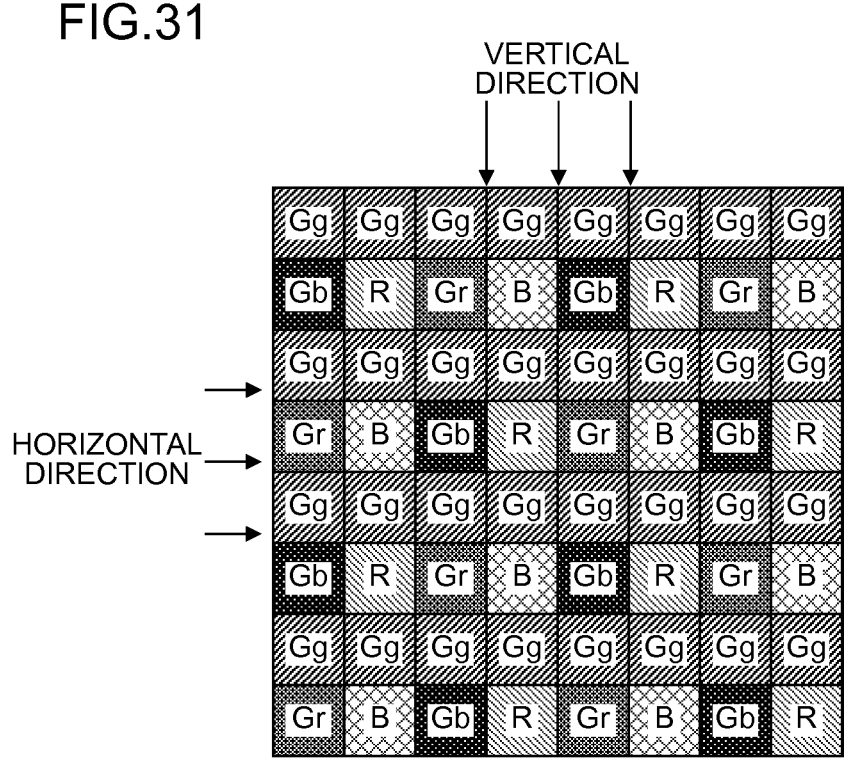
FIG. 31 is a diagram for explaining the discrimination of the incident direction of the abnormal oblique incident light in the color filter array shown in FIG. 29.
Figure 32:
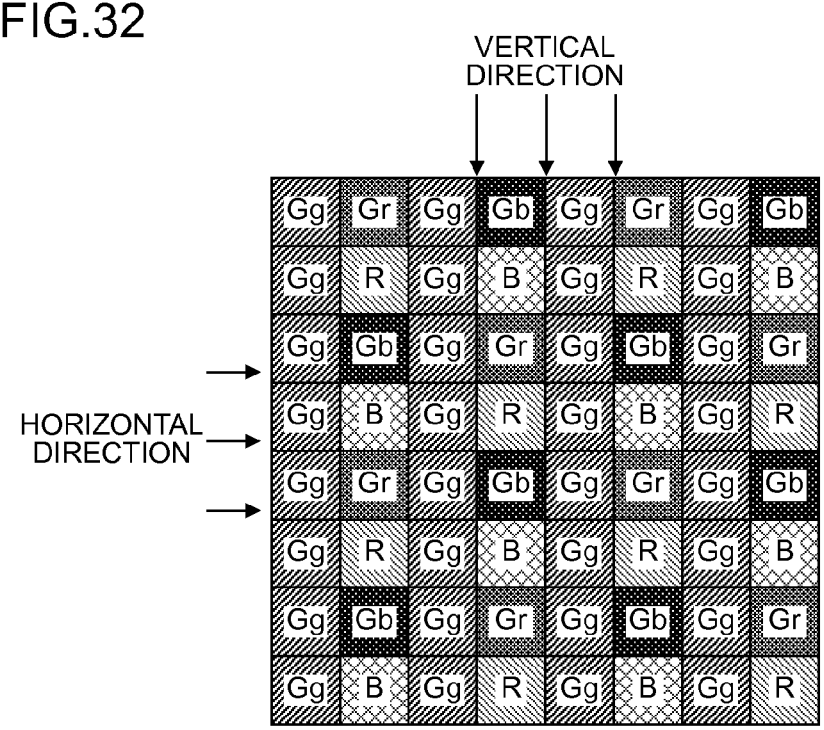
FIG. 32 is a diagram for explaining the discrimination of the incident direction of the abnormal oblique incident light in the color filter array shown in FIG. 29.

Further, as shown in FIG. 31 and FIG. 32, in the other embodiment (modification 3) of the digital camera 10, pixels including the G filter are continuously arrayed in the horizontal direction, or pixels including the G filter are continuously arrayed in the vertical direction. Therefore, it is possible to discriminate the direction of the abnormal oblique incident light more easily.

Furthermore, the color mixture correction decision unit 61 can detect the abnormal oblique incident light to enter the color imaging element 27 in the horizontal direction or the vertical direction, based on the pixel data of the five pixels that are contained in the pixel block (shown by the dotted line in FIG. 29) and that include the G filter.

FIG. 31 shows a case where the abnormal oblique incident light enters, from the horizontal direction, the color imaging element 27 having the color filter array shown in FIG. 29. Further, FIG. 32 shows a case where the abnormal oblique incident light enters, from the vertical direction, the color imaging element 27 having the color filter array shown in FIG. 29.

In FIG. 31, the pixel data of the pixels that are continuously arrayed in the horizontal direction and that include the G filter is Gg. In other words, the pixel data exhibiting the value of Gg is continuously arrayed in the horizontal direction. In this case, the abnormal oblique incident light from the horizontal direction is detected.

On the other hand, in FIG. 32, the pixel data of the pixels that are continuously arrayed in the vertical direction and that include the G filter is Gg. In other words, the pixel data exhibiting the value of Gg is continuously arrayed in the vertical direction. In this case, the abnormal oblique incident light from the vertical direction is detected.

Further, the multiple pixels are configured by pixels including at least the G filter, the R filter and the B filter. Further, the pixel data to be output by the pixel including the G filter most contributes to the obtainment of the luminance signal.

Further, the first-color pixel includes a green, transparent or white color filter. The transparent filter and the white filter are filters that transmit all of the light in the red wavelength region, the light in the blue wavelength region and the light in the green wavelength region. The transparent filter has a relatively high light transmittance (for example, a light transmittance of 70% or more), and the white filter has a lower light transmittance than the transparent filter.

As the color filter array arranged on the light receiving surface of the color imaging element 27, an array other than the arrays shown herein can be also adopted. For example, the basic array pixel group can be an array group of N pixels×M pixels (N is an integer of 3 or more and M is an integer of 3 or more) in the first direction and the second direction, and an array in which the basic array pixel groups are apposed in the first direction and the second direction can be adopted. Then, as each of the basic array pixel groups, an array including the first first-direction same-color adjacent pixel, the second first-direction same-color adjacent pixel, the first first-direction different-color adjacent pixel, the second first-direction different-color adjacent pixel, the first second-direction same-color adjacent pixel, the second second-direction same-color adjacent pixel, the first second-direction different-color adjacent pixel and the second second-direction different-color adjacent pixel can be adopted.

Figure 33:
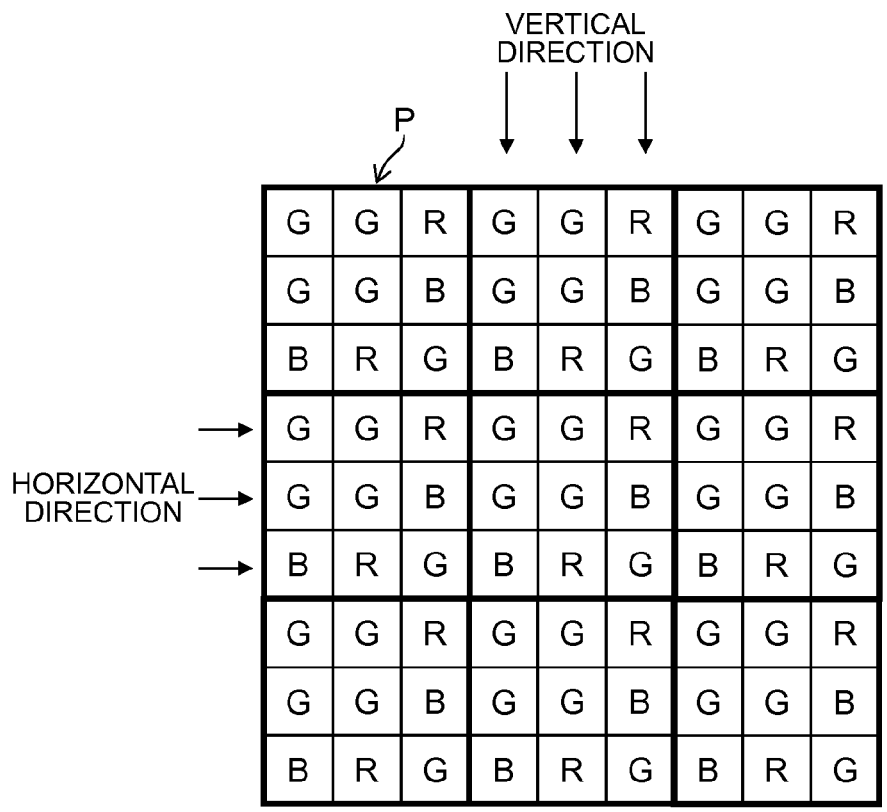
FIG. 33 is a diagram showing a modification of the pixel array of the color imaging element.

Further, the pixel array of the color imaging element 27 is not particularly limited. For example, the basic array pattern can be an array group of N pixels×M pixels (N is an integer of 3 or more and M is an integer of 3 or more) in the first direction (for example, the horizontal direction) and the second direction (for example, the vertical direction), and an array in which the basic array patterns are apposed in the first direction and the second direction can be adopted as the pixel array of the color imaging element 27. As an example, the case of adopting, as the basic array pattern P, an array group of 3 pixels×3 pixels shown in FIG. 33 (an array group in which lines of "a G pixel, a G pixel and an R pixel" apposed in the horizontal direction, lines of "a G pixel, a G pixel and a B pixel" apposed in the horizontal direction and lines of "a B pixel, an R pixel and a G pixel" apposed in the horizontal direction are apposed in the vertical direction) is possible. Here, as for the size of the basic array pattern, when the pixel number of the basic array pattern is increased, the signal process such as the demosaic process is complicated. Therefore, from the standpoint of the prevention of the complication of the signal process, as the size of the basic array pattern, it is preferable to be a size of 10 pixels×10 pixels (the horizontal direction×the vertical direction) or less, which is not too large, and it is more preferable to be a size of 8 pixels×8 pixels (the horizontal direction×the vertical direction) or less.

In the above embodiments, the digital camera 10 has been described, but the configuration of the imaging device (image processing device) is not limited thereto. As another imaging element to which the present invention can be applied, for example, an internal or external PC camera, or a portable terminal device having an image taking function, which is described below, is possible. Further, the present invention can be applied to a program (software) for making a computer execute each processing step (procedure) described above.

As a portable terminal device that is an embodiment of the imaging device (image processing device) according to the present invention, there are a mobile phone, a smart phone, a PDA (Personal Digital Assistants) and a portable game machine, for example. In the following, as an example, a smart phone is described in detail with reference to the drawings.

<Configuration of Smart Phone>

Figure 34:
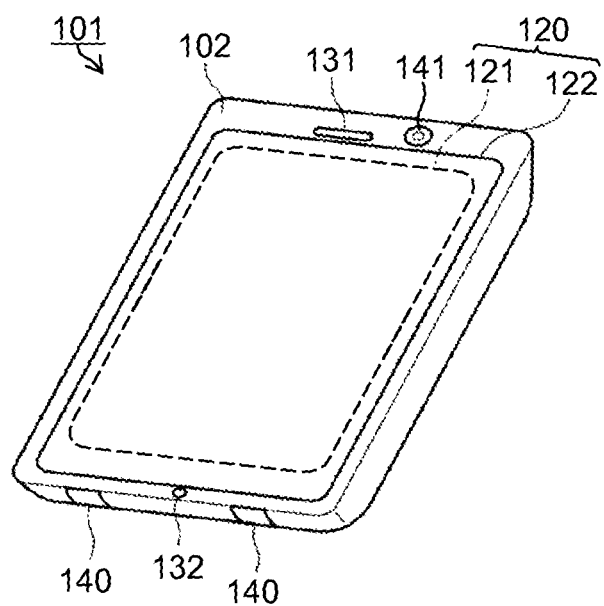
FIG. 34 is an external view of a smart phone.

FIG. 34 shows an external view of a smart phone 101 that is an embodiment of the imaging device (image processing device) according to the present invention. The smart phone 101 shown in FIG. 34 has a case 102 in a flat plate shape, and includes, on one surface of the case 102, a display/input unit 120 in which a display panel 121 as a display unit and an operation panel 122 as an input unit are united. Further, the case 102 includes a speaker 131, a microphone 132, an operation unit 140 and a camera unit 141. Here, the configuration of the case 102 is not limited to this. For example, a configuration in which the display unit and the input unit are separated can be adopted, or a configuration of having a folding structure and a sliding mechanism can be adopted.

FIG. 35 is a block diagram showing the configuration of the smart phone 101 shown in FIG. 34. As shown in FIG. 35, the smart phone includes, as the main constituent elements, a wireless communication unit 110, the display/input unit 120, a telephone call unit 130, the operation unit 140, the camera unit 141, a storage unit 150, an external input/output unit 160, a GPS (Global Positioning System) receiving unit 170, a motion sensor unit 180, a power unit 190, and a main control unit 100. Further, the smart phone 101 includes, as the main function, a wireless communication function to perform the mobile wireless communication through a base station device BS and a mobile communication network NW.

The wireless communication unit 110 performs the wireless communication with a base station device BS contained in a mobile communication network NW, in accordance with an instruction of the main control unit 100. Using the wireless communication, the sending and receiving of a variety of file data such as audio data and image data, e-mail data or the like, and the receiving of Web data, streaming data or the like are performed.

The display/input unit 120 is a so-called touch panel that, by the control from the main control unit 100, displays an image (a still image and a moving image), character information or the like to visually transmit the information to a user, and detects the user operation to the displayed information, and includes the display panel 121 and the operation panel 122.

The display panel 121 is an LCD (Liquid Crystal Display), an OELD (Organic Electro-Luminescence Display) or the like that is used as a display device. The operation panel 122 is a device that is placed such that an image to be displayed on the display surface of the display panel 121 can be visually recognized and that detects a single or multiple coordinates to be operated by a finger of a user or a stylus. When this device is operated by a finger of a user or a stylus, a detection signal generated due to the operation is output to the main control unit 100. Next, the main control unit 100 detects the operation position (coordinate) on the display panel 121, based on the received detection signal.

As shown in FIG. 34, the display panel 121 and operation panel 122 of the smart phone 101 exemplified as an embodiment of the imaging device (image processing device) according to the present invention are united to constitute the display/input unit 120, and are arranged such that the operation panel 122 completely covers the display panel 121. In the case of adopting this arrangement, the operation panel 122 may have the function to detect the user operation, also in the region outside the display panel 121. In other words, the operation panel 122 may include a detection region that is the superimposition portion overlapping with the display panel 121 (hereinafter, referred to as a display region), and a detection region that is other than this and that is the outer edge portion not overlapping with the display panel 121 (hereinafter, referred to as a non-display region).

Here, the size of the display region and the size of the display panel 121 may coincide completely, but the two do not always need to coincide. Further, the operation panel 122 may include two sensitive regions: the outer edge portion and the inner portion that is other than this. Moreover, the width of the outer edge portion is appropriately designed depending on the size of the case 102 and the like. Furthermore, as the position detection scheme to be adopted in the operation panel 122, there are a matrix switch scheme, a resistive film scheme, a surface acoustic wave scheme, an infrared ray scheme, an electromagnetic induction scheme, an electrostatic capacity scheme and the like, and any scheme can be adopted.

The telephone call unit 130, which includes the speaker 131 and the microphone 132, converts a user voice input through the microphone 132 into the audio data capable of being processed in the main control unit 100, to output it to the main control unit 100, and decodes the audio data received by the wireless communication unit 110 or the external input/output unit 160, to output it from the speaker 131. Further, as shown in FIG. 34, for example, the speaker 131 can be mounted on the same surface as a surface on which the display/input unit 120 is provided, and the microphone 132 can be mounted on the side surface of the case 102.

The operation unit 140 is a hardware key using a key switch or the like, and receives an instruction from a user. For example, as shown in FIG. 34, the operation unit 140, which is mounted on the side surface of the case 102 of the smart phone 101, is a push-button switch that is turned on when being pushed by a finger or the like and that becomes the off state by the restoring force of a spring or the like when the finger is released.

The storage unit 150 stores the control program and control data of the main control unit 100, application software, address data associated with the name, telephone number and others of a communication partner, sent or received e-mail data, Web data downloaded by Web browsing, and downloaded content data, and temporarily stores streaming data or the like. Further, the storage unit 150 is constituted by an internal storage unit 151 built in the smart phone, and an external storage unit 152 having a detachable external memory slot. Here, each of the internal storage unit 151 and the external storage unit 152 that constitute the storage unit 150 is actualized by using a storing medium such as a flash memory type memory, a hard disk type memory, a multimedia card micro type memory, a card type memory (for example, a Micro SD® memory or the like), a RAM (Random Access Memory) and a ROM (Read Only Memory).

The external input/output unit 160 plays a role as an interface with all external apparatuses that are linked with the smart phone 101, and is directly or indirectly connected with another external apparatus, through a communication or the like (for example, the universal serial bus (USB), IEEE1394 or the like), or a network (for example, the internet, a wireless LAN, Bluetooth®, RFID (Radio Frequency Identification), the infrared communication (Infrared Data Association: IrDA)®, UWB (Ultra Wideband)®, ZigBee®, or the like).

Examples of the external apparatus to be linked with the smart phone 101 include a wired or wireless headset, a wired or wireless external battery charger, a wired or wireless data port, a memory card or SIM (Subscriber Identity Module Card)/UIM (User Identity Module Card) card to be connected through a card socket, an external audio and video apparatus to be connected through an audio and video I/O (Input/Output) terminal, an external audio and video apparatus to be connected by wireless, a smart phone to be connected by wire or wireless, a personal computer to be connected by wire or wireless, a PDA to be connected by wire or wireless, an earphone, and the like. The external input/output unit allows the data transferred from such an external apparatus to be transmitted to each constituent element in the interior of the smart phone 101, and allows the data in the interior of the smart phone 101 to be transferred to an external apparatus.

The GPS receiving unit 170, in accordance with an instruction of the main control unit 100, receives GPS signals sent from GPS satellites ST1 to STn, executes a positioning computation process based on the multiple GPS signals received, and detects the position of the smart phone 101 as the latitude, the longitude and the altitude. When the position information can be acquired from the wireless communication unit 110 or the external input/output unit 160 (for example, a wireless LAN), the GPS receiving unit 170 can detect the position using the position information.

The motion sensor unit 180 includes, for example, a three-axis acceleration sensor and the like, and detects the physical motion of the smart phone 101 in accordance with an instruction of the main control unit 100. The detection of the physical motion of the smart phone 101 leads to the detection of the moving direction and acceleration of the smart phone 101. This detection result is output to the main control unit 100.

The power unit 190 supplies the electric power stored in a battery (not shown in the figure), to each unit of the smart phone 101, in accordance with an instruction of the main control unit 100.

The main control unit 100, which includes a microprocessor, operates in accordance with the control program and control data stored in the storage unit 150, and integrally controls each unit of the smart phone 101. Further, the main control unit 100 has a mobile communication control function to control each unit of the communication system, and an application processing function, for performing the voice communication and data communication through the wireless communication unit 110.

The main control unit 100 operates in accordance with the application software stored in the storage unit 150, and thereby, the application processing function is actualized. Examples of the application processing function include an infrared communication function to perform the data communication with a facing apparatus by controlling the external input/output unit 160, an e-mail function to perform the sending and receiving of an e-mail message, a Web browsing function to browse a Web page, and the like.

Further, the main control unit 100 has an image processing function such as the display of a picture to the display/input unit 120, based on image data (still image or moving image data) such as received data or downloaded streaming data. The image processing function is a function by which the main control unit 100 decodes the above image data, performs an image process for the decoded result, and displays the image to the display/input unit 120.

Furthermore, the main control unit 100 executes the display control to the display panel 121, and the operation detection control for detecting a user operation through the operation unit 140 or the operation panel 122.

By the execution of the display control, the main control unit 100 displays software keys such as an icon for activating application software and a scroll bar, or displays a window for creating an e-mail message. Here, the scroll bar is a software key for receiving an instruction to move the display portion of an image that is too large to fit inside the display region of the display panel 121, or the like.

Further, by the execution of the operation detection control, the main control unit 100 detects a user operation through the operation unit 140, receives an operation to the above icon and an input of a character string to an input box of the above window, through the operation panel 122, or receives a scroll request of the display image through the scroll bar.

Furthermore, by the execution of the operation detection control, the main control unit 100 has a touch panel control function to decide whether the operation position to the operation panel 122 is the superimposition portion (display region) overlapping with the display panel 121, or the outer edge portion (non-display region) being other than this and not overlapping with the display panel 121, and to control the sensitive region of the operation panel 122 and the display position of the software keys.

Further, the main control unit 100 can detect a gesture operation to the operation panel 122, and can execute a previously set function in response to the detected gesture operation. The gesture operation means not a conventional simple touch operation, but an operation to draw a track from at least one of multiple positions by drawing the track by a finger or the like, by designating multiple positions simultaneously, or by combining them.

The camera unit 141 is a digital camera that performs an electronic image-taking using an imaging element such as a CMOS (Complementary Metal Oxide Semiconductor) or a CCD (Charge-Coupled Device). Further, by the control from the main control unit 100, the camera unit 141 converts the image data obtained by imaging, into compressed image data such as JPEG (Joint Photographic coding Experts Group), for example, and can record it in the storage unit 150, or can output it through the external input/output unit 160 or the wireless communication unit 110. As shown in FIG. 34, in the smart phone 101, the camera unit 141 is mounted on the same surface as the display/input unit 120. However, the mount position of the camera unit 141 is not limited to this. It may be mounted on the back surface of the display/input unit 120, or multiple camera units 141 may be mounted. Here, in the case where the multiple camera units 141 are mounted, it is possible to switch a camera unit 141 for an image taking and perform the image taking independently, or to use the multiple camera units 141 simultaneously and perform the image taking.

Further, the camera unit 141 can be utilized for various functions of the smart phone 101. For example, an image acquired in the camera unit 141 can be displayed on the display panel 121, or the image in the camera unit 141 can be utilized as one operation input of the operation panel 122. Further, when the GPS receiving unit 170 detects the position, it can detect the position by referring to the image from the camera unit 141. Furthermore, by referring to the image from the camera unit 141, it is possible to decide the optical axis direction of the camera unit 141 of the smart phone 101, and to decide the current usage environment, without using the three-axis acceleration sensor or by using the three-axis acceleration sensor together. Naturally, it is possible to utilize the image from the camera unit 141, in the application software.

In addition, it is possible to add the position information acquired by the GPS receiving unit 170, the voice information acquired by the microphone 132 (it may be the text information after the voice-text conversion by the main control unit or the like), the attitude information acquired by the motion sensor unit 180, or the like, to the image data of a still image or a moving image, to record it in the storage unit 150, and to output it through the external input/output unit 160 or the wireless communication unit 110.

In the above-described smart phone 101, the image processing circuit 32 in FIG. 1 can be appropriately actualized, for example, by the main control unit 100, the storage unit 150 and the like.

What is claimed is:
1. An image processing device comprising:
an abnormal oblique incident light detection device which detects presence or absence of abnormal oblique incident light from image data that is output by an imaging element, the imaging element including multiple pixels, each of the multiple pixels including a color filter and a photodiode and outputting pixel data corresponding to a received light amount;
a first color mixture correction device which performs a first color mixture correction for the pixel data of a correction target pixel, based on the pixel data of at least one adjacent pixel to the correction target pixel;
a second color mixture correction device which performs a second color mixture correction for the pixel data of the correction target pixel, based on the pixel data of at least one peripheral pixel to the correction target pixel; and
a color mixture correction decision device which decides by which of the first color mixture correction device and the second color mixture correction device the correction of the image data is performed, depending on a detection result of the abnormal oblique incident light detection device,
wherein the color mixture correction decision device decides that the correction of the pixel data of the correction target pixel is performed by the first color mixture correction device, when the abnormal oblique incident light detection device does not detect the abnormal oblique incident light, and decides that the correction of the pixel data of the correction target pixel is performed by the second color mixture correction device, when the abnormal oblique incident light detection device detects the abnormal oblique incident light,
wherein where M is an integer of 3 or more and N is an integer of 3 or more, the multiple pixels of the imaging element have a basic array pattern of M pixels×N pixels, a plurality of the basic array patterns being arrayed in a first direction and in a second direction perpendicular to the first direction, and
the peripheral pixel is a pixel that is contained in a range of M pixels×N pixels containing the correction target pixel and that includes the color filter with the same color as the correction target pixel.
2. The image processing device according to claim 1,
wherein the second color mixture correction device performs the second color mixture correction for the pixel data of the correction target pixel, using four or more pixels as the peripheral pixels, each of the four or more pixels including a color filter with the same color as the correction target pixel.
3. The image processing device according to claim 1,
wherein the peripheral pixels are configured by pixels that are different from each other in the kind of the color filters of pixels adjacent to the peripheral pixel.
4. The image processing device according to claim 1,
wherein the second color mixture correction device performs the second color mixture correction of the pixel data of the correction target pixel, based on a representative value that is derived from the pixel data of the correction target pixel and the peripheral pixel.
5. The image processing device according to claim 4,
wherein the representative value is an average value or a weighted average value of the pixel data of the correction target pixel and the peripheral pixel.
6. The image processing device according to claim 4,
wherein the representative value is a median value or a mode value of the pixel data of the correction target pixel and the peripheral pixel.
7. The image processing device according to claim 1,
wherein the multiple pixels include a first-color pixel and a second-color pixel, the first-color pixel being configured by the color filter with a first color including at least one or more colors, the second-color pixel being configured by the color filter with a second color including at least two or more colors other than the first color, the first-color pixel includes the color filter with a color that is higher than the color filter of the second-color pixel in contribution ratio for obtaining a luminance signal, and the correction target pixel is the first-color pixel.

8. The image processing device according to claim 7, wherein the first-color pixel includes a green, transparent or white color filter.

9. The image processing device according to claim 7, wherein the basic array pattern includes at least five of the first-color pixels that are different from each other in the kind of the color filters of the adjacent pixels.

10. An image processing device comprising:

an abnormal oblique incident light detection device which detects presence or absence of abnormal oblique incident light from image data that is output by an imaging element, the imaging element including multiple pixels, each of the multiple pixels including a color filter and a photodiode and outputting pixel data corresponding to a received light amount;

a first color mixture correction device which performs a first color mixture correction for the pixel data of a correction target pixel, based on the pixel data of at least one adjacent pixel to the correction target pixel;

a second color mixture correction device which performs a second color mixture correction for the pixel data of the correction target pixel, based on the pixel data of at least one peripheral pixel to the correction target pixel; and a color mixture correction decision device which decides by which of the first color mixture correction device and the second color mixture correction device the correction of the image data is performed, depending on a detection result of the abnormal oblique incident light detection device, wherein the color mixture correction decision device decides that the correction of the pixel data of the correction target pixel is performed by the first color mixture correction device, when the abnormal oblique incident light detection device does not detect the abnormal oblique incident light, and decides that the correction of the pixel data of the correction target pixel is performed by the second color mixture correction device, when the abnormal oblique incident light detection device detects the abnormal oblique incident light, wherein where M is an integer of 3 or more and N is an integer of 3 or more, the multiple pixels of the imaging element have a basic array pattern of M pixels×N pixels, a plurality of the basic array patterns being arrayed in a first direction and in a second direction perpendicular to the first direction, and the peripheral pixel is a pixel that is contained in a larger range than a range of M pixels×N pixels containing the correction target pixel and that includes the color filter with the same color as the correction target pixel.

11. The image processing device according to claim 10, wherein the second color mixture correction device performs the second color mixture correction for the pixel data of the correction target pixel, using four or more pixels as the peripheral pixels, each of the four or more pixels including a color filter with the same color as the correction target pixel.

12. The image processing device according to claim 10, wherein the peripheral pixels are configured by pixels that are different from each other in the kind of the color filters of pixels adjacent to the peripheral pixel.

13. The image processing device according to claim 10, wherein the second color mixture correction device performs the second color mixture correction of the pixel data of the correction target pixel, based on a representative value that is derived from the pixel data of the correction target pixel and the peripheral pixel.

14. The image processing device according to claim 13, wherein the representative value is an average value or a weighted average value of the pixel data of the correction target pixel and the peripheral pixel.

15. The image processing device according to claim 13, wherein the representative value is a median value or a mode value of the pixel data of the correction target pixel and the peripheral pixel.

16. The image processing device according to claim 10, wherein the multiple pixels include a first-color pixel and a second-color pixel, the first-color pixel being configured by the color filter with a first color including at least one or more colors, the second-color pixel being configured by the color filter with a second color including at least two or more colors other than the first color, the first-color pixel includes the color filter with a color that is higher than the color filter of the second-color pixel in contribution ratio for obtaining a luminance signal, and the correction target pixel is the first-color pixel.

17. The image processing device according to claim 16, wherein the first-color pixel includes a green, transparent or white color filter.

18. The image processing device according to claim 16, wherein the basic array pattern includes at least five of the first-color pixels that are different from each other in the kind of the color filters of the adjacent pixels.

19. An image processing method comprising:

a step of detecting presence or absence of abnormal oblique incident light from image data that is output by an imaging element, the imaging element including multiple pixels, each of the multiple pixels including a color filter and a photodiode and outputting pixel data corresponding to a received light amount;

a step of performing a first color mixture correction of the pixel data of a correction target pixel, based on the pixel data of at least one adjacent pixel to the correction target pixel;

a step of performing a second color mixture correction of the pixel data of the correction target pixel, based on the pixel data of at least one peripheral pixel to the correction target pixel; and a step of deciding by which of the first color mixture correction and the second color mixture correction the correction of the image data is performed, depending on a detection result of the step of detecting presence or absence of the abnormal oblique incident light, wherein in the step of deciding by which color mixture correction the correction of the image data is performed, the decision is performed such that the correction of the pixel data of the correction target pixel is performed by the first color mixture correction when the abnormal oblique incident light is not detected in the step of detecting the presence or absence of the abnormal oblique incident light, and the correction of the pixel data of the correction target pixel is performed by the second color mixture correction when the abnormal oblique incident light is detected in the step of detecting the presence or absence of the abnormal oblique incident light, wherein where M is an integer of 3 or more and N is an integer of 3 or more, the multiple pixels of the imaging element have a basic array pattern of M pixels×N pixels, a plurality of the basic array patterns being arrayed in a first direction and in a second direction perpendicular to the first direction, and the peripheral pixel is a pixel that is contained in a range of M pixels×N pixels containing the correction target pixel and that includes the color filter with the same color as the correction target pixel.

20. An image processing method comprising:

a step of detecting presence or absence of abnormal oblique incident light from image data that is output by an imaging element, the imaging element including multiple pixels, each of the multiple pixels including a color filter and a photodiode and outputting pixel data corresponding to a received light amount;

a step of performing a first color mixture correction of the pixel data of a correction target pixel, based on the pixel data of at least one adjacent pixel to the correction target pixel;

a step of performing a second color mixture correction of the pixel data of the correction target pixel, based on the pixel data of at least one peripheral pixel to the correction target pixel; and a step of deciding by which of the first color mixture correction and the second color mixture correction the correction of the image data is performed, depending on a detection result of the step of detecting presence or absence of the abnormal oblique incident light, wherein in the step of deciding by which color mixture correction the correction of the image data is performed, the decision is performed such that the correction of the pixel data of the correction target pixel is performed by the first color mixture correction when the abnormal oblique incident light is not detected in the step of detecting the presence or absence of the abnormal oblique incident light, and the correction of the pixel data of the correction target pixel is performed by the second color mixture correction when the abnormal oblique incident light is detected in the step of detecting the presence or absence of the abnormal oblique incident light, wherein where M is an integer of 3 or more and N is an integer of 3 or more, the multiple pixels of the imaging element have a basic array pattern of M pixels×N pixels, a plurality of the basic array patterns being arrayed in a first direction and in a second direction perpendicular to the first direction, and the peripheral pixel is a pixel that is contained in a larger range than a range of M pixels×N pixels containing the correction target pixel and that includes the color filter with the same color as the correction target pixel.

21. A non-transitory recording medium having a computer-readable code of a program recorded therein, the program making a computer execute:

a procedure of detecting presence or absence of abnormal oblique incident light from image data that is output by an imaging element, the imaging element including multiple pixels, each of the multiple pixels including a color filter and a photodiode and outputting pixel data corresponding to a received light amount;

a procedure of performing a first color mixture correction of the pixel data of a correction target pixel, based on the pixel data of at least one adjacent pixel to the correction target pixel;

a procedure of performing a second color mixture correction of the pixel data of the correction target pixel, based on the pixel data of at least one peripheral pixel to the correction target pixel; and a procedure of deciding by which of the first color mixture correction and the second color mixture correction the correction of the image data is performed, depending on a detection result of the procedure of detecting presence or absence of the abnormal oblique incident light, wherein in the procedure of deciding by which color mixture correction the correction of the image data is performed, the decision is performed such that the correction of the pixel data of the correction target pixel is performed by the first color mixture correction when the abnormal oblique incident light is not detected in the procedure of detecting the presence or absence of the abnormal oblique incident light, and the correction of the pixel data of the correction target pixel is performed by the second color mixture correction when the abnormal oblique incident light is detected in the procedure of detecting the presence or absence of the abnormal oblique incident light, wherein where M is an integer of 3 or more and N is an integer of 3 or more, the multiple pixels of the imaging element have a basic array pattern of M pixels×N pixels, a plurality of the basic array patterns being arrayed in a first direction and in a second direction perpendicular to the first direction, and the peripheral pixel is a pixel that is contained in a range of M pixels×N pixels containing the correction target pixel and that includes the color filter with the same color as the correction target pixel.

22. A non-transitory recording medium having a computer-readable code of a program recorded therein, the program making a computer execute:

a procedure of detecting presence or absence of abnormal oblique incident light from image data that is output by an imaging element, the imaging element including multiple pixels, each of the multiple pixels including a color filter and a photodiode and outputting pixel data corresponding to a received light amount;

a procedure of performing a first color mixture correction of the pixel data of a correction target pixel, based on the pixel data of at least one adjacent pixel to the correction target pixel;

a procedure of performing a second color mixture correction of the pixel data of the correction target pixel, based on the pixel data of at least one peripheral pixel to the correction target pixel; and a procedure of deciding by which of the first color mixture correction and the second color mixture correction the correction of the image data is performed, depending on a detection result of the procedure of presence or absence of the abnormal oblique incident light, wherein in the procedure of deciding by which color mixture correction the correction of the image data is performed, the decision is performed such that the correction of the pixel data of the correction target pixel is performed by the first color mixture correction when the abnormal oblique incident light is not detected in the procedure of detecting the presence or absence of the abnormal oblique incident light, and the correction of the pixel data of the correction target pixel is performed by the second color mixture correction when the abnormal oblique incident light is detected in the procedure of detecting the presence or absence of the abnormal oblique incident light, wherein where M is an integer of 3 or more and N is an integer of 3 or more, the multiple pixels of the imaging element have a basic array pattern of M pixels×N pixels, a plurality of the basic array patterns being arrayed in a first direction and in a second direction perpendicular to the first direction, and the peripheral pixel is a pixel that is contained in a larger range than a range of M pixels×N pixels containing the correction target pixel and that includes the color filter with the same color as the correction target pixel.

* * * * *